(12) United States Patent
Miyake et al.

(10) Patent No.: US 11,333,224 B2
(45) Date of Patent: May 17, 2022

(54) BELT TENSION ADJUSTMENT DEVICE AND WORKING MACHINE

(71) Applicant: KUBOTA CORPORATION, Osaka (JP)

(72) Inventors: Tomoaki Miyake, Sakai (JP); Shogo Taira, Sakai (JP); Kenichi Saiki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 277 days.

(21) Appl. No.: 16/710,963

(22) Filed: Dec. 11, 2019

(65) Prior Publication Data

US 2020/0116239 A1    Apr. 16, 2020

Related U.S. Application Data

(63) Continuation of application No. PCT/JP2018/024021, filed on Jun. 25, 2018.

(30) Foreign Application Priority Data

Jun. 29, 2017   (JP) .............................. JP2017-127514
Jun. 29, 2017   (JP) .............................. JP2017-127515

(Continued)

(51) Int. Cl.
    *F16H 7/12*          (2006.01)
    *F16H 7/08*          (2006.01)

(52) U.S. Cl.
    CPC ... *F16H 7/1263* (2013.01); *F16H 2007/0865* (2013.01); *F16H 2007/0891* (2013.01)

(58) Field of Classification Search
    CPC .......... F16H 2007/0893; F16H 7/1281; F16H 2007/088

(Continued)

(56) References Cited

U.S. PATENT DOCUMENTS 732,238 A * 6/1903 Turbayne ................ H02P 9/007
                                        322/43
1,532,270 A * 4/1925 Shield ...................... F16H 7/06
                                        474/89

(Continued)

FOREIGN PATENT DOCUMENTS

EP        3 135 956 A1    3/2017
JP        53-90189 U    7/1978

(Continued)

*Primary Examiner* — Henry Y Liu
(74) *Attorney, Agent, or Firm* — Birch, Stewart, Kolasch & Birch, LLP

(57) ABSTRACT

A belt tension adjustment device includes a driving pulley attached to a power transmission shaft, a driven pulley arranged in a driven device, a tension pulley, a loop belt arranged between the driving pulley, the driven pulley, and the tension pulley, and configured to transmit a rotational driving force of the power transmission shaft to the driven device, and a tension adjustment mechanism to adjust tension of the loop belt. The tension adjustment mechanism includes a support shaft rotatably supported, a rotational operation mechanism to rotate the support shaft about an axis of the support shaft, and a rotating member coupling the support shaft and the tension pulley, configured to change a relative position of the tension pulley with respect to the driving pulley and the driven pulley in accordance with rotating of the support shaft.

7 Claims, 41 Drawing Sheets

(30) Foreign Application Priority Data

Jun. 29, 2017 (JP) .............................. JP2017-127516
Jun. 29, 2017 (JP) .............................. JP2017-127517
Jun. 29, 2017 (JP) .............................. JP2017-127518

(58) Field of Classification Search
USPC .................................................. 474/133, 113
See application file for complete search history.

(56) References Cited

U.S. PATENT DOCUMENTS

| | | | | | |
|---|---|---|---|---|---|
| 1,744,486 | A | * | 1/1930 | Mikesh | F16H 7/1281 474/133 |
| 2,108,368 | A | * | 2/1938 | Christian | F16H 1/20 474/133 |
| 2,184,541 | A | * | 12/1939 | Aikman | F16H 7/14 248/656 |
| 2,666,331 | A | * | 1/1954 | Hewson | F02N 15/08 74/7 R |
| 2,910,880 | A | * | 11/1959 | Procter | A01D 45/021 474/133 |
| 2,970,587 | A | * | 2/1961 | Estes | F01P 5/04 123/195 E |
| 3,430,507 | A | * | 3/1969 | Oswald | F16H 7/14 474/113 |
| 3,665,780 | A | * | 5/1972 | Lunenschloss | F16H 7/1281 474/133 |
| 3,922,927 | A | * | 12/1975 | Shiki | F02B 67/06 474/113 |
| 4,035,995 | A | * | 7/1977 | Arnblock | A01D 34/82 56/11.6 |
| 4,098,136 | A | * | 7/1978 | Wicker | D03C 1/16 474/123 |
| 4,312,267 | A | * | 1/1982 | Shenberger | F16H 7/1281 100/179 |
| 4,324,552 | A | * | 4/1982 | Boushek, Jr. | A01D 69/00 474/118 |
| 4,464,147 | A | * | 8/1984 | Foster | F16H 7/0848 474/133 |
| 4,489,475 | A | * | 12/1984 | Struttmann | B23P 15/00 29/525.11 |
| 4,500,303 | A | * | 2/1985 | Sermersheim | F16H 7/1281 474/112 |
| 4,504,254 | A | * | 3/1985 | Foster | F16H 7/1245 29/452 |
| 4,512,752 | A | * | 4/1985 | Brenneman | F16H 7/14 474/114 |
| 4,525,152 | A | * | 6/1985 | Speer | F16H 7/1245 267/140.4 |
| 4,571,221 | A | * | 2/1986 | Isobe | F16H 7/14 474/101 |
| 4,571,223 | A | * | 2/1986 | Molloy | F16H 7/1281 474/112 |
| 4,583,961 | A | * | 4/1986 | Kawasawa | F02B 67/06 474/113 |
| 4,604,849 | A | * | 8/1986 | Zemke | B43M 3/045 474/113 |
| 4,618,336 | A | * | 10/1986 | Isobe | F16H 7/14 474/113 |
| 4,781,665 | A | * | 11/1988 | Walker | F16H 7/129 474/133 |
| 4,822,321 | A | * | 4/1989 | Webb | F02B 67/06 474/117 |
| 4,836,101 | A | * | 6/1989 | Kato | B21D 43/02 100/215 |
| 4,887,992 | A | * | 12/1989 | Dixon | F02B 67/06 474/101 |
| 4,957,471 | A | * | 9/1990 | St. John | F16H 7/1281 474/133 |
| 5,046,676 | A | * | 9/1991 | McClintock | F16H 7/1263 474/113 |
| 5,064,405 | A | * | 11/1991 | St. John | F16H 7/1281 474/133 |
| 5,152,721 | A | * | 10/1992 | Sajczvk | F16H 7/1218 474/135 |
| 5,288,276 | A | * | 2/1994 | Golovatgai-Schmidt | F01L 1/02 474/133 |
| 5,425,336 | A | * | 6/1995 | Nakayama | F02B 61/045 123/195 A |
| 5,569,106 | A | * | 10/1996 | Splittstoesser | A01D 34/69 474/125 |
| 5,820,503 | A | * | 10/1998 | Bruchner | F16H 7/1281 474/112 |
| 5,919,107 | A | * | 7/1999 | Stepniak | F16H 7/1281 474/112 |
| 5,938,169 | A | * | 8/1999 | Ogawa | F02B 67/06 248/674 |
| 5,989,084 | A | * | 11/1999 | Tsunoda | F02B 61/045 123/195 A |
| 6,059,679 | A | * | 5/2000 | Tsutsui | F16H 7/1218 474/117 |
| 6,162,141 | A | * | 12/2000 | Rointru | F02B 67/06 474/109 |
| 6,176,071 | B1 | * | 1/2001 | Thorman | A01D 34/76 474/135 |
| 7,004,864 | B2 | * | 2/2006 | Hotta | F02B 67/06 474/117 |
| 7,226,377 | B2 | * | 6/2007 | Kraus | F16H 7/1209 474/117 |
| 7,448,973 | B2 | * | 11/2008 | Simmons | F16H 7/14 474/101 |
| 7,494,434 | B2 | * | 2/2009 | McVicar | F16H 7/1281 474/101 |
| 7,824,286 | B2 | * | 11/2010 | Schmid | F16H 7/1281 474/138 |
| 8,568,259 | B2 | * | 10/2013 | Robbins | F16H 7/1281 474/135 |
| 8,974,332 | B2 | * | 3/2015 | Hood | F16H 7/1263 474/110 |
| 2003/0004023 | A1 | * | 1/2003 | Hotta | F02B 67/06 474/101 |
| 2003/0176250 | A1 | * | 9/2003 | Austin | F02B 67/06 474/134 |
| 2005/0187052 | A1 | * | 8/2005 | Yokoyama | F16H 7/1281 474/117 |
| 2005/0192144 | A1 | * | 9/2005 | Yokoyama | F16H 7/1281 474/117 |
| 2005/0282669 | A1 | * | 12/2005 | Bauer | F16H 7/1281 474/117 |
| 2008/0207367 | A1 | * | 8/2008 | Bogner | F16H 7/1281 474/133 |

FOREIGN PATENT DOCUMENTS

| | | |
|---|---|---|
| JP | 54-167283 U | 11/1979 |
| JP | 1-106661 U | 7/1989 |
| JP | 6-82151 U | 11/1994 |
| JP | 2001-90110 A | 4/2001 |
| JP | 2002-188176 A | 7/2002 |
| JP | 2002-348901 A | 12/2002 |
| JP | 2002-357251 A | 12/2002 |
| JP | 2003-20680 A | 1/2003 |
| JP | 2005-163539 A | 6/2005 |
| JP | 2007-16596 A | 1/2007 |
| JP | 2007-100351 A | 4/2007 |
| JP | 2009-7764 A | 1/2009 |
| JP | 2009-243070 A | 10/2009 |
| JP | 2010-180611 A | 8/2010 |
| JP | 2013-209862 A | 10/2013 |
| JP | 2014-190363 A | 10/2014 |
| JP | 2015-117491 A | 6/2015 |
| JP | 2017-66790 A | 4/2017 |
| WO | WO 2017/056556 A1 | 6/2017 |

* cited by examiner

BELT TENSION ADJUSTMENT DEVICE AND WORKING MACHINE

CROSS-REFERENCE TO RELATED APPLICATIONS

The present application is a continuation application of International Application No. PCT/JP2018/024021, filed Jun. 25, 2018, which claims priority to Japanese Patent Application No. 2017/127514, filed Jun. 29, 2017, to Japanese Patent Application No. 2017/127515, filed Jun. 29, 2017, to Japanese Patent Application No. 2017/127516, filed Jun. 29, 2017, to Japanese Patent Application No. 2017/127517, filed Jun. 29, 2017, and to Japanese Patent Application No. 2017/127518, filed Jun. 29, 2017. The contents of these applications are incorporated herein by reference in their entirety.

BACKGROUND OF THE INVENTION

Field of the Invention

The present invention relates to a belt tension adjustment device and a working machine.

Description of Related Art

A belt tension adjustment device disclosed in Japanese Unexamined Patent Application Publication No. 2014-190363 is previously known.

The belt tension adjustment device disclosed in Japanese Unexamined Patent Application Publication No. 2014-190363 is provided with a position adjusting member that arranges a support stay on a prime mover, attaches an alternator (a driven device) is attached to the prime mover via a pivot shaft so that the alternator can swing, swings the alternator around the pivot shaft between the support stay and the alternator to move the relative position with respect to the crankshaft and the cooling device shaft, and fixes the alternator at a moving position.

A working machine (a backhoe) disclosed in Japanese Unexamined Patent Application Publication No. 2014-190363 is previously known.

The working machine disclosed in Japanese Unexamined Patent Application Publication No. 2014-190363 includes a machine body (a turn base), a hydraulic device mounted on the machine body, a controller valve (control valve) that controls operation fluid supplied to the hydraulic device, and a cover (a side cover) that is provided openable/closable state with respect to the machine body and covers the control valve when closed.

A working machine (a backhoe) disclosed in Japanese Unexamined Patent Application Publication No. 2014-190363 is previously known.

The working machine disclosed in Japanese Unexamined Patent Application Publication No. 2014-190363 includes a machine body (a turn base), and a bonnet (a rear cover) provided to be openable and closable with respect to the machine body. A support frame is erected on the rear portion of the machine body, and a latching member is provided on the right rear portion of the support frame. The right side of the bonnet is provided with a latched tool that is latched by the latching member when the hood is closed.

A working machine (a backhoe) disclosed in Japanese Unexamined Patent Application Publication No. 2014-190363 is previously known.

The working machine disclosed in Japanese Unexamined Patent Application Publication No. 2014-190363 includes a machine body (a turn body), a boom mounted at the base end side swingably with respect to the machine body, an arm that is swingably mounted at the distal end side of the boom, and a hydraulic cylinder (a boom cylinder) for swinging the boom, and a hydraulic cylinder (an arm cylinder) for swinging the arm. A pivot member (an arm bracket) for pivotally supporting one end (a rear end) of the arm cylinder is fixed to the upper surface of the boom. A pivot member (a boom bracket) for pivotally supporting one end (a front end) of the boom cylinder is fixed to the lower surface of the boom.

A working machine (a backhoe) disclosed in Japanese Unexamined Patent Application Publication No. 2014-190363 is previously known.

The working machine disclosed in Japanese Unexamined Patent Application Publication No. 2014-190363 includes a machine body (a turn base), a boom pivotally supported by the machine body at the base end side, an arm pivotally supported by the distal end side of the boom, and a hydraulic hose extended from a base end side of the boom to the distal end side. The base end side of the boom is provided with a guide surface for guiding the hydraulic hose, and the guide surface is formed inclining downward toward a pivot shaft that pivotally supports the base end side of the boom.

SUMMARY OF THE INVENTION

A belt tension adjustment device according to one aspect of the present invention, includes: a driving pulley attached to a power transmission shaft; a driven pulley arranged in a driven device; a tension pulley; a loop belt arranged between the driving pulley, the driven pulley, and the tension pulley, and configured to transmit a rotational driving force of the power transmission shaft to the driven device; and a tension adjustment mechanism to adjust tension of the loop belt. The tension adjustment mechanism includes: a support shaft rotatably supported; a rotational operation mechanism to rotate the support shaft about an axis of the support shaft; and a rotating member coupling the support shaft and the tension pulley, configured to change a relative position of the tension pulley with respect to the driving pulley and the driven pulley in accordance with rotating of the support shaft.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Hereinafter, an embodiment of the present invention will be described with reference to the drawings as appropriate.
<Overall Configuration of Working Machine>

First, the overall configuration of the working machine 1 will be described.

Figure 40:
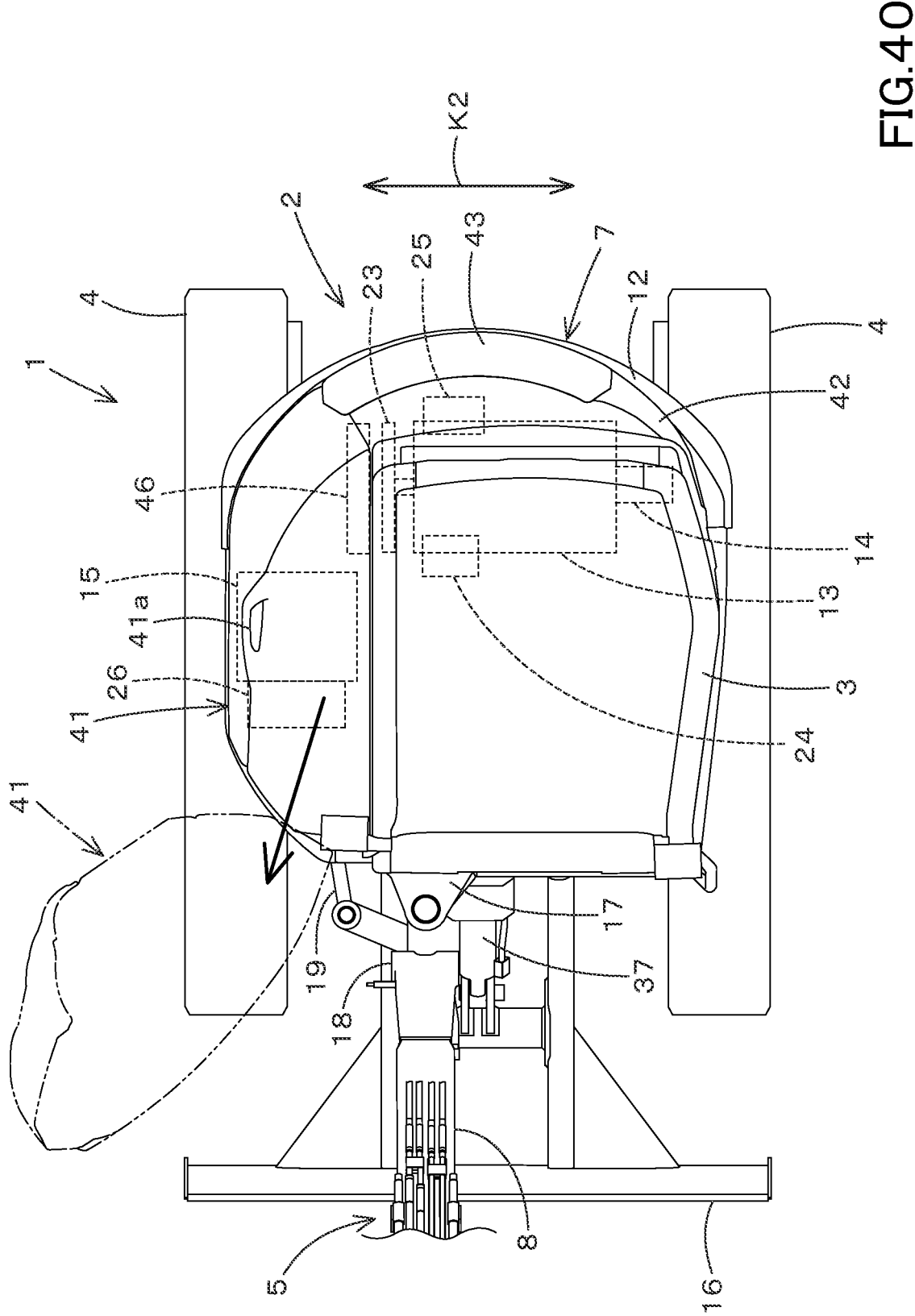
FIG. 40 is a plan view of a working machine according to the embodiment.
Figure 41:
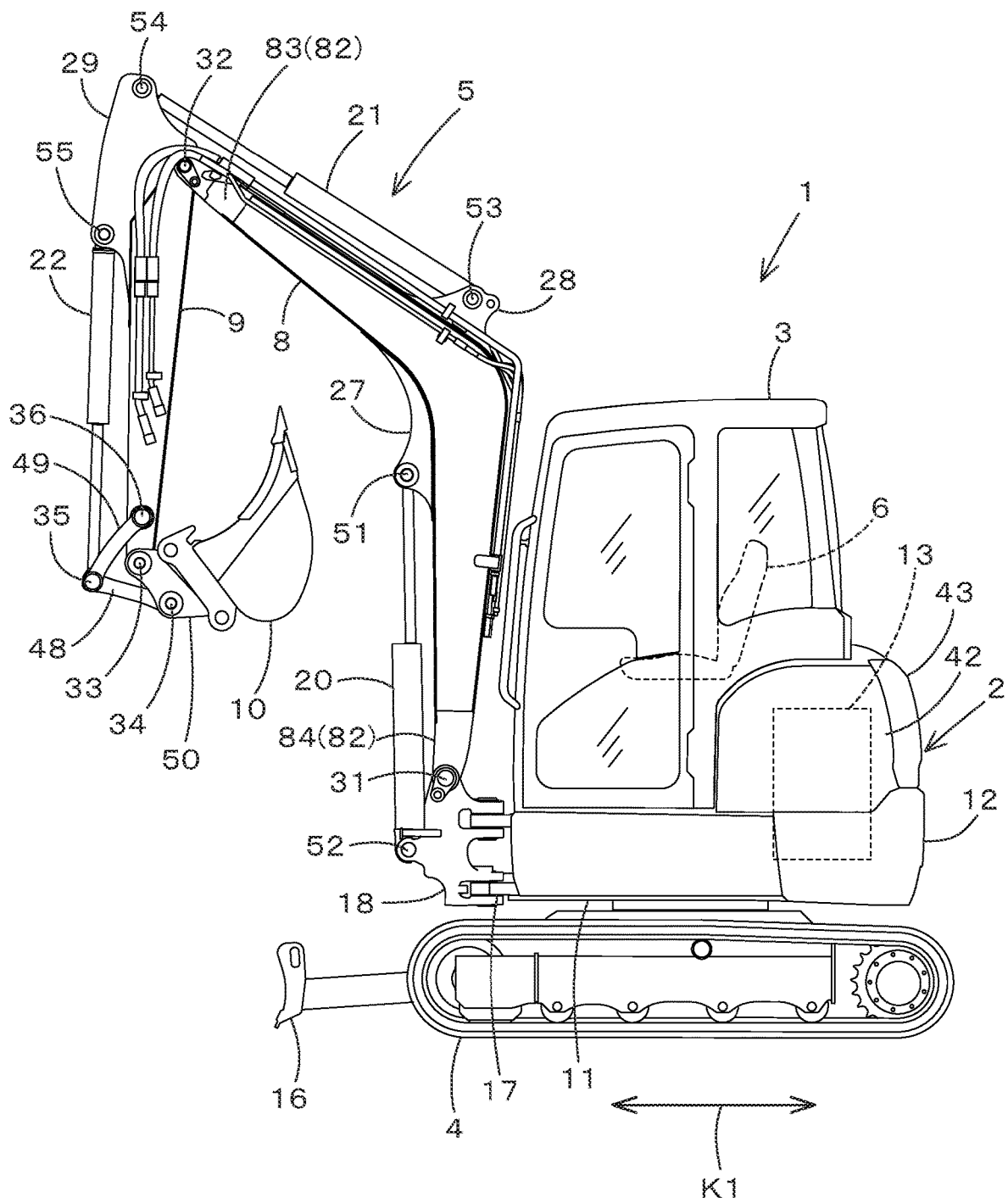
FIG. 41 is a side view of the working machine according to the embodiment.

FIG. 40 and FIG. 41 are schematic views showing the working machine 1 according to the present invention, and illustrate a backhoe that is a turning working machine.

The working machine 1 includes a machine body (swivel base) 2, a cabin 3, a traveling device 4, and a work device 5. Hereinafter, in the embodiments of the present invention, the front side (the left side in FIG. 41) of the operator seated on the operator seat 6 of the working machine 1 is referred to as the front, the rear side of the operator (the right side in FIG. 41) is referred to as the rear, the left side of the operator (the front surface side of FIG. 41) is referred to as the left, and the right side of the operator (the back surface side in FIG. 41) is referred to as the right. Further, the horizontal direction K2 (see FIG. 40), which is a direction orthogonal to the front-rear direction K1 (see FIG. 41), will be described as a machine width direction. In addition, the direction from the center portion of the machine body 2 toward the right portion or the left portion thereof will be described as the machine outward direction. In other words, the machine outward direction is the machine width direction K2 and separates away from the center of the machine body 2 in the width direction. The direction opposite to the machine outward direction will be described as the machine inward direction. In other words, the machine inward direction is the direction of the machine width direction K2 and approaching the center of the machine body 2 in the width direction.

The machine body 2 is supported and operable to turn on the traveling device 4. The machine body 2 has a turn base plate 11 and a weight 12. The turn base plate 11 is supported on the frame of the traveling device 4 via a turning bearing, and turns around the vertical axis (vertical axis) by driving the turning motor. The weight 12 is attached to the rear portion of the machine body 2.

The cabin 3 is mounted on the left side and the front side of the machine body 2. An operator seat 6 is provided inside the cabin 3.

Arranged at the rear of the machine body 2, a prime mover 13, a hydraulic pump 14, a fan 23, an alternator 24, a compressor 25, a radiator 46, and the like. In the present embodiment, the prime mover 13 is an engine, and in this embodiment is a diesel engine. The prime mover 13 may be an engine different from the diesel engine such as a gasoline engine, or may be an electric motor. The prime mover 13 is provided with an output shaft (crankshaft, power transmission shaft) directed in the machine width direction (left side). The hydraulic pump 14 is disposed on the left side of the prime mover 13. The fan 23 is disposed on the right side of the prime mover 13. The alternator 24 is disposed above the right front portion of the prime mover 13 and outputs DC power for charging the battery. The compressor 25 is disposed above the left front portion of the prime mover 13 and compresses the coolant of the air conditioner that cools the cabin 3. The radiator 46 is disposed on the right side of the fan 23 and is cooled by driving the fan 23. The hydraulic pump 14, the fan 23, the alternator 24, and the compressor 25 are driven by the power of the prime mover 13.

A operation fluid tank 15, a control valve 26, and a battery (not shown) are disposed on the right side of the machine body 2. The operation fluid tank 15 stores hydraulic fluid for operating hydraulic device (such as a hydraulic cylinder described later) provided in the machine body 2. The hydraulic fluid stored in the operation fluid tank 15 is delivered to the hydraulic device by driving the hydraulic pump 14. The control valve 26 controls the supply of hydraulic fluid to the hydraulic device.

The traveling device 4 is a crawler-type traveling device, and is provided below the right side and the left side of the machine body 2. A dozer device 16 is provided at the front of the traveling device 4. The dozer device 16 is driven by a dozer cylinder 37.

A support bracket 17 is provided at the front of the machine body 2. A swing bracket 18 is pivotally supported on the support bracket 17. The swing bracket 18 can swing around the vertical axis by driving a swing cylinder 19 mounted on the turn base plate 11. The working device 5 is attached to the swing bracket 19.

As shown in FIG. 41, the working device 5 includes a boom 8, an arm 9, and a working tool 10. In the present embodiment, a bucket is mounted as the working tool 10, but another working tool (hydraulic attachment) can be mounted instead of or in addition to the bucket. Examples of other working tools include a hydraulic breaker, a hydraulic crusher, an angle broom, an earth auger, a pallet fork, a sweeper, a mower, and a snow blower.

Further, the working device 5 includes a boom cylinder 20, an arm cylinder 21, and a working tool cylinder 22 as drive mechanisms (hydraulic actuators) for the boom 8 and the like. The boom cylinder 20, the arm cylinder 21, the working tool cylinder 22, the swing cylinder 19, and the dozer cylinder 37 are composed of hydraulic cylinders.

The base end of the boom 8 is pivotally supported by the swing bracket 18 via the first lateral shaft 31. The boom 8 swings up and down around the first lateral shaft 31 through the expansion and contraction of the boom cylinder 20. The base end portion of the arm 9 is pivotally supported by the distal end portion of the boom 8 via a second lateral shaft (pivot support shaft) 32. The arm 9 swings up and down around the second lateral shaft 32 through the expansion and contraction of the arm cylinder 21.

The working tool 10 is attached to the tip of the arm 9 via the third lateral shaft 33 and the bracket 50. One end of the first link 48 is pivotally supported on the bracket 50 via the fourth lateral shaft 34. One end of the second link 49 is pivotally supported on the other end of the first link 48 via a fifth lateral shaft 35. The other end of the second link 49 is pivotally supported via the sixth lateral shaft 36 in the vicinity of the distal end of the arm 9 and closer to the base end than the third lateral shaft 33. A tip end portion of the working tool cylinder 22 is pivotally supported on the fifth lateral shaft 35. The tip end portion of the working tool cylinder 22 is pivotally supported by a third pivot member 29 provided on the tip end of the arm 9, which will be described later. The working tool 10 performs a squeeze/dump operation through the expansion and contraction of the working tool cylinder 22.

<Overall Configuration of Boom>

Next, the overall configuration of the boom 8 will be described.

Figure 1:
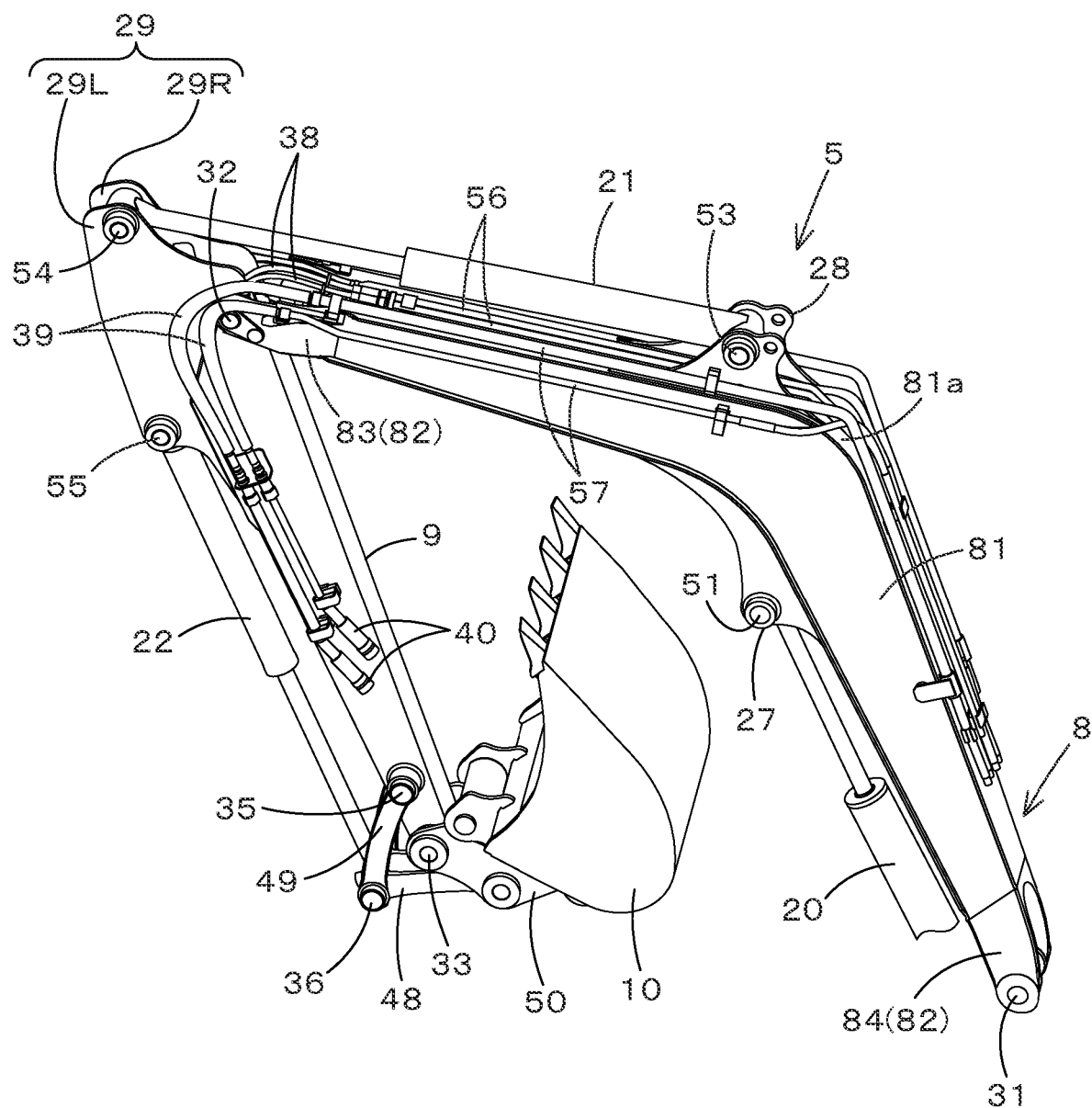
FIG. 1 is a perspective view of a working device according to an embodiment of the present invention.
Figure 2:
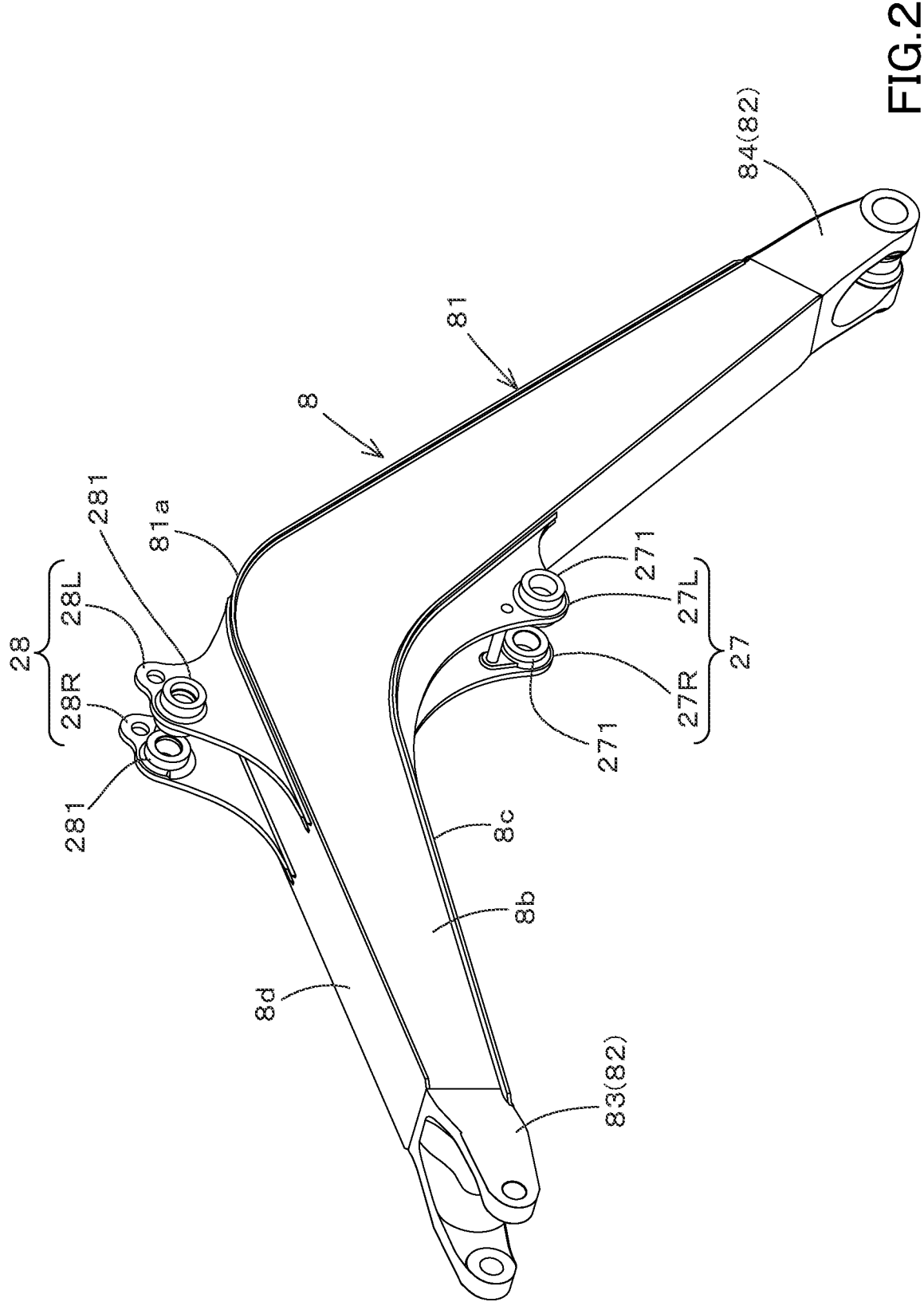
FIG. 2 is a perspective view of a boom according to the embodiment.
Figure 3:
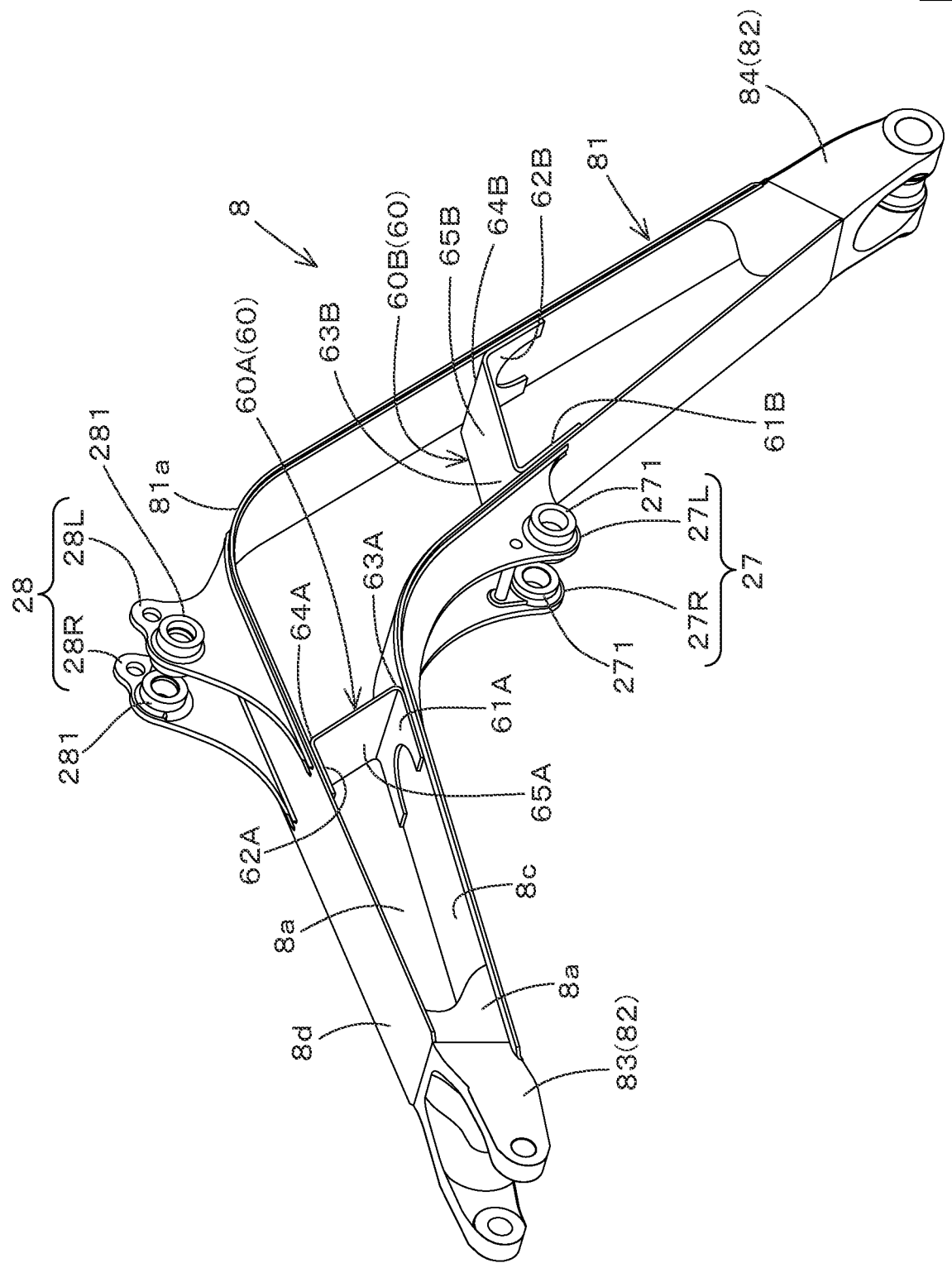
FIG. 3 is a partially-cut perspective view of a reinforcing structure provided inside the boom according to the embodiment.

As shown in FIG. 1 to FIG. 3, the boom 8 has a boom body 81 and a shaft supporting portion 82.

The boom body 81 is bent with the middle portion being convex along the length direction (direction from the tip end toward the distal end). That is, the boom main body 81 has the bent portion 81a in the middle portion in the length direction. The boom body 81 is formed in a substantially rectangular tube shape, and includes a first vertical plate 8a, a second vertical plate 8b, a first lateral plate 8c, and a second lateral plate 8d.

The first vertical plate 8a is located on one side in the machine width direction. The second vertical plate 8b is located on the other side in the machine width direction. The first lateral plate 8c connects the first vertical plate 8a and the second vertical plate 8b on one end in the vertical direction. The second lateral plate 8d connects the first vertical plate 8a and the second vertical plate 8b on the other end in the vertical direction. In this embodiment, the first vertical plate 8a is a right plate, the second vertical plate 8b is a left plate, the first lateral plate 8c is a lower plate, and the second lateral plate 8d is an upper plate. Note that the direction of the boom 8 is based on a state where the boom 8 shown in FIG. 40 and FIG. 41 is not swinging (a state where the boom 8 extends in the front-rear direction).

As shown in FIG. 1 and FIG. 2, the shaft supporting portion 82 includes a front shaft supporting portion 83 and a rear shaft supporting portion 84. As shown in FIG. 1 and FIG. 41, the base end portion of the arm 9 is pivotally supported on the front shaft supporting portion 83 via the second lateral shaft (the pivot shaft) 32. The rear shaft supporting portion 84 is pivotally supported by the swing bracket 18 via the first lateral shaft 31.

The front shaft supporting portion 83 and the rear shaft supporting portion 84 are made of cast steel, for example. The front shaft supporting portion 83 is located at the tip (front end) of the boom 8. In particular, the front shaft supporting portion 83 is fitted into the distal end portion of the boom body 81 and fixed by welding. The rear shaft supporting portion 84 is located at the base end (rear end) of the boom 8. In particular, the rear shaft supporting portion 84 is fitted into the base end portion of the boom body 81 and is fixed by welding.

As shown in FIG. 1 to FIG. 3, the boom 8 is provided with a first pivot member 27 and a second pivot member 28.

The first pivot member 27 is fixed to the outer surface (lower surface) of the first lateral plate 8c in the middle of the boom body 81 in the length direction. In particular, the first pivot member 27 is fixed to the lower surface of the first lateral plate 8c in the bent portion 81a of the boom body 81.

As shown in FIG. 1 and FIG. 41, one end portion (tip portion) of the boom cylinder 20 is pivotally supported on the first pivot member 27 via a pivot shaft (first pivot shaft)

51. The other end (base end) of the boom cylinder 20 is pivotally supported by the swing bracket 18 via a pivot shaft (second pivot shaft) 52.

As shown in FIG. 2, the first pivot member 27 has a right plate 27R and a left plate 27L. The right plate 27R and the left plate 27L are arranged to face each other with an interval in the machine width direction. Each of the right plate 27R and the left plate 27L is provided with a pivot (boss) 271. The pivot 271 supports both ends of the first pivot 51. Accordingly, one end portion (tip portion) of the boom cylinder 20 is pivotally supported on the pivot supporting portion 271 via the first pivot shaft 51.

The second pivot member 28 is fixed to the outer surface (upper surface) of the second lateral plate 8d in the middle of the boom body 81 in the length direction. In particular, the second pivot member 28 is fixed to the upper surface of the second lateral plate 8d in front of the bent portion 81a of the boom body 81. One end (base end) of the arm cylinder 21 is pivotally supported on the second pivot member 28 via a pivot (third pivot) 53.

The second pivot member 28 has a right plate 28R and a left plate 28L. The right plate 28R and the left plate 28L are arranged to face each other with an interval in the machine width direction. A second pivot (boss) 281 is provided on each of the right plate 28R and the left plate 28L. The second pivot 281 supports both ends of the third pivot 53. Accordingly, one end portion (base end portion) of the arm cylinder 21 is pivotally supported on the second pivot portion 281 via the third pivotal shaft 53.

As shown in FIG. 1, a plurality of fluid feeding pipes are fixed to the boom 8 along the length direction of the boom 8. In the present embodiment, a first fluid feeding pipe 56 and a second fluid feeding pipe 57 are provided as a plurality of the fluid feeding pipes. The first fluid feeding pipe 56 includes a delivery pipe through which the operation fluid to be sent to the working tool cylinder 22 is passed, and a return pipe through which the operation fluid returning from the working tool cylinder 22 is passed. The first fluid feeding pipe 56 extends along the upper surface of the boom body 81. The second fluid feeding pipe 57 includes a delivery pipe through which hydraulic fluid delivered to the port 40 passes, and a return pipe through which hydraulic fluid returning from the port 40 passes. The port 40 is a so-called service port, and can be connected to a hydraulic hose that supplies hydraulic fluid to the hydraulic actuator that drives the other working tools described above.

One end of a hydraulic hose (first hydraulic hose) 38 is connected to the tip of the first fluid feeding pipe 56. One end of another hydraulic hose (second hydraulic hose) 39 is connected to the tip of the second fluid feeding pipe 57. The first hydraulic hose 38 and the second hydraulic hose 39 extends from the base end of the boom 8 to the distal end. The other end of the first hydraulic hose 38 is connected to the working tool cylinder 22. The other end of the second hydraulic hose 39 is connected to the service port 40.

A third pivot member 29 is provided on the base end of the arm 9. A pivot (fourth pivot) 54 is supported at the rear of the third pivot member 29. On the fourth pivot 54, the other end portion (tip portion) of the arm cylinder 21 is pivotally supported. A pivot (fifth pivot) 55 is supported on the front portion of the third pivot member 29. One end (base end) of the working tool cylinder 22 is pivotally supported on the fifth pivot 55.

The third pivot member 29 has a right plate 29R and a left plate 29L. The right plate 29R and the left plate 29L are arranged to face each other with an interval in the machine width direction. The right plate 29R supports one side (right side) of the fourth pivot 54 and one side (right side) of the fifth pivot 55. The left plate 29L supports the other side (left side) of the fourth pivot 54 and the other side (left side) of the fifth pivot 55.

<Reinforcing Structure Inside the Boom>

Next, the reinforcing structure inside the boom 8 will be described. In the following description of the reinforcing structure, for the sake of convenience, the boom cylinder 20 is referred to as a first hydraulic cylinder, and the arm cylinder 21 is referred to as a second hydraulic cylinder. However, as shown in a modification example to be described later, the arm cylinder 21 may be a first hydraulic cylinder and the boom cylinder 20 may be a second hydraulic cylinder.

As shown in FIG. 3 to FIG. 6, the boom 8 is provided with a reinforcing plate 60. The reinforcing plate 60 includes a front reinforcing plate 60A and a rear reinforcing plate 60B.

First, the front reinforcing plate 60A will be described with reference to FIG. 3 to FIG. 5.

The front reinforcing plate 60A is provided inside the boom main body 81 at a position closer to the front of the boom main body 81 (in front of the bent portion 81a). As shown in FIG. 4, the front reinforcing plate 60A is provided at a position ahead of the first pivot 51 and the third pivot 53 (the tip end of the boom 8).

The front reinforcing plate 60A includes a first supporting portion 61A, a second supporting portion 62A, a first bent portion 63A, a second bent portion 64A, and a connecting portion 65A. The first supporting portion 61A, the second supporting portion 62A, the first bent portion 63A, the second bent portion 64A, and the connecting portion 65A are integrally formed by bending a single metal plate.

The first support 61A is plate-shaped, and one surface (lower surface) thereof is in contact with the inner surface (upper surface) of the first lateral plate 8c. The second supporting portion 62A thereof is plate-shaped, and one surface (upper surface) is in contact with the inner surface (lower surface) of the second lateral plate 8d.

Both or either one of the first supporting portion 61A and the second supporting portion 62A are fixed to the inner surface of the boom body 81 (the upper surface of the first lateral plate 8c and/or the lower surface of the second lateral plate 8d) by welding or the like. For example, the first supporting portion 61A is welded to inner surfaces of a first vertical plate 8a, a second vertical plate 8b, and a first lateral plate (lower plate) on substantially the entire circumference (including the first bent portion 63A) of the first supporting portion 61A. The second supporting portion 62A is welded to the inner surfaces of the first vertical plate 8a and the second vertical plate 8b, but is not welded to the inner surface of the second lateral plate (upper plate) 8d. However, the welding locations of the first supporting portion 61A and the second supporting portion 62A are not limited to this example.

The width (length in the machine width direction) of the first supporting portion 61A is set to be equal to or greater than the distance between the outer surface (left surface) of the right plate 27R of the first pivot member 27 and the outer surface (right surface) of the left plate 27L. The width (length in the machine width direction) of the second supporting portion 62A is set to be equal to or greater than the distance between the outer surface (left surface) of the right plate 28R of the second pivot member 28 and the outer surface (right surface) of the left plate 28L.

The first bent portion 63A is bent from the first supporting portion 61A toward the second lateral plate 8d. The first bent portion 63A is adjoining to the inner surface of the first lateral plate 8c in a region where it overlaps the first pivot member 27 with the first lateral plate 8c inbetween. In particular, as shown in FIG. 4, the first bent portion 63A is adjoining to the inner surface of the first lateral plate 8c between the end portion (front end portion) 27a of the first pivot member 27 and the pivot supporting portion 271 in the boom length direction, in the region where it overlaps the front portion of the first pivot member 27 with the first lateral plate 8c interposed therebetween.

The first supporting portion 61A extends from the first bent portion 63A along the inner surface of the first lateral plate 8c in a direction away from the pivot supporting portion 271 (a direction away from the first pivot shaft 51). Also, the first supporting portion 61A extends from the first bent portion 63A along the inner surface of the first lateral plate 8c in a direction away from the second pivot portion 281 (a direction away from the third pivotal axis 53). In particular, the first supporting portion 61A extends from the first bent portion 63A to the front (the tip side of the boom 8) along the upper surface of the first lateral plate 8c.

Figure 5:
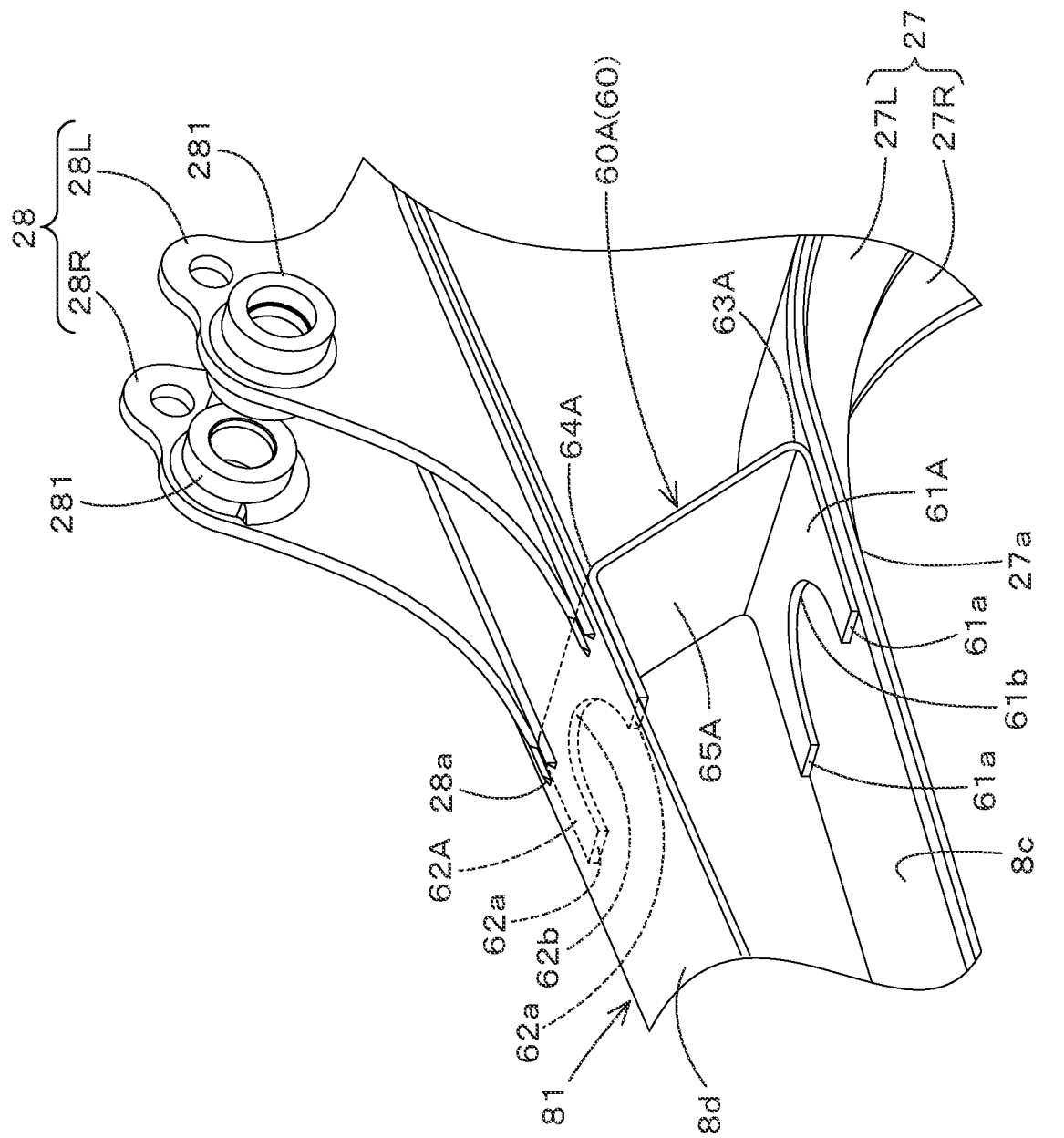
FIG. 5 is an enlarged view illustrating a portion around a front reinforcement plate of FIG. 3.

As shown in FIG. 5, the first supporting portion 61A has an extension length extending from the first bent portion 63A, which varies in the machine width direction. In particular, portions (maximum extension portions) 61a having the maximum extension length from the first bent portion 63A are provided respectively on one side and the other side in the machine width direction, and a portion (minimum extension portion) 61b having the minimum extension length from the first bent portion 63A is provided at the center in the machine width direction. A space between the extension end of the maximum extension portion 61a and the extension end of the minimum extension portion 61b is formed in an arc shape. The maximum extension portion 61a is in contact with the inner surface of the first lateral plate 8c at a position overlapping the left plate 27L and the right plate 27R via the first lateral plate 8a. The minimum extension portion 61b is in contact with the inner surface of the first lateral plate 8c at a position between the left plate 27L and the right plate 27R.

The front end of the first supporting portion 61A (the extension end of the maximum extension portion 61a) is located in front of the front end 27a of the first pivot member 27. The rear end of the first supporting portion 61A (boundary portion with the first bent portion 63A) is located behind the front end 27a of the first pivot member 27. That is, the front end 27a of the first pivot member 27 is located between the front end and the rear end of the first supporting portion 61A in the front-rear direction.

The second bent portion 64A is bent from the second supporting portion 62A toward the first lateral plate 8c. The second bent portion 64A is close to the inner surface of the second lateral plate 8d in a region overlapping the front portion of the second pivot member 28 via the second lateral plate 8d.

Figure 4:
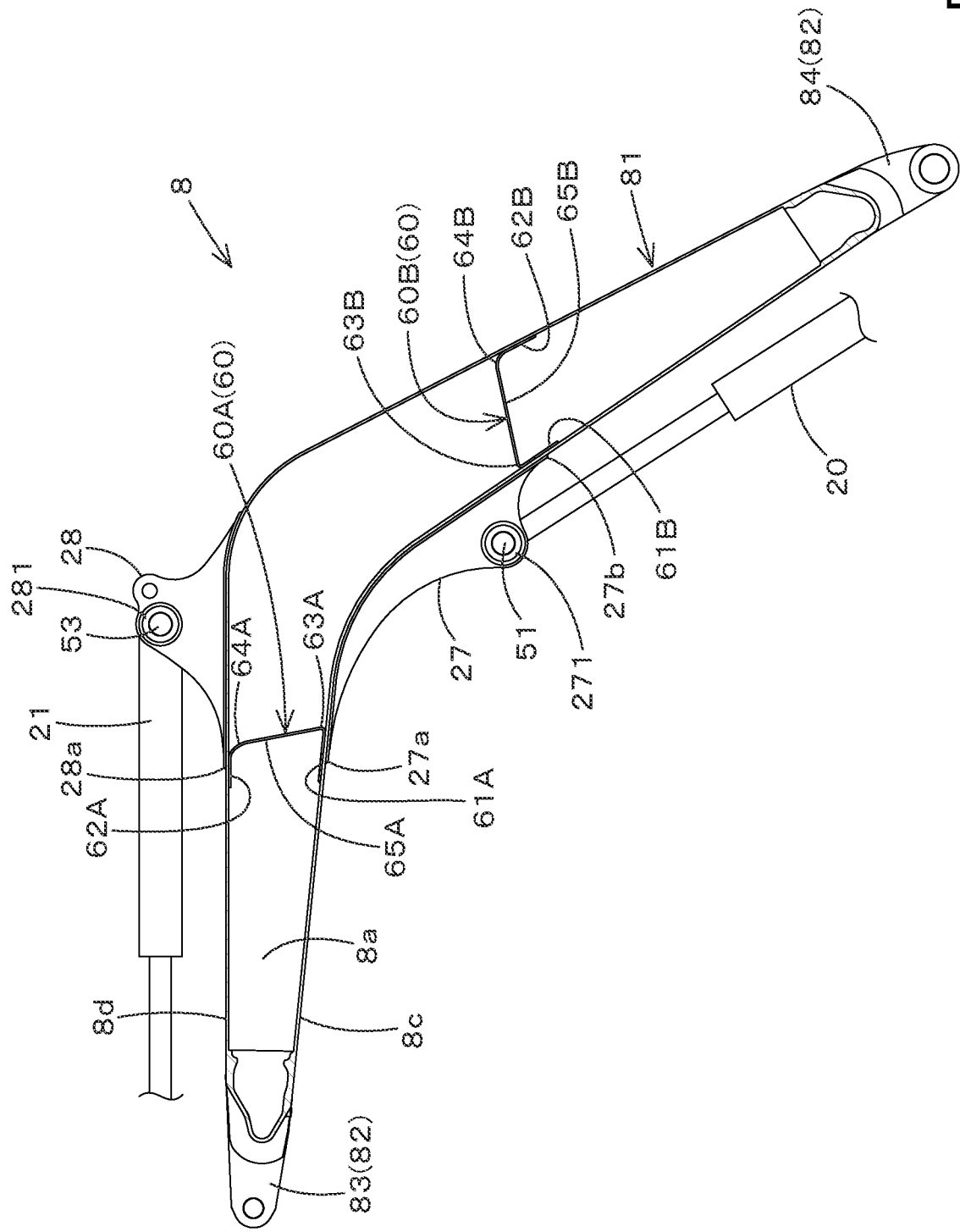
FIG. 4 is a vertical cross-section view illustrating the reinforcing structure provided inside the boom according to the embodiment.

As shown in FIG. 4, the second supporting portion 62A extends from the second bent portion 64A along the inner surface of the second lateral plate 8d in a direction away from the pivot portion 271 (a direction away from the first pivot axis 51). Also, the second supporting portion 62A extends from the second bent portion 64A along the inner surface of the second lateral plate 8d in a direction away from the second pivotal portion 281 (a direction away from the third pivot 53). In particular, the second supporting portion 62A extends forward (towards the tip end of the boom 8) along the lower surface of the second lateral plate 8d from the second bent portion 64A.

As shown in FIG. 5, the extension length of the second supporting portion 62A extending from the second bent portion 64A, which varies in the machine width direction. In particular, portions (maximum extension portions) 62a having the maximum extension length from the second bent portion 64A are provided respectively on one side and the other side in the machine width direction, and a portion (minimum extension portion) 62b having the minimum extension length from the second bent portion 64A is provided at the center in the machine width direction. A space between the extension end of the maximum extension portion 62a and the extension end of the minimum extension portion 62b is formed in an arc shape. The maximum extension portion 62a supports the inner surface of the second lateral plate 8d at a position overlapping the left plate 28L and the right plate 28R via the second lateral plate 8d. The minimum extension portion 62b is in contact with the inner surface of the second lateral plate 8d at a position between the left plate 28L and the right plate 28R.

The front end of the second supporting portion 62A (the extension end of the maximum extension portion 62a) is located in front of the front end 28a of the second pivot member 28. The rear end of the second supporting portion 62A (the boundary portion with the second bent portion 64A) is located behind the front end 28a of the second pivot member 28. That is, the front end of the second pivot member 28 is located between the front end and the rear end of the second supporting portion 62A in the front-rear direction.

The connecting portion 65A connects the first bent portion 63A and the second bent portion 64A. The connecting portion 65A inclines to the front (towards the front end of the boom 8) as it extends from the first supporting portion 61A to the second supporting portion 62A.

Either one of the first bent portion 63A and the second bent portion 64A is bent at an acute angle, and the other one is bent at an obtuse angle. In the present embodiment, the first bent portion 63A is bent at an acute angle, and the second bent portion 64A is bent at an obtuse angle.

Next, the rear reinforcing plate 60B will be described with reference to FIG. 3, FIG. 4, and FIG. 6.

The rear reinforcing plate 60B is provided inside the boom main body 81 at a position closer to the rear of the boom main body 81 (behind the bent portion 81a). As shown in FIG. 4, the rear reinforcing plate 60B is provided at a position rearward of the first pivot 51 and the third pivot 53 (the base end of the boom 8).

The rear reinforcing plate 60B includes a first supporting portion 61B, a second supporting portion 62B, a first bent portion 63B, a second bent portion 64B, and a connecting portion 65B. The first supporting portion 61B, the second supporting portion 62B, the first bent portion 63B, the second bent portion 64B, and the connecting portion 65B are integrally formed by bending a single metal plate.

The first supporting portion 61B is plate-shaped, and one surface (lower surface) is in contact with the inner surface (upper surface) of the first lateral plate 8c. The second supporting portion 62B is plate-shaped, and one surface (upper surface) is in contact with the inner surface (lower surface) of the second lateral plate 8d.

Both or either one of the first supporting portion 61B and the second supporting portion 62B are fixed to the inner surface of the boom body 81 (the upper surface of the first lateral plate 8c and/or the lower surface of the second lateral plate 8d) by welding or the like.

The first bent portion 63B is bent from the first supporting portion 61B toward the second lateral plate 8d. The first bent portion 63B is close to the inner surface of the first lateral plate 8c in a region where it overlaps the rear portion of the first pivot member 27 with the first lateral plate 8a interposed therebetween.

As shown in FIG. 4, the first supporting portion 61B extends from the first bent portion 63B along the inner surface of the first lateral plate 8c in a direction away from the pivot portion 271 (a direction away from the first pivot axis 51). In particular, the first supporting portion 61B extends rearward (to the base end of the boom 8) along the upper surface of the first lateral plate 8c from the first bent portion 63B.

Figure 6:
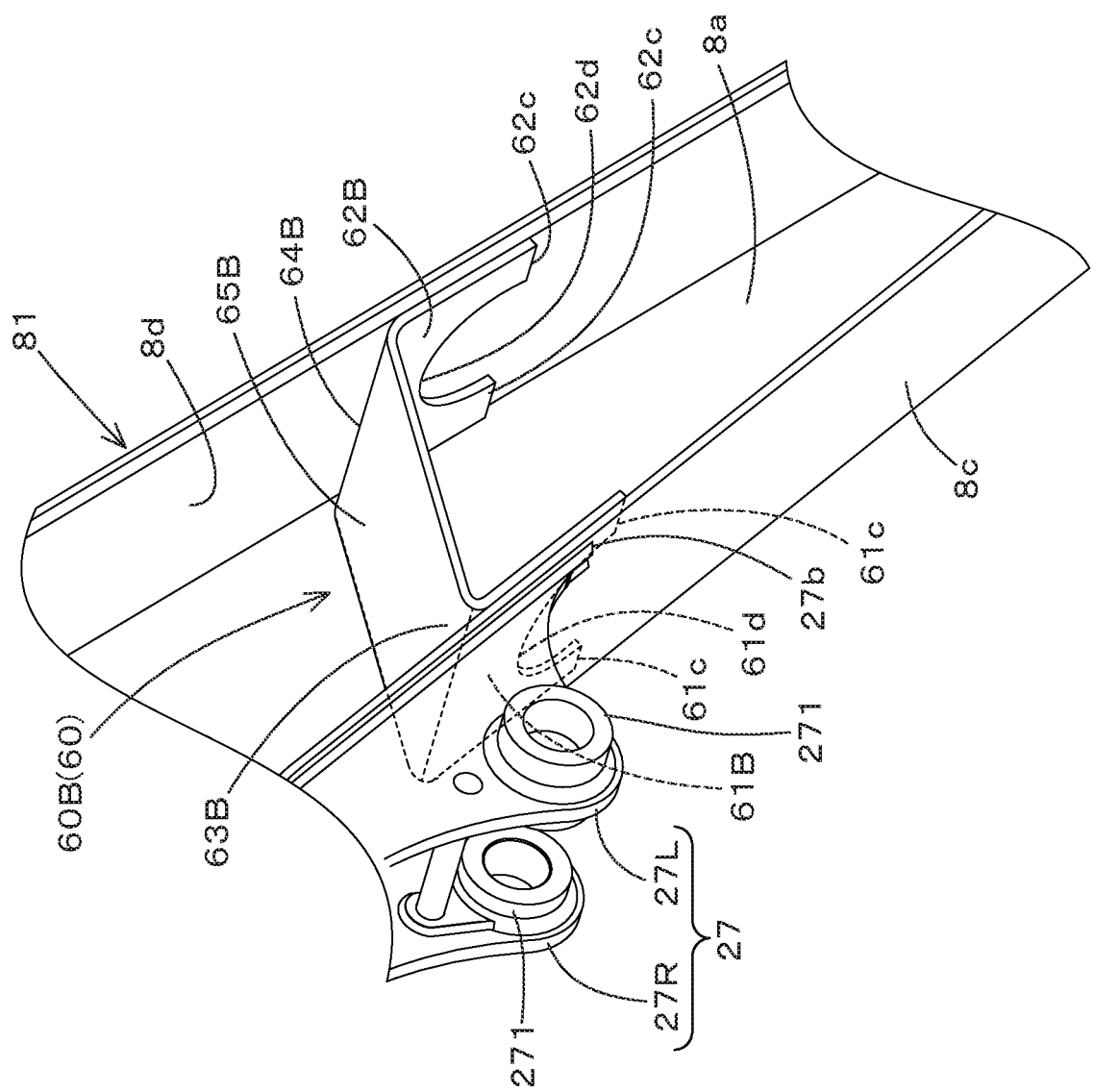
FIG. 6 is an enlarged view illustrating a portion around a rear reinforcement plate of FIG. 3.

As shown in FIG. 6, the first supporting portion 61B has an extension length from the first bent portion 63B, which varies in the machine width direction. In particular, portions (maximum extension portions) 61c having the maximum extension length from the first bent portion 63B are provided respectively on one side and the other side in the machine width direction, and a portion (minimum extension portion) 61d having a minimum extension length from the first bent portion 63B is provided at the center in the machine width direction. A space between the extension end of the maximum extension portion 61c and the extension end of the minimum extension portion 61d is formed in an arc shape. The maximum extension portion 61c is in contact with the inner surface of the first lateral plate 8c at a position overlapping the left plate 27L and the right plate 27R via the first lateral plate 8c. The minimum extension portion 61d is in contact with the inner surface of the first lateral plate 8c at a position between the left plate 27L and the right plate 27R.

The rear end of the first supporting portion 61B (the extension end of the maximum extension portion 61a) is located behind the rear end 27b of the first pivot member 27. The front end of the first supporting portion 61B (the boundary portion with the first bent portion 63B) is located in front of the rear end 27b of the first pivot member 27. That is, the rear end 27b of the first pivot member 27 is located between the front end and the rear end of the first supporting portion 61B in the front-rear direction.

The second bent portion 64B is bent from the second supporting portion 62B toward the first lateral plate 8c side. The second bent portion 64A is close to the inner surface of the second lateral plate 8d.

The second supporting portion 62B extends from the second bent portion 64B along the inner surface of the second lateral plate 8d in a direction away from the pivot portion 271 (a direction separating away from the first pivotal axis 51). In particular, the second supporting portion 62B extends rearward (to the base end of the boom 8) from the second bent portion 64B along the lower surface of the second lateral plate 8d.

As shown in FIG. 6, the extension length extending from the second bent portion 64B of the second supporting portion 62B, which varies in the machine width direction. In particular, portions (maximum extension portions) 62c having the maximum extension length from the second bent portion 64B are provided respectively on one side and the other side in the machine width direction, and a portion (minimum extension portion) 62d having the minimum extension length from the second bent portion 64B is provided at the center in the machine width direction. A space between the extension end of the maximum extension portion 62c and the extension end of the minimum extension portion 62d is formed in an arc shape.

The connecting portion 65B connects the first bent portion 63B and the second bent portion 64B. The connecting portion 65B inclines rearward (the base end of the boom 8) as it extends from the first supporting portion 61B toward the second supporting portion 62B. Accordingly, the connecting portion 65A leans forward as it extends from the first supporting portion 61A to the second supporting portion 62A, and the connecting portion 65B leans backward as it extends from the first supporting portion 61B to the second supporting portion 62B. Thus, the entire bending deformation of the boom 8 can be effectively prevented by the front reinforcing plate 60A arranged in front of the bent portion 81a and the rear reinforcing plate 60B arranged behind the bent portion 81a.

Either one of the first bent portion 63B and the second bent portion 64B is bent at an acute angle, and the other one is bent at an obtuse angle. In the present embodiment, the first bent portion 63B is bent at an acute angle, and the second bent portion 64B is bent at an obtuse angle. This increases the strength of the reinforcement plate 60 significantly in the first bent portion 63A, so that the reinforcement effect can be improved. Further, since one of the first bent portion 63A and the second bent portion 64A is bent at an acute angle and the other one is bent at an obtuse angle, even when the first pivot member 27 is spaced away from the second pivot member 28 in the boom length direction, the first lateral plate 8c and the second lateral plate 8d can be effectively reinforced by the single reinforcing plate 60.

In the above-described embodiment, the first lateral plate 8c is the lower plate and the second lateral plate 8d is the upper plate. However, the first lateral plate 8c may be the upper plate and the second lateral plate 8d may be the lower plate. In this case, the pivot member fixed to the outer surface (upper surface) of the upper plate is the first pivot member 27, and the pivot member fixed to the outer surface (lower surface) of the lower plate is the second pivot member 28. Further, the arm cylinder 21 is a first hydraulic cylinder, and the boom cylinder 20 is a second hydraulic cylinder. The reinforcing plate 60 has a configuration in which the first supporting portion 61A abuts on the inner surface of the upper plate and the second supporting portion 62A abuts on the inner surface of the lower plate.

In the embodiment described above, the reinforcing plate 60 (the front reinforcing plate 60A and the rear reinforcing plate 60B) includes the first supporting portion 61A, the second supporting portion 62A, the first bent portion 63B, the second bent portion 64B, and the connecting portion 65B. However, the reinforcement plate 60 should just have the first supporting portion 61A and the first bent portion 63B. That is, the reinforcing plate 60 may be a plate bent in a substantially L shape. Hereinafter, a modification example of the case where the front reinforcing plate 60A is a plate bent in a substantially L shape will be described. The description of the rear reinforcing plate 60B is omitted, but a modification example similar to that of the front reinforcing plate 60A can be adopted.

Figure 7:
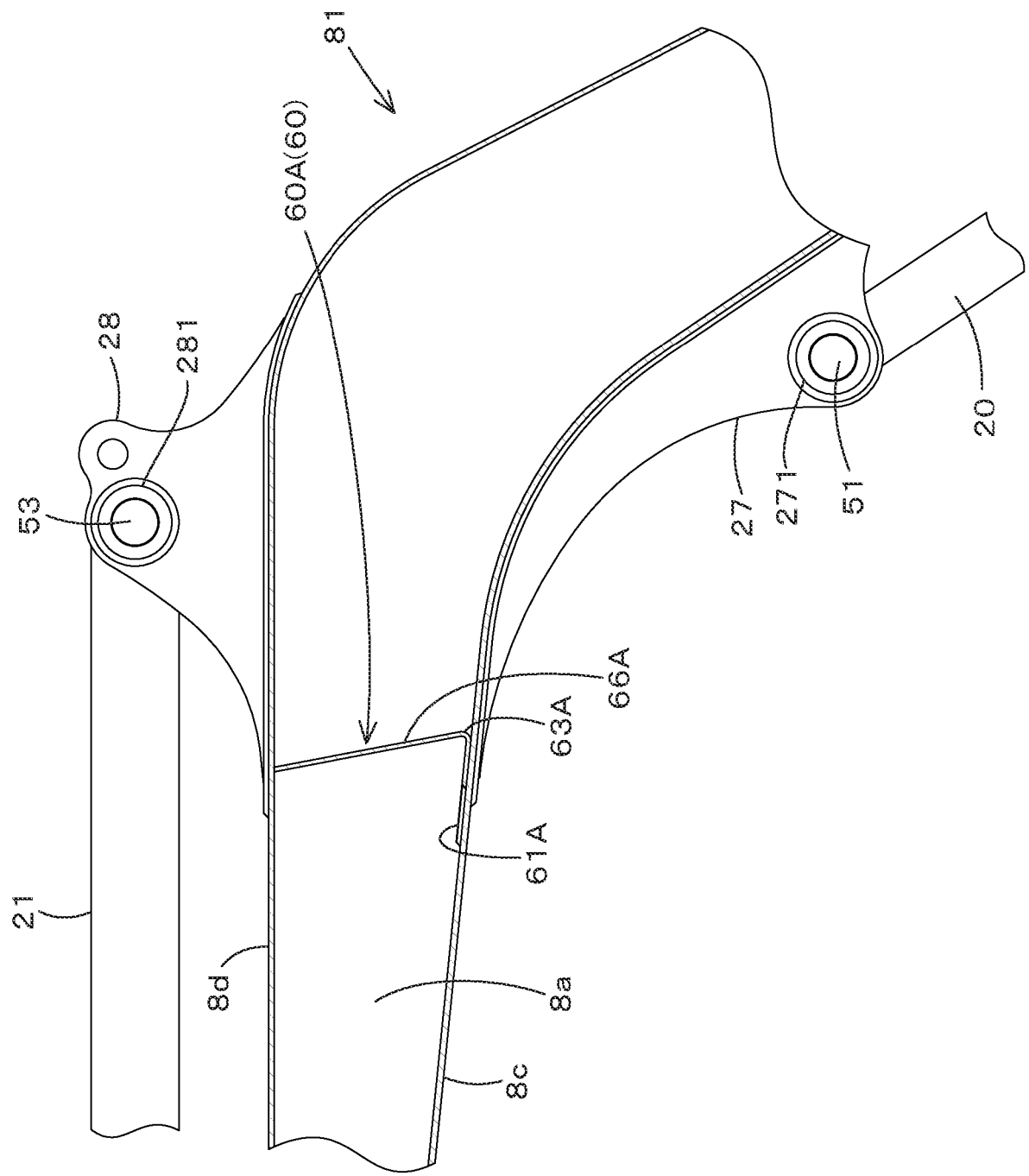
FIG. 7 is a vertical cross-section view illustrating a modified example of a reinforcement plate according to the embodiment.
Figure 8:
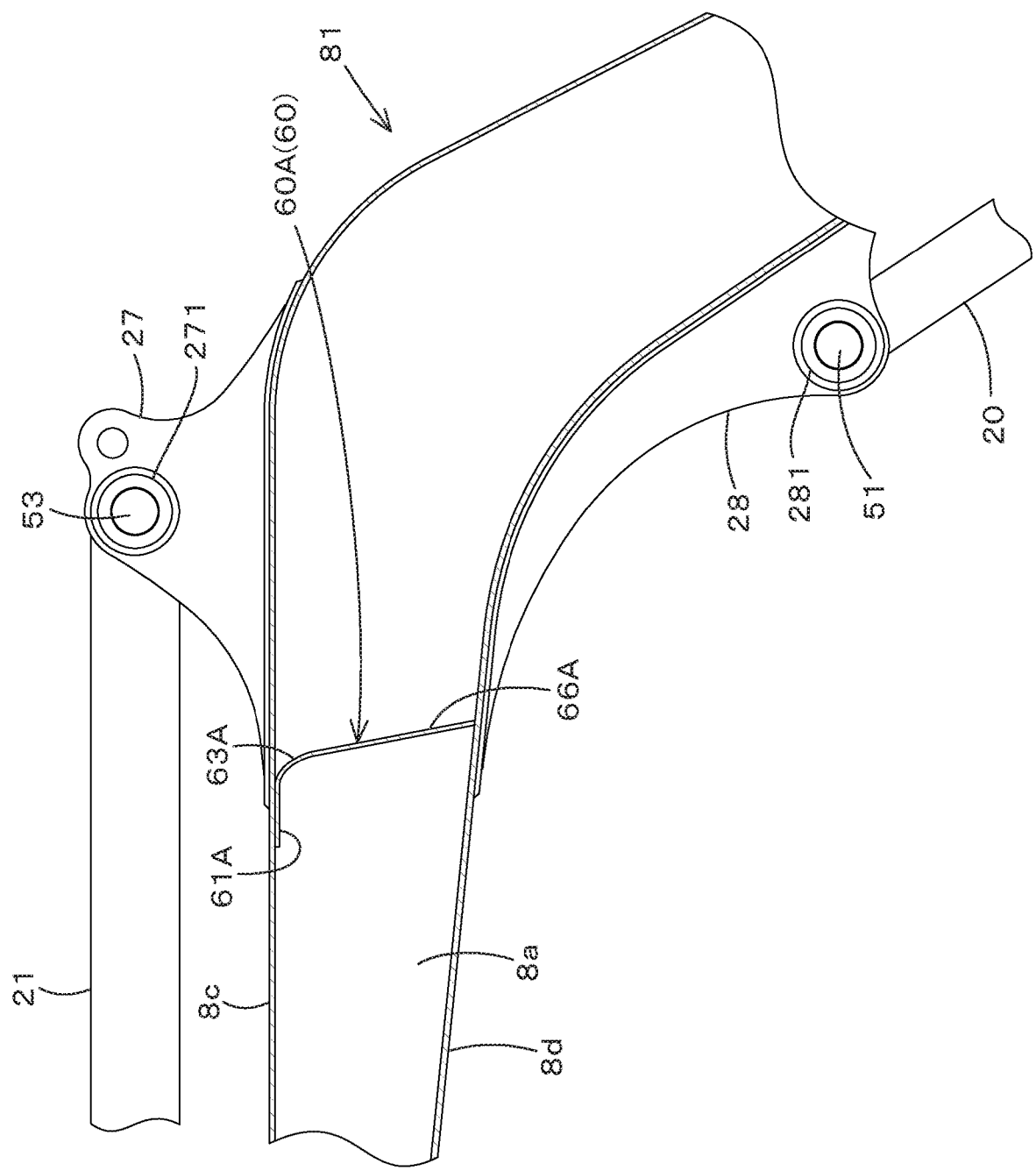
FIG. 8 is a vertical cross-section view illustrating another modified example of the reinforcement plate according to the embodiment.

FIG. 7 and FIG. 8 show a modification example of the case where the front reinforcing plate 60A is a plate bent in a substantially L shape. The front reinforcing plate 60A in these modification examples is composed of a first supporting portion 61A, a first bent portion 63A, and a first extending portion 66A.

In the modification example (first modification example) shown in FIG. 7, the first lateral plate 8c is the lower plate and the second lateral plate 8d is the upper plate. In the first modification, the first supporting portion 61A is in contact with the inner surface (upper surface) of the first lateral plate (lower plate) 8c. The first supporting portion 61A is fixed to the inner surface of the first lateral plate 8c by welding or the like. The first bent portion 63A is bent to extend from the first supporting portion 61A toward the second lateral plate (upper plate) 8d, and is close to the inner surface of the first lateral plate 8c in a region overlapping the front portion of the first pivot member 27 with the first lateral plate 8c interposed therebetween. The first bent portion 63A is bent at an acute angle. The first supporting portion 61A extends from the first bent portion 63A along the inner surface of the first lateral plate 8c in a direction away from the pivot supporting portion 271 (a direction away from the first pivot shaft 51). The first extending portion 66A extends from the first bent portion 63A toward the second lateral plate 8d and contacts the inner surface (lower surface) of the second lateral plate 8d. The first extending portion 66A may be connected to the inner surface of the second lateral plate 8d by welding or the like.

In the modification example (second modification example) shown in FIG. 8, the first lateral plate 8c is an upper plate and the second lateral plate 8d is a lower plate. Further, the pivot member fixed to the outer surface (upper surface) of the first lateral plate 8c is the first pivot member 27, and the pivot member fixed to the outer surface (lower surface) of the second lateral plate 8d is the second pivot member 28. The arm cylinder 21 is a first hydraulic cylinder and the boom cylinder 20 is a second hydraulic cylinder.

In the second modification example, the first supporting portion 61A is in contact with the inner surface (lower surface) of the first lateral plate (upper plate) 8c. The first supporting portion 61A is fixed to the inner surface of the first lateral plate 8c by welding or the like. The first bent portion 63A is bent from the first supporting portion 61A toward the second lateral plate (lower plate) 8d and is close to the inner surface of the first lateral plate 8c in a region overlapping the front portion of the first pivot member 27 with the first lateral plate 8c interposed therebetween. The first bent portion 63A is bent at an obtuse angle. The first supporting portion 61A extends from the first bent portion 63A along the inner surface of the first lateral plate 8c in a direction away from the second pivot portion 281 (a direction away from the third pivotal axis 53). The first extending portion 66A extends from the first bent portion 63A toward the second lateral plate 8d and contacts the inner surface of the second lateral plate 8d. The first extending portion 66A may be connected to the inner surface of the second lateral plate 8d by welding or the like.

<Tip Shape of Boom>

Next, the tip shape of the boom 8 will be described with reference to FIG. 9 to FIG. 13.

The front shaft supporting portion 83 provided on the distal end of the boom 8 includes a first bearing portion 85, a second bearing portion 86, and a connecting portion 87.

The first bearing portion 85 extends forward from the tip of the boom body 81 on one side (right side) in the machine width direction. The second bearing portion 86 extends forward from the tip of the boom body 81 on the other side (left side) in the machine width direction. The first bearing portion 85 supports one side (right side) of the second lateral shaft (pivot shaft) 32. The second bearing portion 86 supports the other side (left side) of the second lateral shaft 32.

The connecting portion 87 connects the first bearing portion 85 and the second bearing portion 86. In particular, the connecting portion 87 connects the rear portion of the inner surface (left surface) of the first bearing portion 85 and the rear portion of the inner surface (right surface) of the second bearing portion 86. In other words, the first bearing portion 85 and the second bearing portion 86 are bifurcated from the connecting portion 87 and extend forward.

Figure 9:
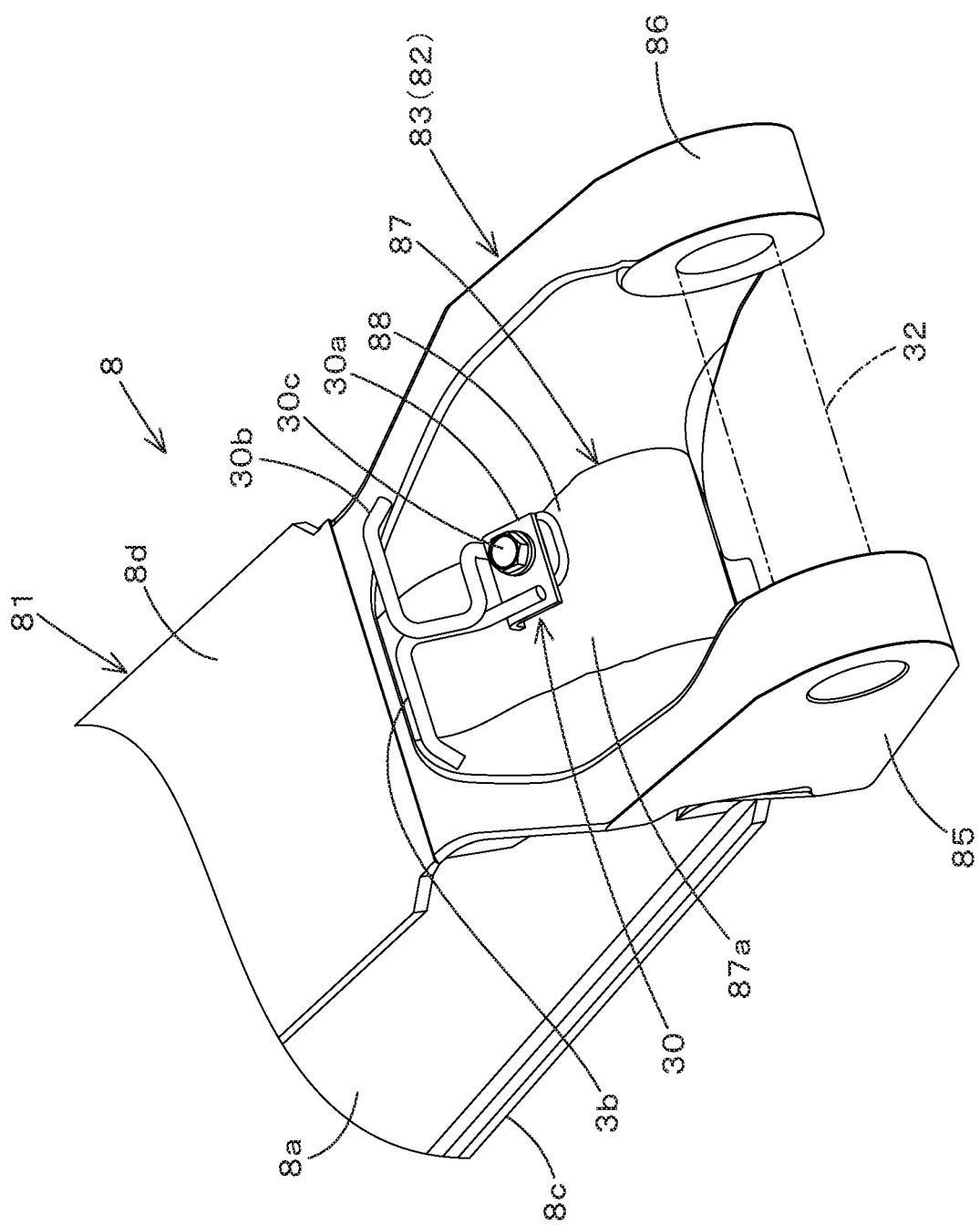
FIG. 9 is an upper perspective view illustrating a tip end portion of the boom according to the embodiment.
Figure 11:
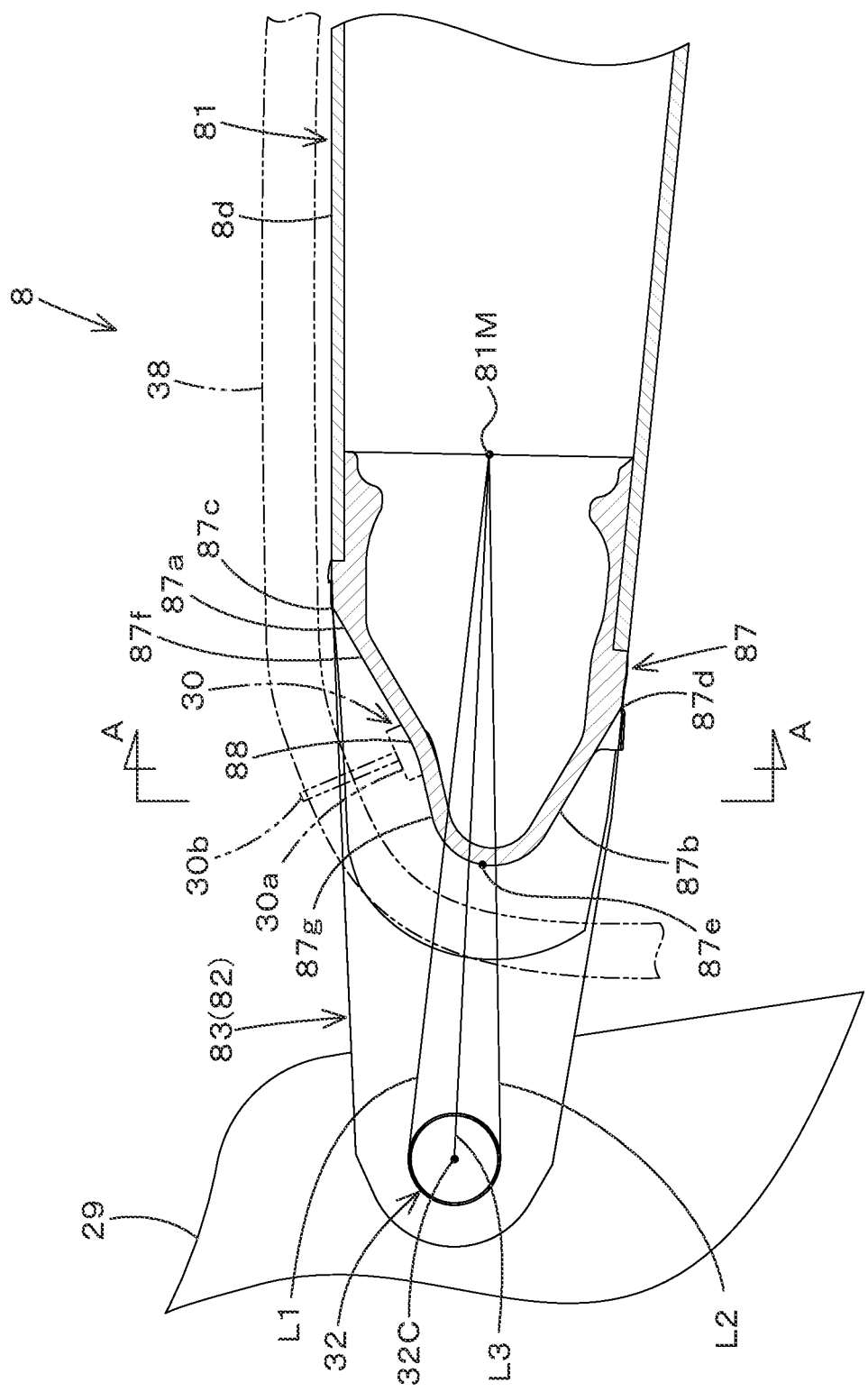
FIG. 11 is a vertical cross-section view of the tip end portion of the boom at the center in a machine width direction according to the embodiment.
Figure 12:
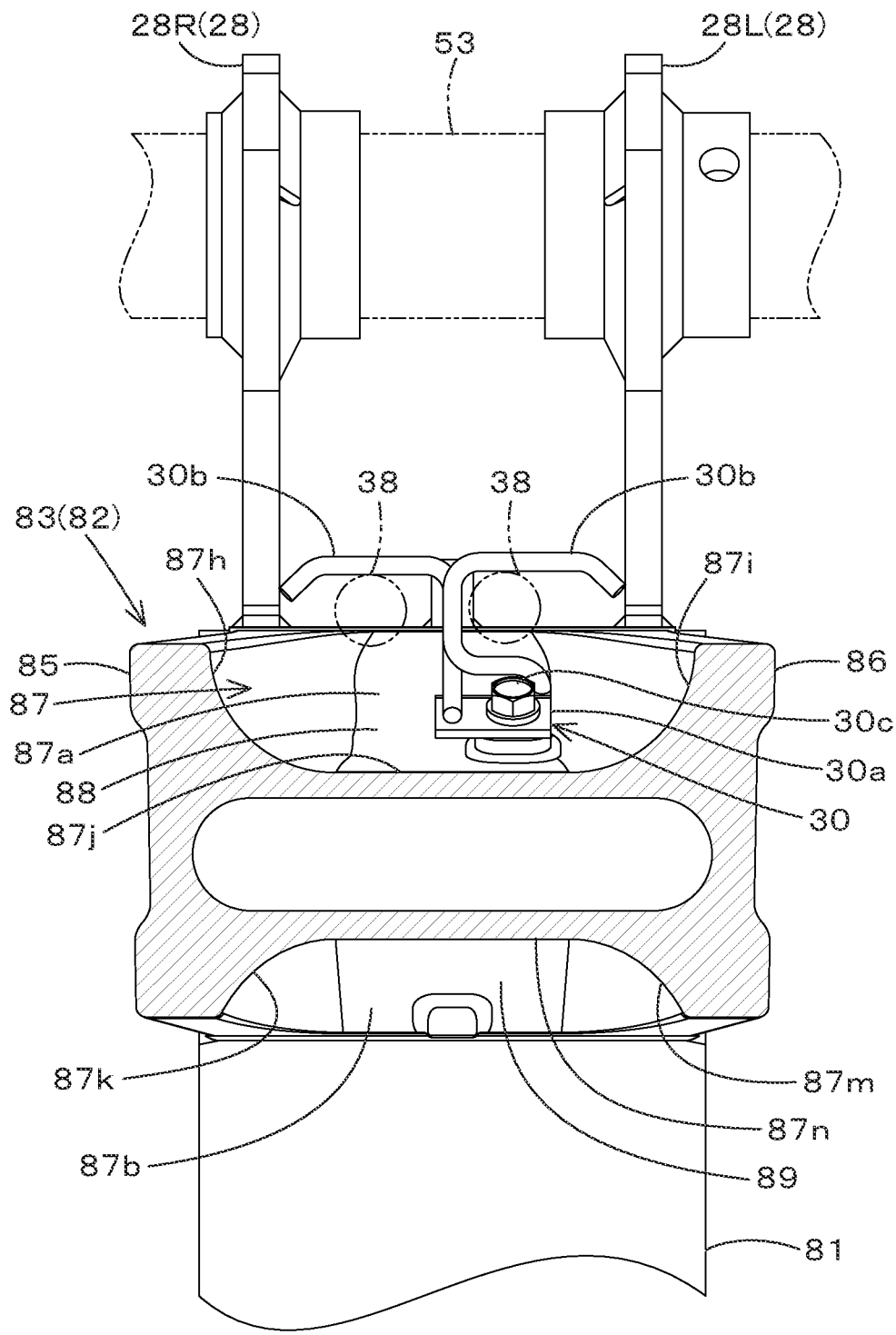
FIG. 12 is a lateral cross-section view of FIG. 11 in an A-A position according to the embodiment.

As shown in FIG. 9, FIG. 11, and FIG. 12, the upper surface 87a of the connecting portion 87 is formed as an inclined surface that shifts downward as it extends forward. A first concave portion 88 that is recessed downward (toward the lower surface 87b) is formed on the upper surface 87a of the connecting portion 87. In other words, the first concave portion 88 is formed on the upper surface 87a which is an inclined surface. As shown in FIG. 11, the first concave portion 88 is recessed in a direction (front-rear direction) from the tip end of the boom 8 toward the distal end thereof. Further, as shown in FIG. 12, the first concave portion 88 is also recessed in the width direction (machine width direction) from the first bearing portion 85 toward the second bearing portion 86.

As shown in FIG. 11, since the first concave portion 88 is provided, the upper surface 87a has a first inclining portion 87f having a larger (steep) inclination in the front-rear direction, and has a second inclining portion 87g having a smaller (gradual) inclination than that of the first inclining portion 87f. Both the first inclining portion 87f and the second inclining portion 87g are inclined with respect to the extending direction (length direction) of the boom 8.

Also, as shown in FIG. 12, the upper surface 87a has, on one side, a first curved surface 87h that lowers toward the other side and has, on the other side, a second curved surface 87i that lowers toward the other side in the machine width direction, and a flat surface 87j connecting the first curved surface 87e and the second curved surface 87f at the center.

The first concave portion 88 is provided with a holding portion 30 that holds the first hydraulic hose 38. As shown in FIG. 11 and FIG. 12, the holding portion 30 is attached to the bottom (the most recessed portion) of the recess of the first concave portion 88. In particular, as shown in FIG. 11, the holding portion 30 is attached to a boundary portion between the first inclining portion 87f and the second inclining portion 87g in the front-rear direction. Moreover, as shown in FIG. 12, the holding portion 30 is positioned on the flat surface 87j in the machine width direction.

Figure 13:
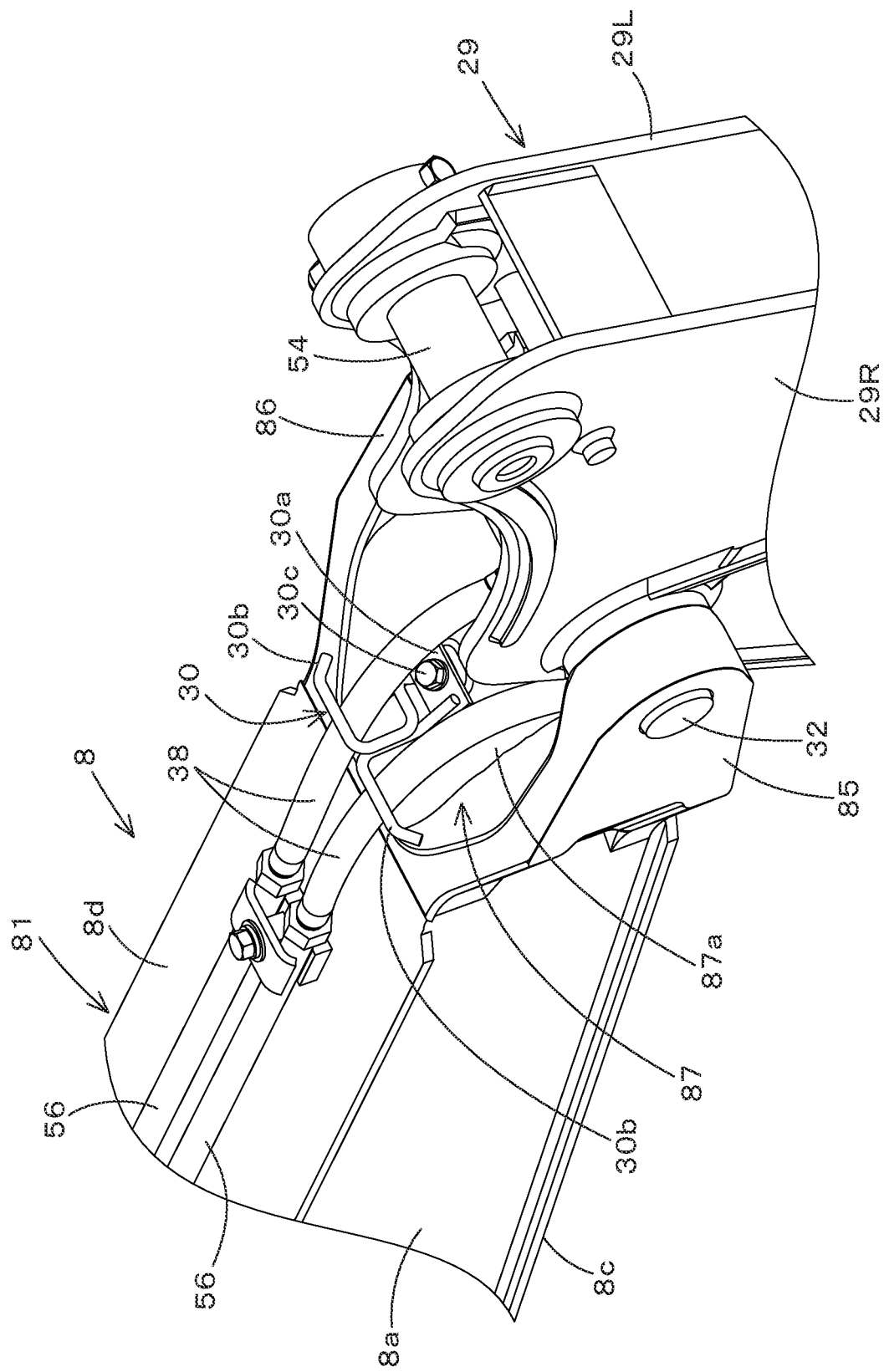
FIG. 13 is a perspective view illustrating the tip end portion of the boom and a base end portion of an arm according to the embodiment.

The holding portion 30 includes a base plate 30a and a holding body 30b. The base plate 30a is fixed to the first concave portion 88 by a fixture (bolt) 30c. As shown in FIG. 11 to FIG. 13, the holding body 30b holds the first hydraulic hose 38 in the vicinity of the first concave portion 88 by pressing the first hydraulic hose 38 from above (restricting the upward movement). In the case of the present embodiment, the holding portion 30 holds two hydraulic hoses, but may hold three or more hydraulic hoses.

Figure 10:
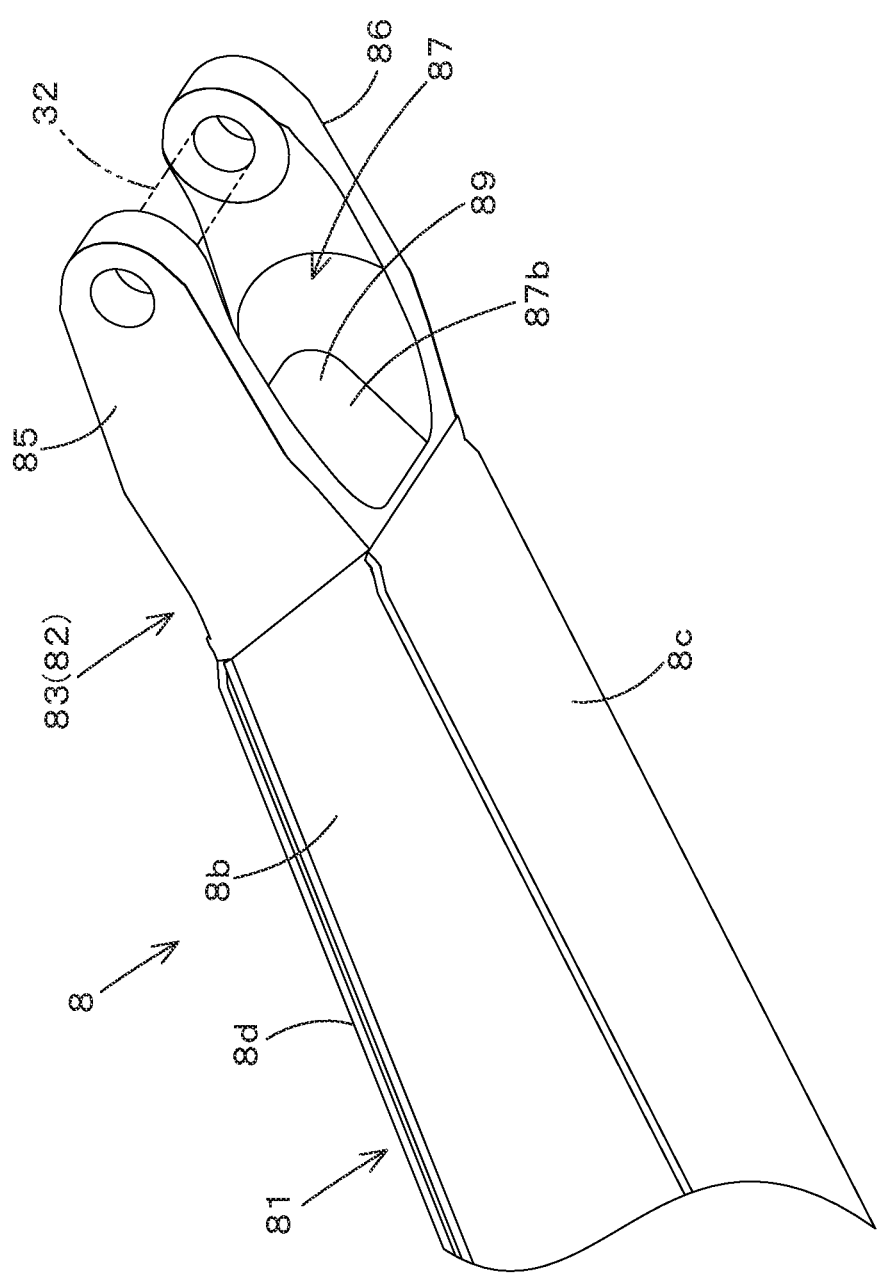
FIG. 10 is a lower perspective view illustrating the tip end portion of the boom according to the embodiment.

As shown in FIG. 10 and FIG. 11, the lower surface 87b of the connecting portion 87 is formed as an inclined surface that is inclined with respect to the extending direction (length direction) of the boom 8. In particular, the lower surface 87b is formed as an inclined surface that shifts upward as it extends forward. The inclined surface is formed with a second concave portion 89 that is recessed upward (toward the upper surface 87a) in the machine width direction. As shown in FIG. 12, the second concave portion 89 is arranged so as to define the lower surface 87b, on one side, a third curved surface 87k that lowers toward the other side in the machine width direction, on the other side, a fourth curved surface 87m that lowers toward one side, and, in the center, a flat surface 87n which connects the third curved surface 87k and the fourth curved surface 87m.

As shown in FIG. 11, the rear end portion 87c of the inclined surface formed on the upper surface 87a of the connecting portion 87 is located behind the rear end portion 87d of the inclined surface formed on the lower surface 87b of the connecting portion 87. In other words, the inclination angle of the upper surface 87*a* (inclination angle with respect to the upper surface of the boom body 81) is formed more gently than the inclination angle of the lower surface 87*b* (inclination angle with respect to the lower surface of the boom body 81). However, the inclination angle of the upper surface 87*a* and the inclination angle of the lower surface 87*b* may be designed to be same.

As shown in FIG. 11, the connecting portion 87 extends forward near the middle between the first bearing portion 85 and the second bearing portion 86 in the vertical direction. The front end 87*e* of the connecting portion 87 is positioned below a first straight line (virtual straight line) L1 that connects the upper end of the second lateral shaft (pivot support shaft) 32 and the midpoint 81M of the rear end of the front shaft supporting portion 83 in the vertical direction. Further, the front end 87*e* of the connecting portion 87 is located above a second straight line (virtual straight line) L2 connecting the lower end of the second lateral shaft 32 and the midpoint 81M. Further, the front end 87*e* of the connecting portion 87 is located below a third straight line (virtual straight line) L3 that connects the axial center 32C of the second lateral shaft 32 and the midpoint 81M of the rear end of the front shaft supporting portion 83 in the vertical direction. However, the front end 87*e* of the connecting portion 87 may be located on the third straight line L3, not below the third straight line L3, or may be located above the third straight line L3.

As shown in FIG. 11 and FIG. 13, the first hydraulic hose 38 extending forward along the upper surface of the boom body 81 (the upper surface of the second lateral plate 8*d*) is held by the holding portion 30. This allows the first hydraulic hose 38 to be guided forward and downward (obliquely forward and downward) along the upper surface 87*a* of the connecting portion 87. The first hydraulic hose 38 guided along the upper surface 87*a* of the connecting portion 87 passes between the front end 87*e* of the connecting portion 87 and the second lateral shaft 32, and is connected to the working tool cylinder 22 after being guided to the left plate 29L and the right plate 29R of the third pivot member 29.

In the case of the present embodiment, the first hydraulic hose 38 is guided along the upper surface 87*a* of the connecting portion 87, but because a sufficient space is secured above the connecting portion 87 by the first concave portion 88, in addition to the first hydraulic hose 38, the second hydraulic hose 39 may be also guided along the upper surface 87*a*. The second hydraulic hose 39 may be arranged outside of the front shaft supporting portion 83 (the machine outward) (see FIG. 1), or arranged along the upper surface 87*a* of the connecting portion 87. Further, in the present embodiment, the connecting portion 87 has a recess on both the upper surface 87*a* and the lower surface 87*b*, but it is only necessary to have a recess on at least one the upper surface 87*a* and the lower surface 87*b*. That is, a structure which has a recessed portion only in the upper surface 87*a* may be employed, or a structure which has a recessed portion only in the lower surface 87*b* may be employed.

<Supporting Structure of Cover>

Figure 14:
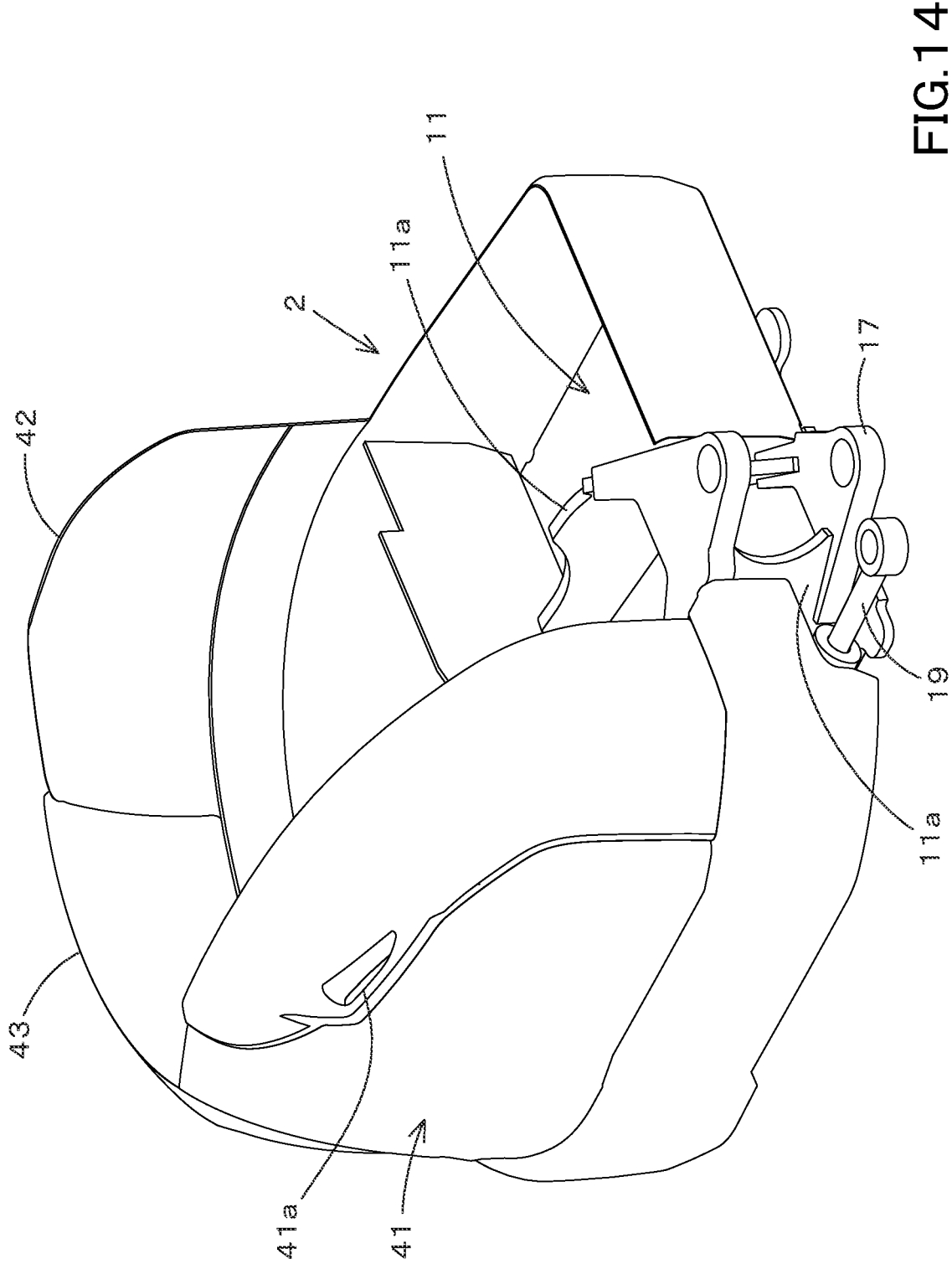
FIG. 14 is a perspective view of a machine body seen from the right front according to the embodiment.
Figure 15:
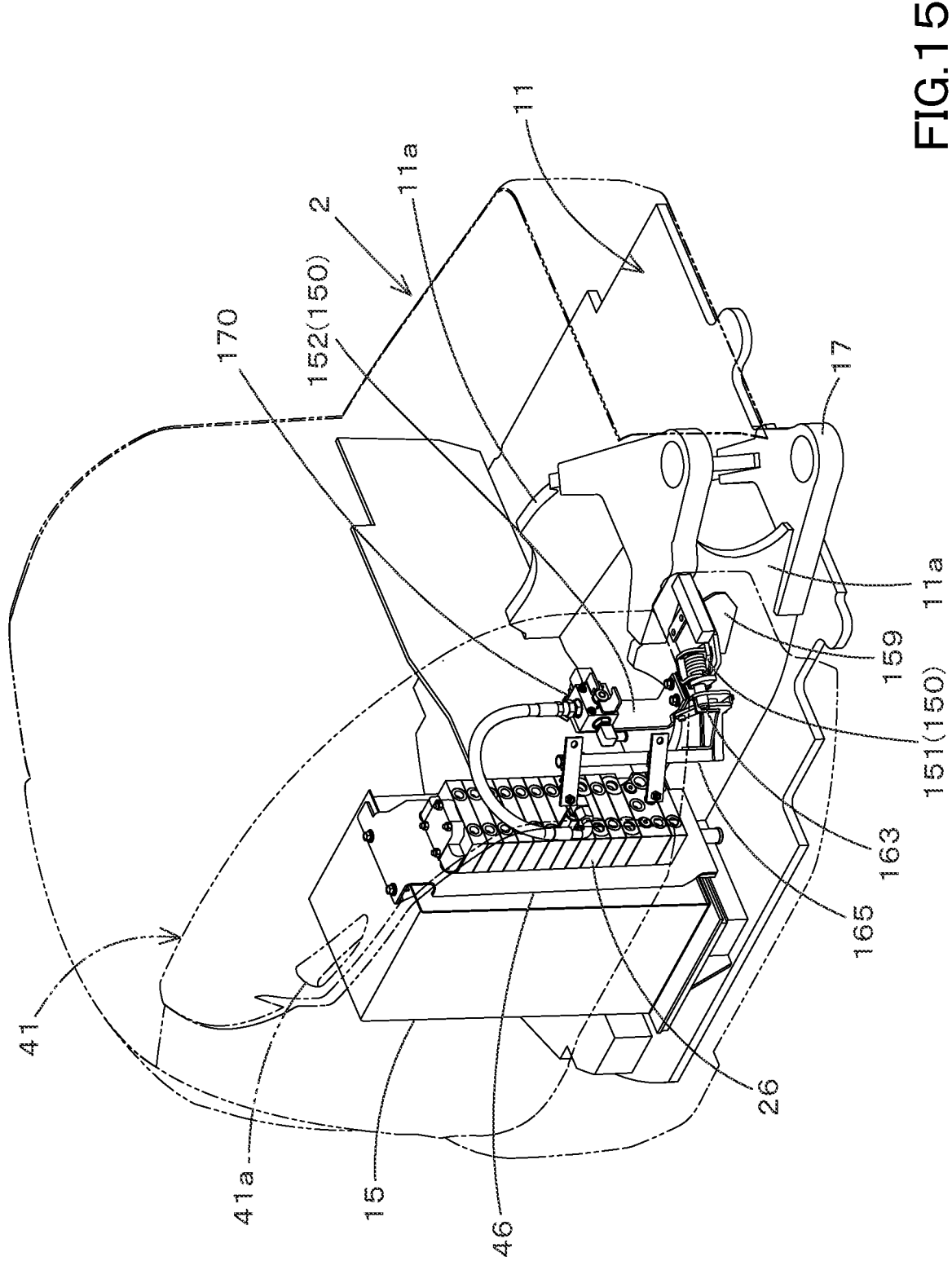
FIG. 15 is a perspective view illustrating arrangement of a control valve, a switching valve, a support shaft, and the like according to the embodiment.

As shown in FIG. 14, FIG. 15, and FIG. 40, a cover 41 is provided on one side of the machine body 2 in the width direction. In particular, the cover 41 is provided on the right side of the machine body 2 and on the right side of the cabin 3. As shown by the image line in FIG. 40, it can be opened upward and toward the machine outward (toward the right outside) around the right front portion of the machine body 2. A grip 41*a* that can be gripped when the operator opens the cover 41 is provided at the right rear portion of the cover 41.

As shown in FIG. 15, the cover 41 covers the upper, right and front sides of the operation fluid tank 15 and the control valve 26. The operation fluid tank 15 is mounted on the right rear portion of the turn base plate 11. The operation fluid tank 15 has a substantially rectangular parallelepiped shape, of which size in the height direction is longer than those in the front-rear direction and the machine width direction. That is, the operation fluid tank 15 is arranged vertically. A control valve 26 is attached to the front surface of the operation fluid tank 15 via a mounting bracket 46. The control valve 26 is a valve unit in which a plurality of valves are aligned and integrated, and the plurality of valves are arranged side by side in the height direction (vertical direction). That is, the control valve 26 is arranged vertically.

The plurality of valves constituting the control valve 26 include a swing control valve that controls the supply of hydraulic fluid to the swing cylinder 19, a boom control valve that controls the supply of hydraulic fluid to the boom cylinder 20, an arm control valve for controlling the supply of hydraulic fluid to the arm cylinder 21, a working tool control valve for controlling the supply of hydraulic fluid to the working tool cylinder 22, a dozer control valve for controlling the supply of hydraulic fluid to the dozer cylinder 37, a turn motor control valve for turning to control the supply of hydraulic fluid to the turn motor, a traveling control valve for controlling the supply of hydraulic fluid to the travel motor of the traveling device 4, and a service port control valve for controlling the supply of hydraulic fluid to the hydraulic attachment.

Figure 16:
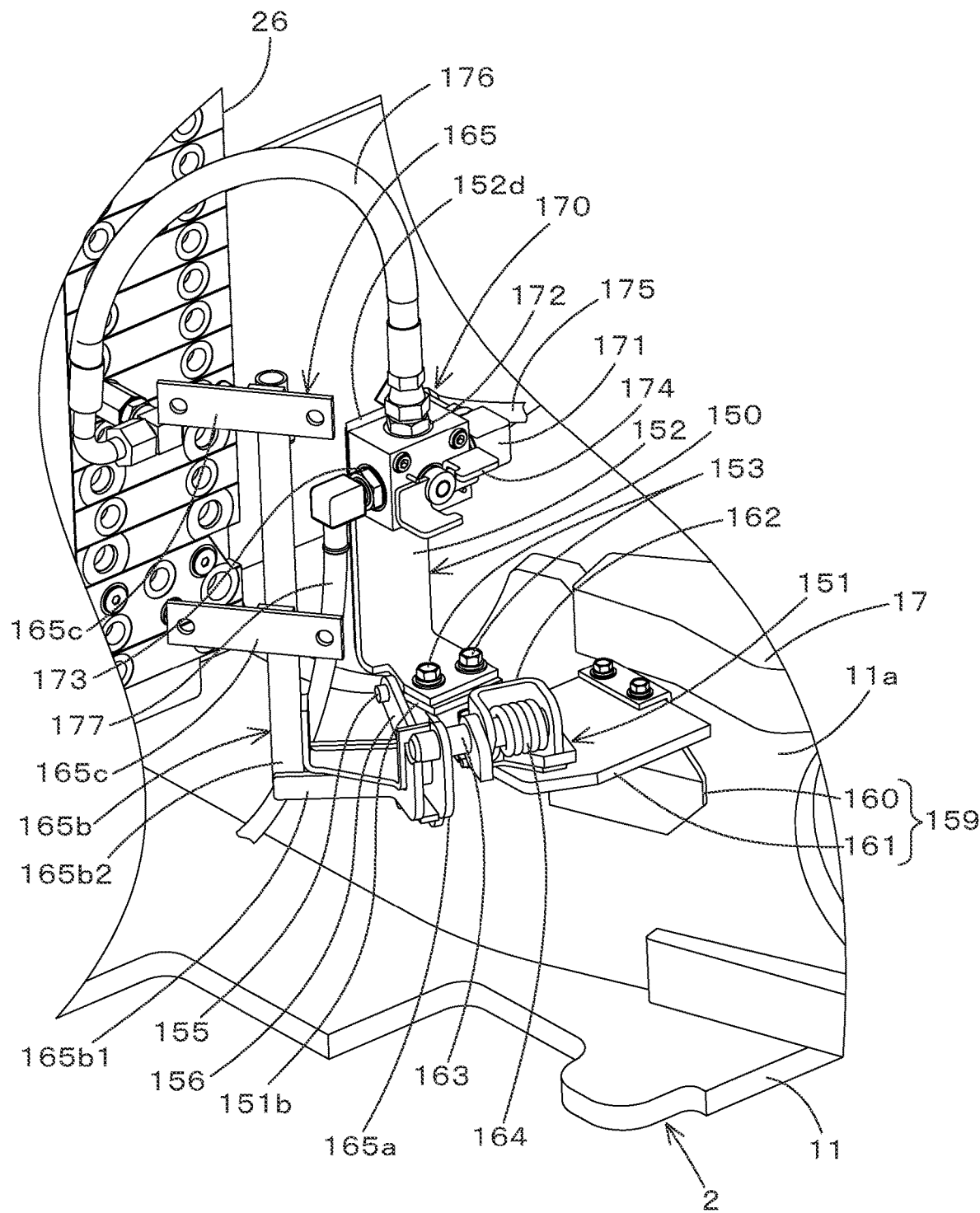
FIG. 16 is a partially enlarged view of FIG. 15.

As shown in FIG. 15 and FIG. 16, a supporting member 150 is provided in front of the control valve 26. The supporting member 150 is provided on one side in the machine width direction. In particular, the supporting member 150 is provided in the right front portion of the machine body 2. The upper side, the right side (one side in the machine width direction) and the front side of the supporting member 150 are covered with a cover 41.

As shown in FIG. 16 to FIG. 19, the supporting member 150 includes a first supporting member 151 and a second supporting member 152.

As shown in FIG. 16, the first supporting member 151 is attached to the machine body 2 via a base member 159. The base member 159 includes a bracket 160 and a base platform 161. The bracket 160 is fixed to the machine body 2. In particular, the bracket 160 is fixed to the side surface (right surface) of the machine outward side of the longitudinal rib 11*a* extending in the front-rear direction on the turn base plate 11. The base platform 161 is fixed to the upper portion of the bracket 160 with bolts and extends toward the outside (right side) of the machine body. A first supporting member 151 is attached to the base platform 161.

Figure 17:
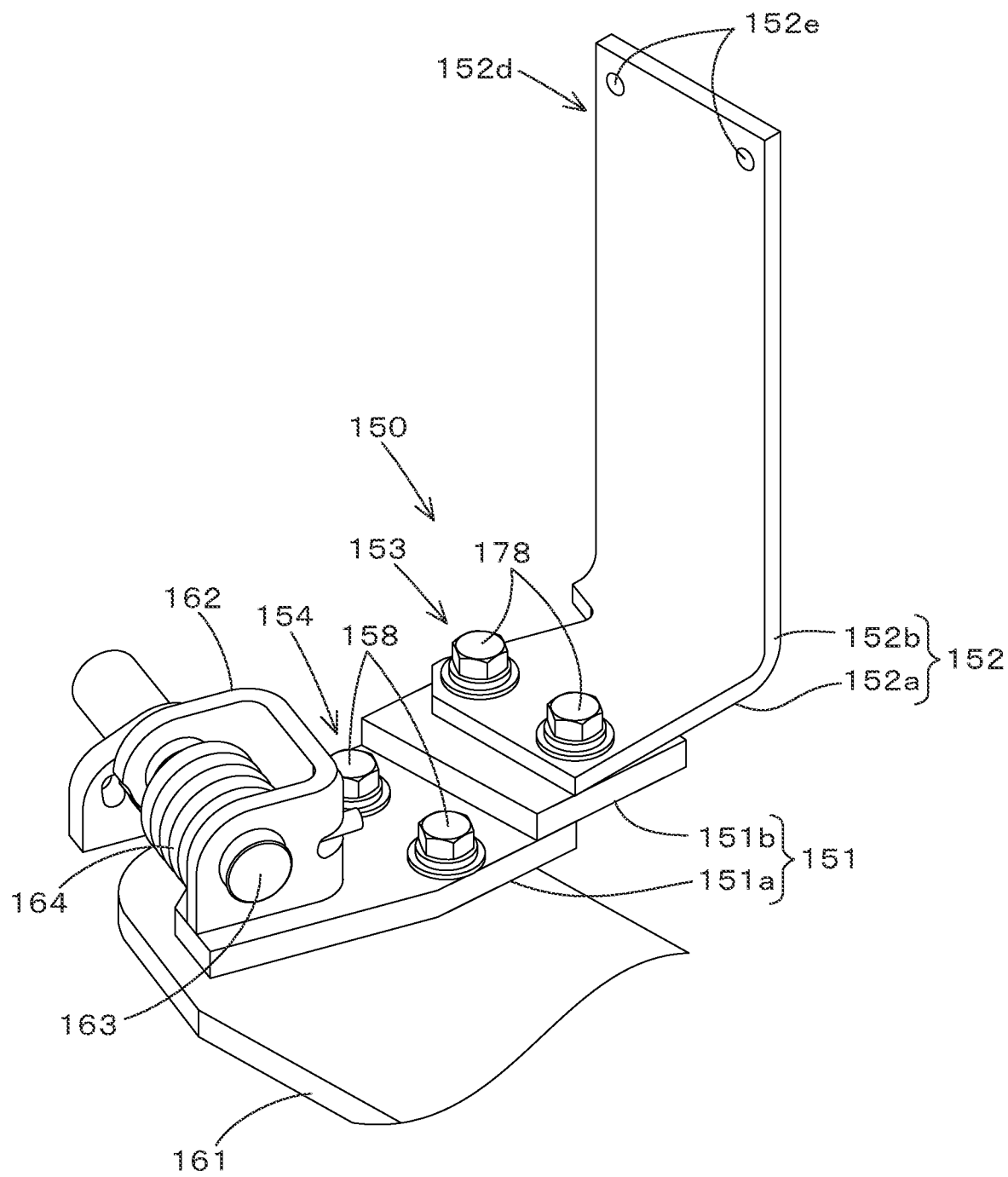
FIG. 17 is a perspective view of a supporting member according to the embodiment.
Figure 18:
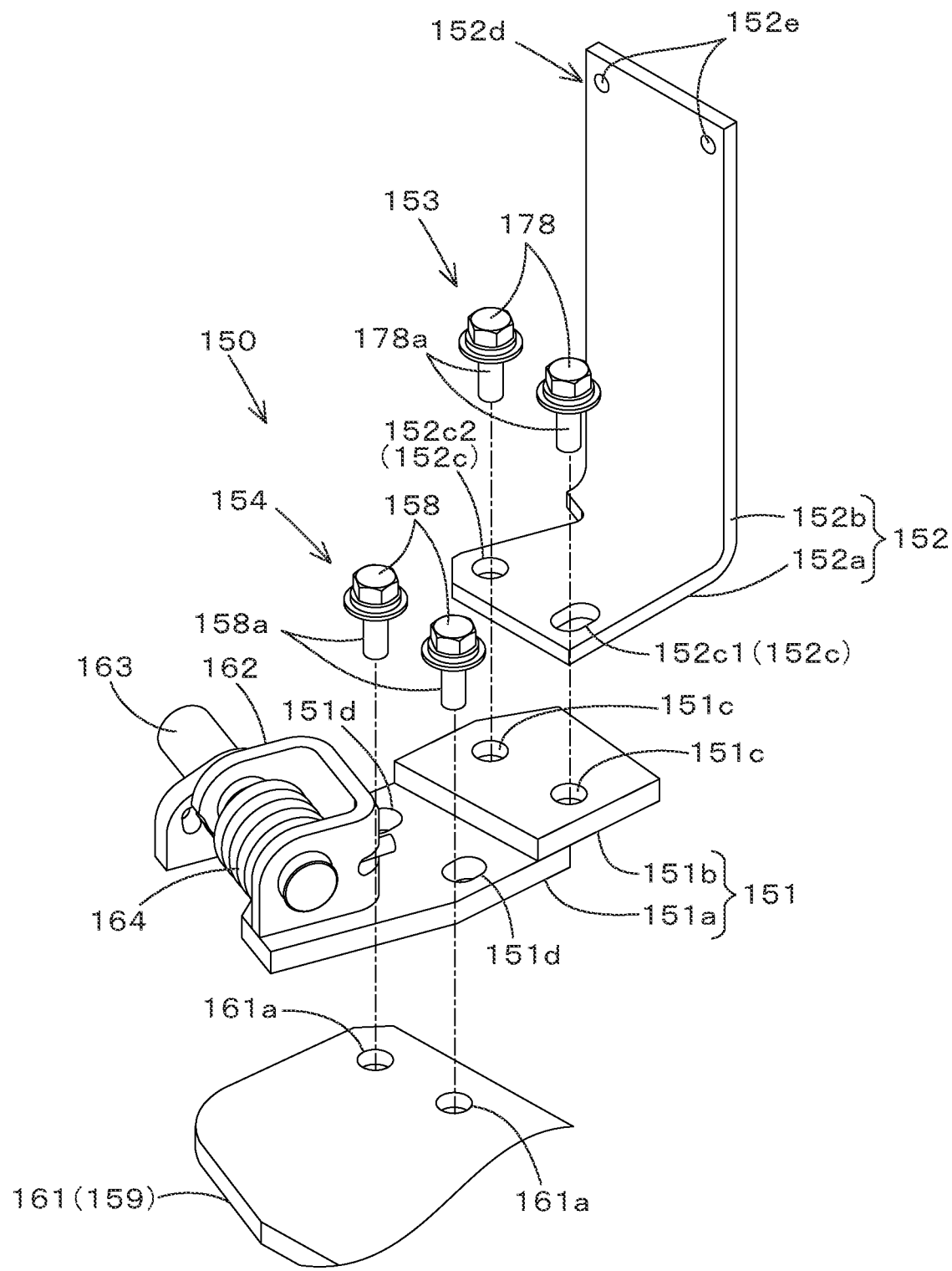
FIG. 18 is an exploded perspective view of the supporting member according to the embodiment.
Figure 19:
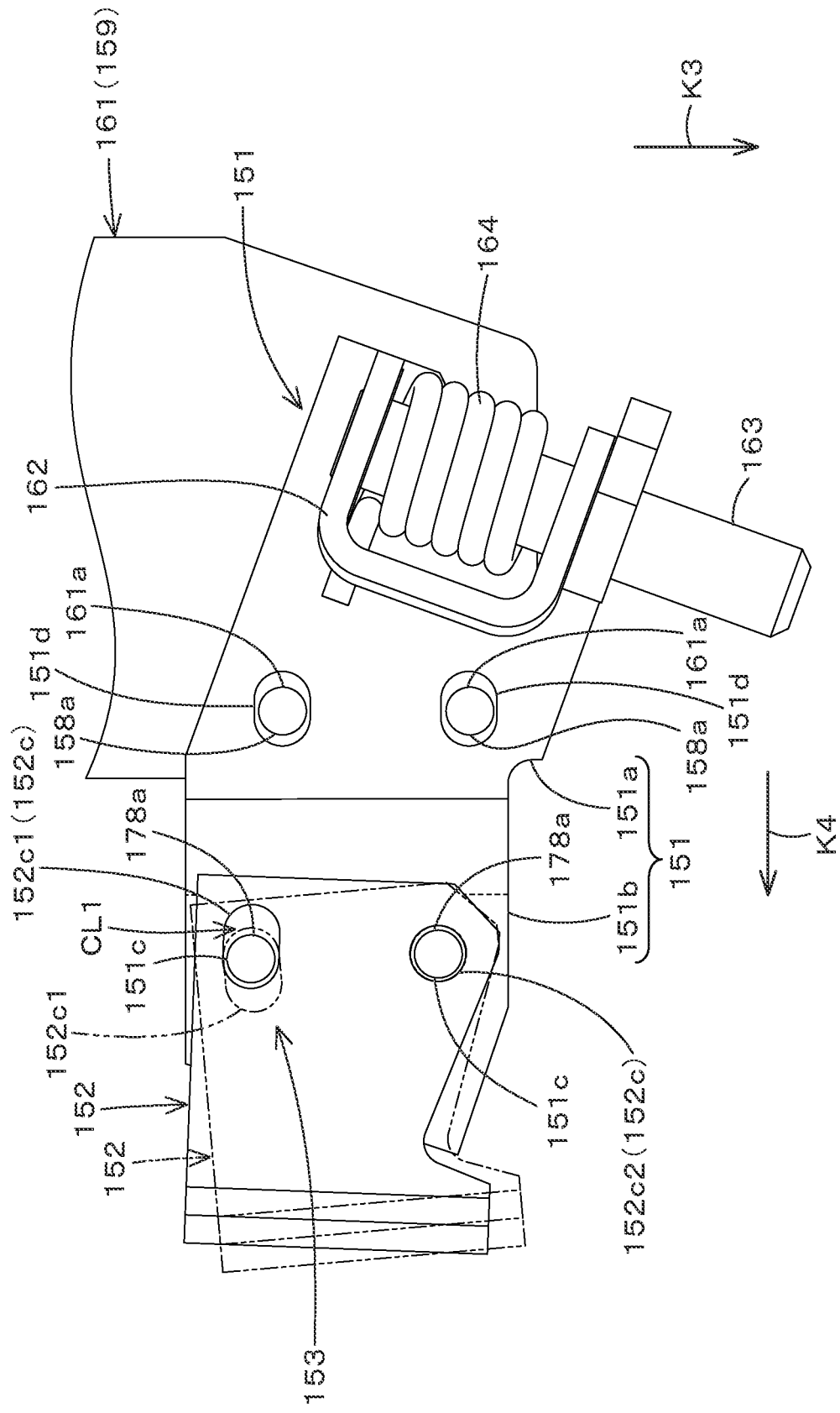
FIG. 19 is a plan view illustrating action of a position adjustment portion according to the embodiment.

As shown in FIG. 17 to FIG. 19, the first supporting member 151 has a base plate portion 151*a* and a first plate portion 151*b*.

The base plate portion 151*a* is connected to the upper surface of the base platform 161 by a connecting member (bolt) 158 and extends rearward (to the control valve 26). As shown in FIG. 18 and FIG. 19, the base plate portion 151*a* is provided with the fourth holes 151*d*. Each of the fourth holes 151*d* is an oval hole formed, of which length in the front-rear direction is longer than the length in the machine width direction. The fourth hole 151*d* penetrates the base plate portion 151*a* in the vertical direction. An inserting portion (screw shaft) 159*a* of the connecting member 158 is inserted into the fourth hole 151*d*. The inserting portion 159*a* of the connecting member 158 is screwed into a fifth hole (screw hole) 161*a* provided in the base plate 161.

As shown in FIG. 18 and FIG. 19, first holes 151c are formed in the first plate portion 151b. The first hole 151c is a screw hole that penetrates the first plate portion 151b in the vertical direction. The first plate portion 151b is connected to the upper surface of the rear portion of the base plate portion 151a by welding or the like, and extends rearward from the base plate portion 151a. In the case of the present embodiment, the base plate portion 151a and the first plate portion 151b are configured from separated members, but may be configured from a single member.

A support tool 162 is fixed to the upper surface of the first supporting member 151 (the upper surface of the base plate portion 151a). The support tool 162 supports a fulcrum shaft 163 that is an opening/closing fulcrum of the cover 41. The fulcrum shaft 163 is arranged substantially parallel (substantially horizontally) to the upper surface of the turn base plate 11. As shown in FIG. 5, the fulcrum shaft 163 extends in a direction of moving to the rear K4 as it shifts outward of the machine body K3. One end of the coil spring 164 is fixed to the fulcrum shaft 163. The other end of the coil spring 164 is fixed to the support tool 162. The coil spring 164 biases the fulcrum shaft 163 in one direction around the axis (the direction in which the cover 41 closes).

As shown in FIG. 16, an swing body 165 is attached to the fulcrum shaft 163. The swing body 165 swings around the axis of the fulcrum shaft 163. The swing body 165 has a fulcrum shaft attachment portion 165a, an extending portion 165b, and an attachment plate 165c. The fulcrum shaft attachment portion 165a is attached to one end (outside the machine body) of the fulcrum shaft 163. The extending portion 165b includes a lateral extending portion 165b1 and a vertical extending portion 165b2. The lateral extending portion 165b1 extends from the fulcrum shaft attachment portion 165a outward and rearward of the machine body. The vertical extending portion 165b2 extends upward from the extending end of the horizontally extending portion 165b1. The attachment plate 165c is fixed to the upper portion and the lower portion of the vertical extending portion 165b2. The attachment plate 165c is attached to the inner surface of the right front portion of the cover 41 by means of a bolt to secure the cover 41 with the swing body 165.

When opening the cover 41, the grip 41a is gripped and the rear portion of the cover 41 is lifted. Then, the swing body 165 fixed to the front portion of the cover 41 swings in the other direction around the axis of the fulcrum shaft 163 so as to shift from the state of rising substantially vertically toward the front lower side. This allows the cover 41 to be opened forward and upward (see a virtual line in FIG. 40). When the cover 41 is closed, the rear portion of the cover 41 is pushed down so that the swinging body 165 swings in one direction around the axis of the fulcrum shaft 163 toward the rear upper side.

As shown in FIG. 16, an attachment shaft 155 is fixed to the lower surface of the first supporting member 151 (the lower surface of the first plate portion 151b). A stopper plate 156 is attached to the attachment shaft 155 so as to be rotatable around the axis of the attachment shaft 155. The stopper plate 156 restricts the rotation range when the cover 41 is opened and closed. Although not shown, the stopper plate 156 has an oval hole, and a projecting shaft provided on the fulcrum shaft attachment portion 165a is movably inserted into the oval hole. The protruding shaft can move along the oval hole as the swing body 165 swings, and the rotation range of the cover 41 is restricted by the movable range (length of the elongated hole).

As shown in FIG. 17 and FIG. 18, the second supporting member 152 is attached to the first supporting member 151. The second supporting member 152 is formed in a substantially L shape having a horizontal portion (second plate portion) 152a and a vertical portion 152b, and the horizontal portion 152a is attached to the first supporting member 151. Second holes 152c are formed in the horizontal portion 152a. The second holes 152c penetrate the horizontal portion 152a in the vertical direction. The number of the second holes 152c is the same as that of the first holes 151c provided in the first supporting member 151, and is two in the present embodiment. A mounting portion 152d is provided on the vertical portion 152b. As shown in FIG. 16, a switching valve 170 is attached to the attachment portion 152d. The attachment portion 152d has an attachment hole 152e, and the switching valve 170 is attached by a bolt inserted into the attachment hole 152e. As shown in FIG. 15, the upper side, the right side (one side in the machine width direction) and the front side of the switching valve 170 are covered with the cover 41.

The switching valve 170 is a three-way switching valve. The switching valve 170 is a valve that switches the state of the hydraulic fluid supply path for a hydraulic device (for example, a hydraulic attachment or the like). In the case of the present embodiment, the switching valve 170 is a so-called third-line valve, and is a valve that enables the hydraulic fluid to be returned to the operation fluid tank 15 without the control valve 26 by a switching operation. However, the switching valve 170 may be a valve other than the third line valve.

As shown in FIG. 16, the switching valve 170 has an inlet port 171, a first outlet port 172, a second outlet port 173, and an operation handle 174. The switching valve 170 operates the operation handle 174 to switch the outer ports of the hydraulic fluid introduced from the inlet port 171 to a first state where the first outlet port 172 is used and to a second state where the second outlet port 173 is used.

A third hydraulic hose 175 is connected to the inlet port 171. The third hydraulic hose 175 is connected to a hydraulic device (for example, a hydraulic attachment or the like), and defines a return fluid line for returning the hydraulic fluid from the hydraulic device to the operation fluid tank 15. A fourth hydraulic hose 176 is connected to the first outlet port 172. The fourth hydraulic hose 176 is connected to the inlet port of the control valve 26. A fifth hydraulic hose 177 is connected to the second outlet port 173. The fifth hydraulic hose 177 is connected to the operation fluid tank 15.

When the operation handle 174 is switched to the first state, the hydraulic fluid introduced from the inlet port 171 through the third hydraulic hose 175 exits from the first outlet port 172 and enters the control valve 26 through the fourth hydraulic hose 176. When the operation handle 174 is switched to the second state, the hydraulic fluid introduced from the inlet port 171 exits the second outlet port 173 and returns to the operation fluid tank 15 through the fifth hydraulic hose 177 without entering the control valve 26.

As shown in FIG. 17 and FIG. 18, the first supporting member 151 and the second supporting member 152 are connected by a connecting member 178. The connecting member 178 has an inserting portion 178a that is inserted into the first hole 151c and the second hole 152c. In the present embodiment, the connecting member 178 is a bolt, and the inserting portion 178a is a screw shaft of the bolt.

The connection between the first supporting member 151 and the second supporting member 152 by the connecting member 178 (attachment of the second supporting member 152 to the first supporting member 151) is performed by placing the horizontal portion (second plate portion) 152a of the second supporting member 152 above (or below) the first plate portion 151b of the first supporting member 151. In particular, the first hole 151c and the second hole 152c are overlapped, the inserting portion 178a of the connecting member 178 is inserted into the second hole 152c, and the inserting portion 178a is screwed into the first hole 151c which is a screw hole. The first hole 151c may be a through hole that is not a screw hole, then a nut may be screwed into the inserting portion 178a inserted into the through hole, and thereby the first supporting member 151 and the second supporting member 152 are connected.

The supporting member 150 may be assembled to the machine body 2 after the first supporting member 151 and the second supporting member 152 are connected (sub-assembled) by the connecting member 178.

At least one of the first supporting member 151 and the second supporting member 152 has a position adjustment portion 153. The position adjustment portion 153 is operable to adjust the relative position between the first supporting member 151 and the second supporting member 152. In other words, the position adjustment portion 153 can adjust the position of the second supporting member 152 relative to the first supporting member 151.

The position adjustment portion 153 includes at least one of a first hole 151c provided in the first supporting member 151 and a second hole 152c provided in the second supporting member 152. The hole (at least one of the first hole 151c and the second hole 152c) is formed in a size having a gap (clearance) with respect to the outer diameter of the inserting portion 178a of the connecting member 178. That is, the position adjustment portion 153 includes a hole formed in a size having a gap with respect to the outer diameter of the inserting portion 178a. In the present embodiment, since the first hole 151c is a screw hole, the second hole 152c is formed in a size having a gap (that is, the second hole 152c is included in the position adjusting unit 153). However, when the first hole 151c is a through-hole that is not a screw hole (when a nut is used), either or both of the first hole 151c and the second hole 152c may be formed in a size having a gap with respect to the outer diameter of the inserting portion 178a. In this case, one or both of the first hole 151c and the second hole 152c are included in the position adjustment portion 153.

The method of forming the first hole 151c and/or the second hole 152c with a size having a gap is, for example, a method of making the diameter (inner diameter) of the circular hole larger than the outer diameter of the inserting portion 178a, or a method of forming a shape of the hole to be a shape other than a circle such as an oval hole. In the case of this embodiment, the latter method is adapted. In particular, the first hole 151c is a screw hole, and one of the two second holes 152c is an oval hole.

The number of the first holes 151c and the second holes 152c may be respectively one, but is preferably in plural. When the number of the first holes 151c and the second holes 152c is in plural, at least one of the holes may be formed in a size having a gap. In the case of this embodiment, the second hole 152c1 of the two second holes 152c is formed in a size having a gap. In addition, when the number of the first holes 151c and the second holes 152c is in plural, it is preferable that the plural holes are formed side by side in the machine width direction. In the case of the present embodiment, two first holes 151c are formed side by side in the machine width direction, and two second holes 152c are also formed side by side in the machine width direction.

Hereinafter, the operation of the position adjustment portion 153 will be described with reference to FIG. 19.

FIG. 19 shows a case where the two first holes 151c are formed as screw holes, and the hole 152c1 of the two second holes 152c (the machine inward side) is formed in a size having a gap CL1. The second hole 152c1 is formed as a long hole that is longer in the front-rear direction than that in the machine width direction. In FIG. 19, a solid line indicates a state where the rear portion of the second hole 152c1 overlaps the first hole 151c, and a virtual line indicates a state where the front portion of the second hole 152c1 overlaps the first hole 151c. The outer diameter of the inserting portion 178a of the connecting member 178 overlaps the inner diameter of the first hole 151c, and the gap CL1 is formed between the inserting portion 178a and the second hole 152c1. By forming the gap CL1 in this manner, the position of the second hole 152c1 with respect to the first hole 151c can be shifted from the solid line position to the virtual line position. That is, the position of the second supporting member 152 relative to the first supporting member 151 can be adjusted. In particular, the rotational movement of the second plate portion 152c relative to the first plate portion 151b can be allowed.

In addition, although not shown in figure, the linear movement of the second board portion 152c with respect to the first board portion 151b is also permitted by forming both the two second holes 152c to be oval holes. That is, the gap CL1 may allow rotational movement of the second supporting member 152 relative to the first supporting member 151, may allow linear movement, or may allow both movements. It is preferable that the movement of the second supporting member 152 with respect to the first supporting member 151 includes movement in the machine width direction (the machine outward direction or the machine inward direction) regardless of whether it is the rotational movement or the linear movement.

As shown in FIG. 16, a fulcrum shaft 163 serving as an opening/closing fulcrum of the cover 41 is attached to the first supporting member 151. A switching valve 170 is attached to the second supporting member 152. Thus, the relative position between the fulcrum shaft 163 and the switching valve 170 can be adjusted by adjusting the relative position between the first supporting member 151 and the second supporting member 152.

The first supporting member 151 has a second position adjustment portion 154. The second position adjustment portion 154 can adjust the position of the first supporting member 151 relative to the machine body 2. In particular, the second position adjustment portion 154 makes it possible to adjust the position of the first supporting member 151 with respect to the base member 159 (base plate 161).

The second position adjustment portion 154 includes a fourth hole 151d provided in the first supporting member 151.

The connecting member 158 that connects the first supporting member 151 and the base member 159 (the base plate 161) has an inserting portion 158a that is inserted into the fourth hole 151d and the fifth hole 161a. As described above, in the present embodiment, the connecting member 158 is a bolt, and the inserting portion 158a is a screw shaft of the bolt. The fourth hole 151d is a long hole, and the fifth hole 161a is a screw hole.

Figure 20:
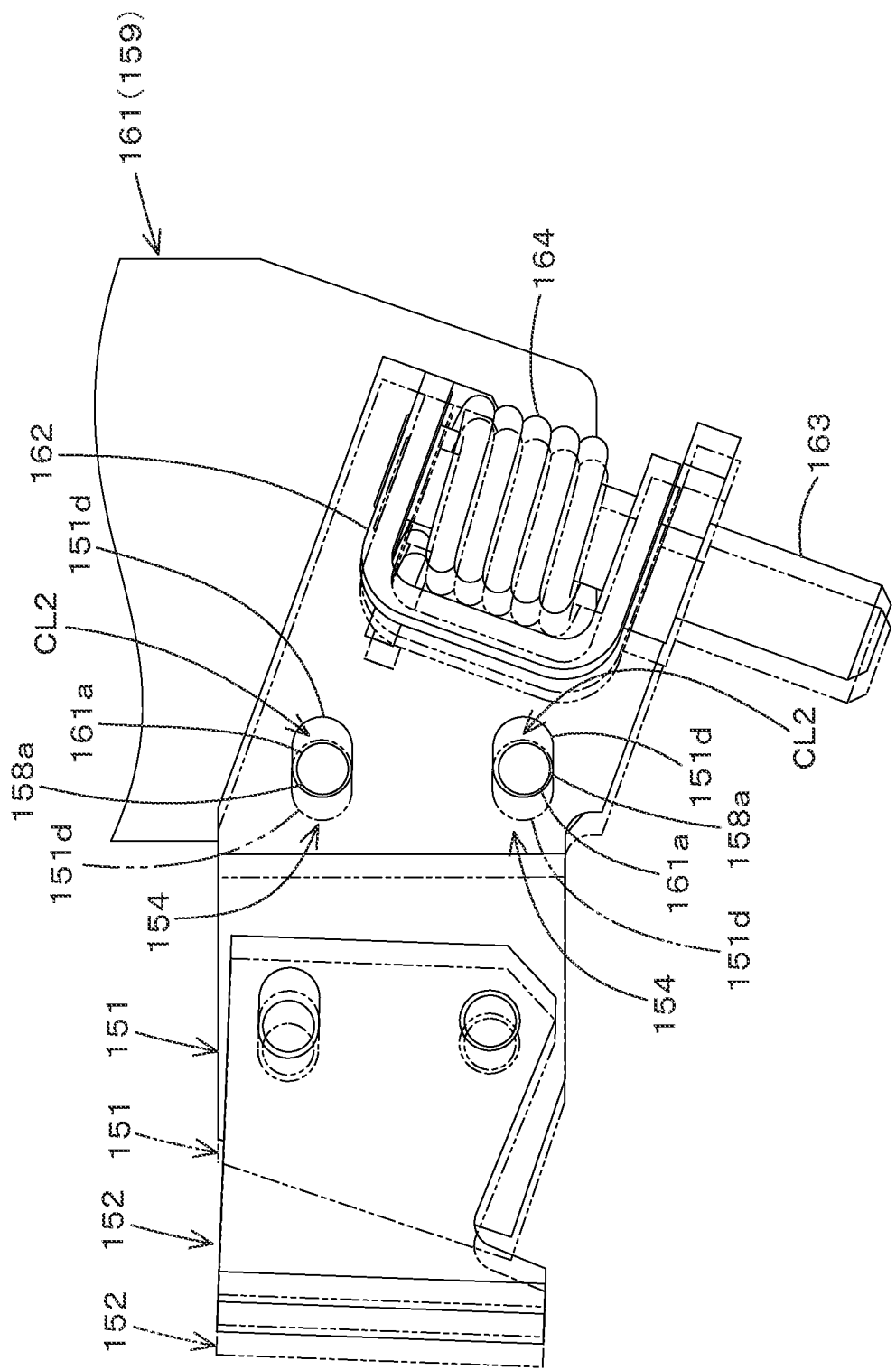
FIG. 20 is a plan view illustrating action of a second position adjustment portion according to the embodiment.

As shown in FIG. 20, a gap CL2 is formed between the inserting portion 158a of the connecting member 158 and the fourth hole 151d. In other words, the fourth hole 151d constituting the second position adjusting portion 154 is formed to have a size having a gap with respect to the outer diameter of the inserting portion (screw shaft) 158a. In FIG. 20, a solid line indicates a state where the rear portion of the fourth hole 151d overlaps the screw hole 161a, and an image line indicates a state where the front portion of the fourth hole 151d overlaps the screw hole 161a. The gap CL2 is formed between the inserting portion 158a and the fourth hole 151d. By forming the gap CL2 in this way, the position of the fourth hole 151d with respect to the screw hole 161a can be shifted from the solid line position to the virtual line position. That is, the position of the fourth hole 151d with respect to the screw hole 161a can be adjusted in the gap CL2. Thereby, the position of the first supporting member 151 with respect to the base member 159 can be adjusted. Thus, the position of the fulcrum shaft 163 and the position of the cover 41 with respect to the machine body 2 can be adjusted.

In the example shown in FIG. 20, the second position adjustment portion 154 performs position adjustment of the first supporting member 151 with respect to the base member 159 through the linear movement, but instead of or in addition to adjustment through the linear movement, adjustment through the rotational movement may be allowed. The change in the moving direction can be realized by changing the shape and size of the fourth hole 151d provided in the base plate portion 151a.

<Bonnet Latching Structure>

Figure 21:
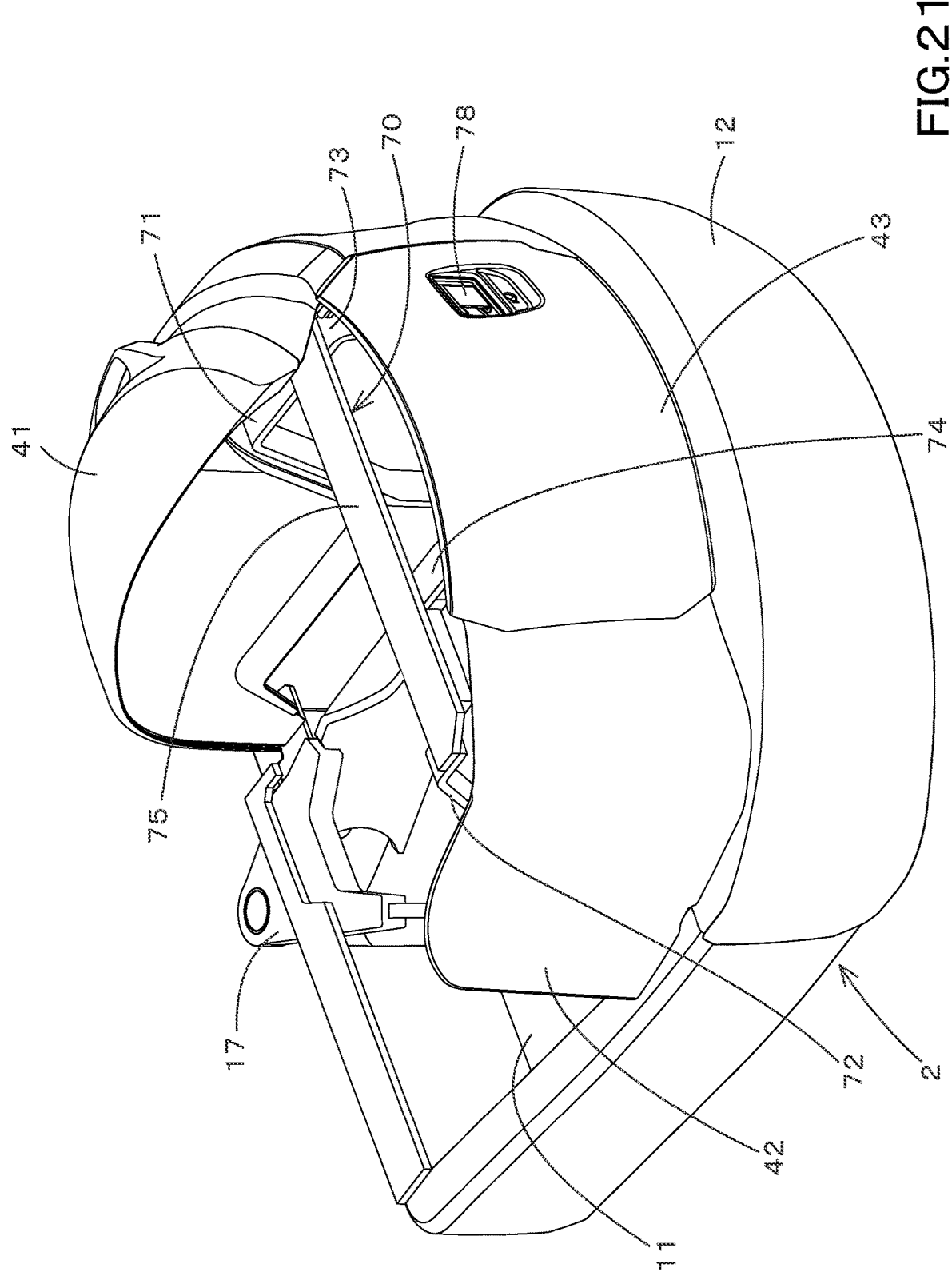
FIG. 21 is a perspective view of a state where a bonnet is closed according to the embodiment, which is diagonally seen from the rear.
Figure 22:
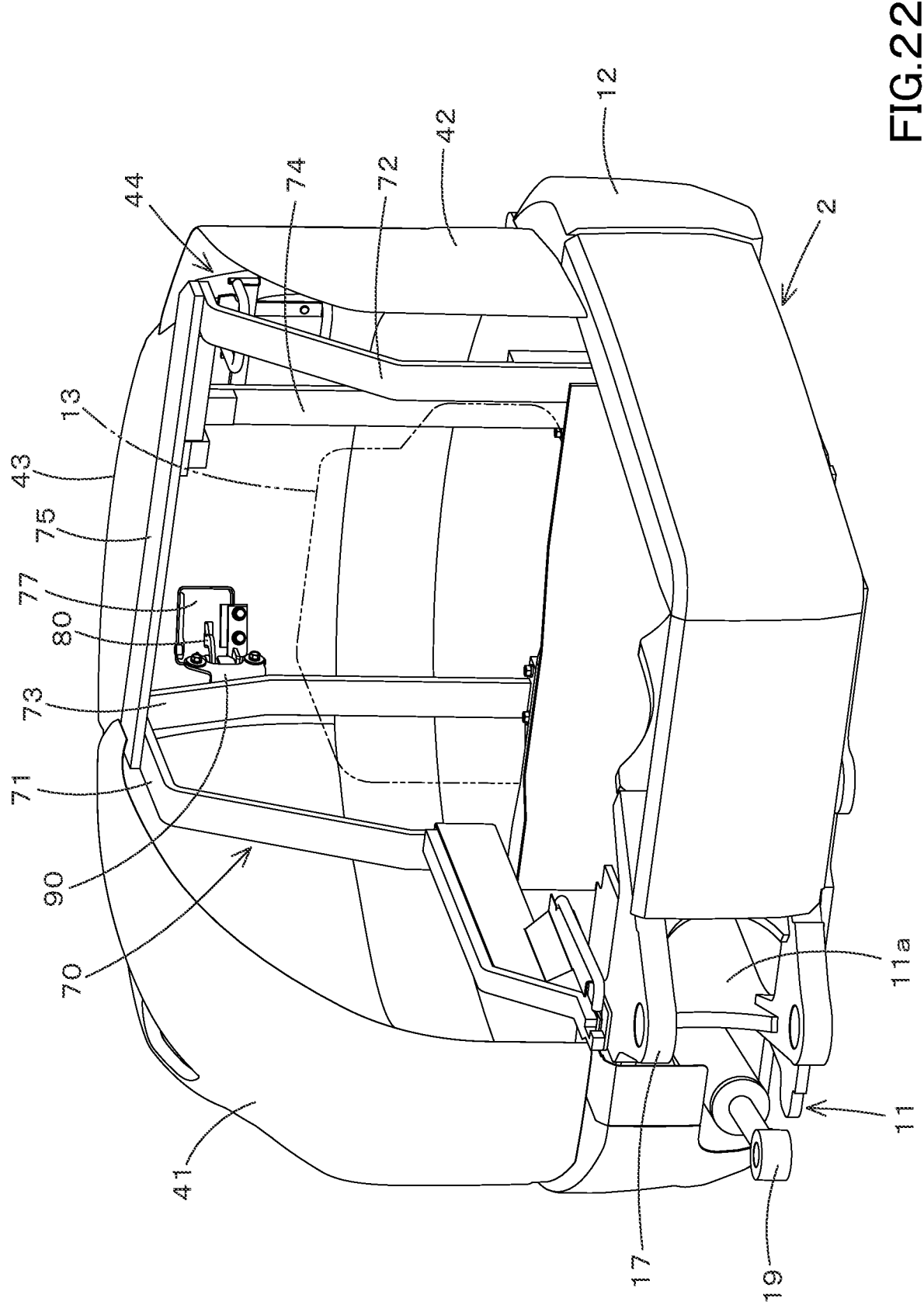
FIG. 22 is a perspective view of the state where the bonnet is closed according to the embodiment, which is diagonally seen from the front.

As shown in FIG. 21, FIG. 22, and FIG. 40, a bonnet 43 is provided at the rear portion of the machine body 2. The bonnet 43 is provided so as to be openable and closable with respect to the machine body 2 and covers the rear portion of the prime mover 13.

Figure 23:
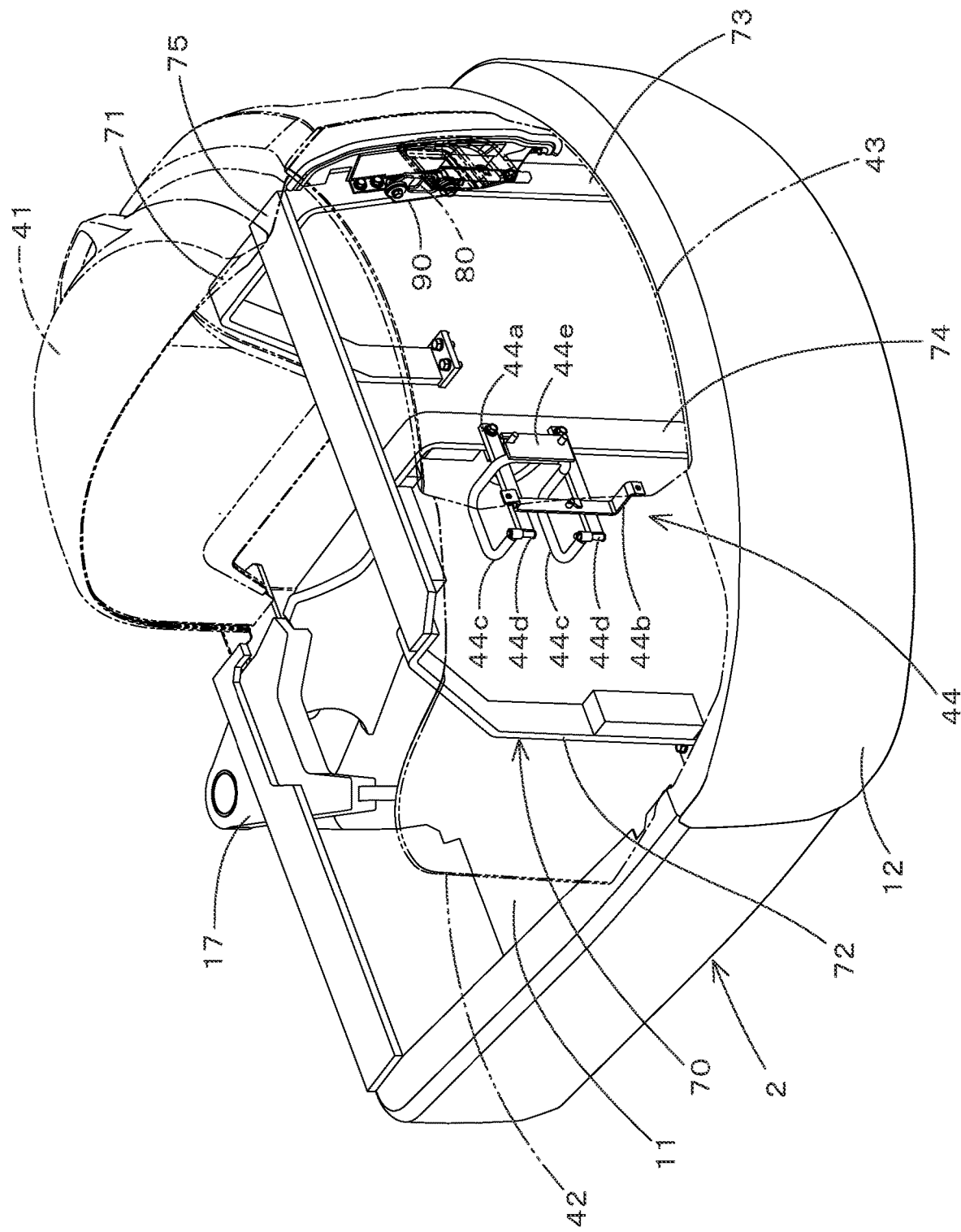
FIG. 23 is a perspective view of the state of FIG. 21 where the bonnet is illustrated by a image line.

As shown in FIG. 21 to FIG. 23, the bonnet 43 is supported by a support leg 70 standing on the rear portion of the turn base plate 11. The support leg 70 includes a first leg 71, a second leg 72, a third leg 73, a fourth leg 74, and a support base 75. The first leg 71 is provided standing on the right front side of the prime mover 13. The second leg 72 is provided standing on the left front side of the prime mover 13. The third leg 73 is provided standing on the right rear side of the prime mover 13. The fourth leg 74 is provided standing on the left rear side of the prime mover 13. The upper portions of the first leg 71 and the second leg 72 are bent toward the rear. The upper portions of the third leg 73 and the fourth leg 74 are bent toward the front. The support base 75 is provided extending in the machine width direction, and connects the upper portion of the first leg 71, the upper portion of the second leg 72, the upper portion of the third leg 73, and the upper portion of the fourth leg 74.

Figure 24:
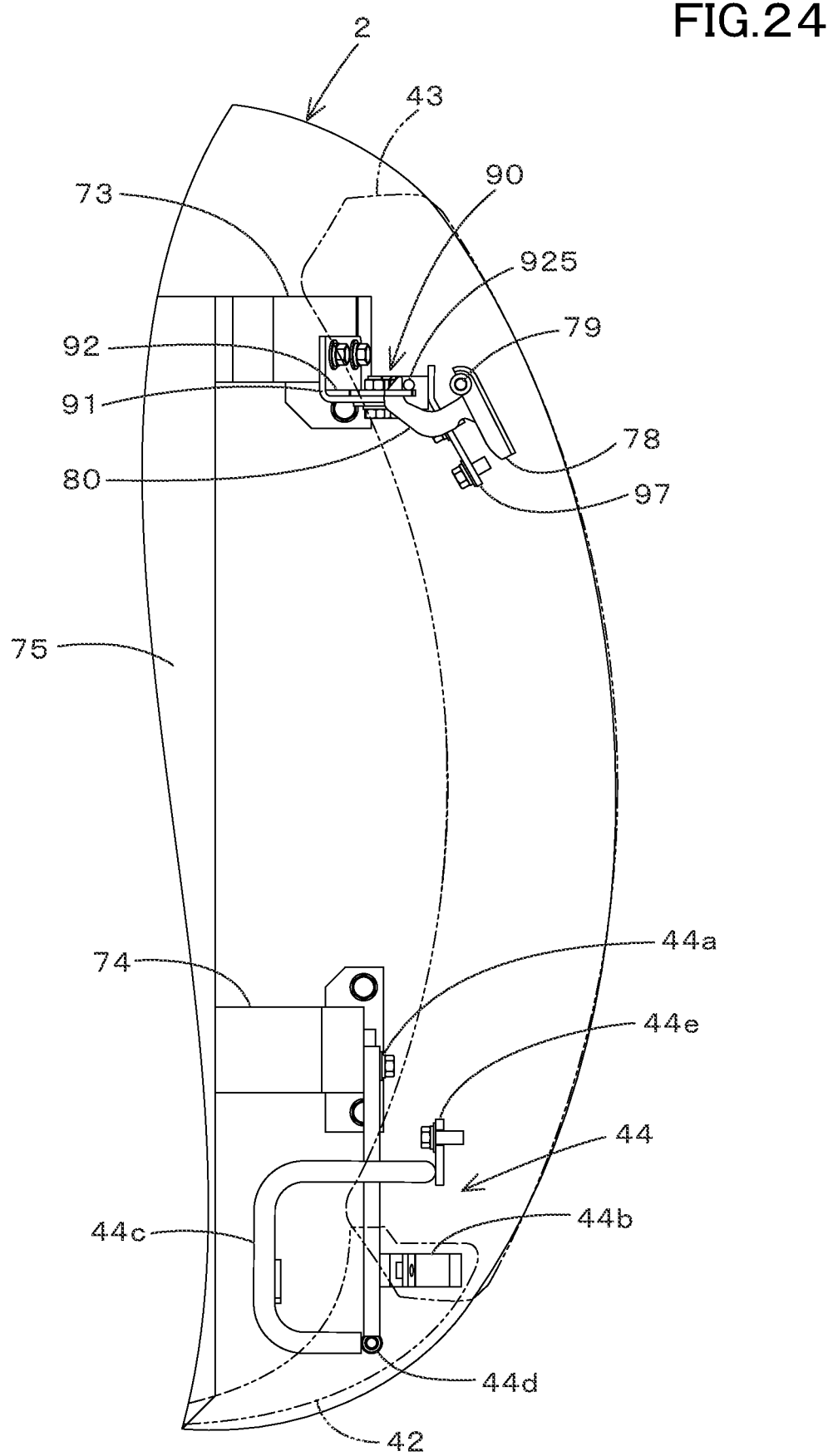
FIG. 24 is a plan view illustrating the state where the bonnet is closed according to the embodiment.
Figure 25:
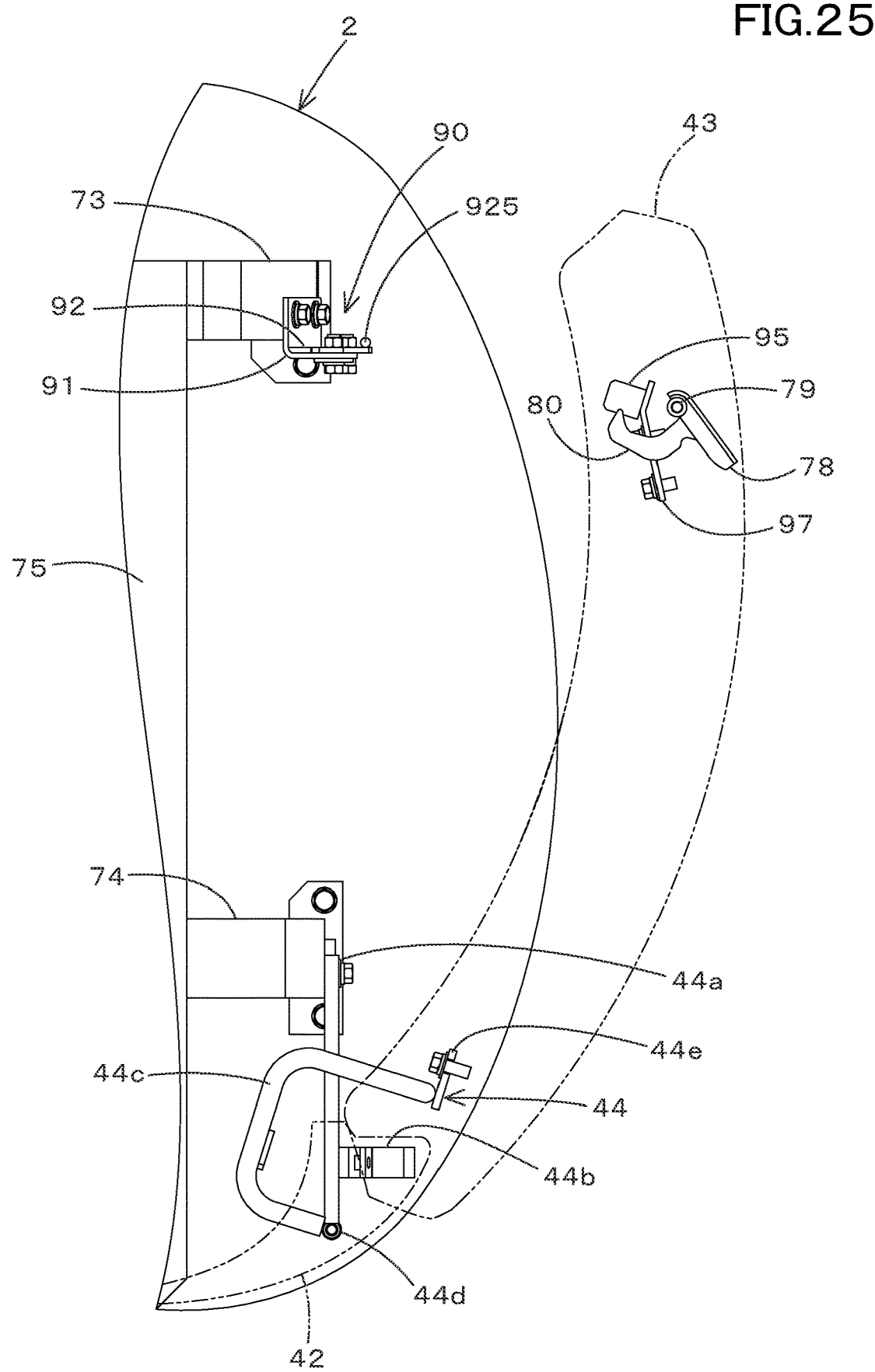
FIG. 25 is a plan view illustrating the state where the bonnet is opened according to the embodiment.

As shown in FIG. 23 and FIG. 24, a rotation support member 44 that constitutes a rotation fulcrum of the bonnet 43 is attached to the fourth leg 74. The rotation support member 44 includes a first fixed portion 44a, a second fixed portion 44b, a movable portion 44c, and a support shaft 44d. The first fixed portion 44a is fixed to the rear surface of the fourth leg 74. The second fixed portion 44b is fixed to the inner surface of the second cover 42 arranged on the left side of the bonnet 43. The movable portion 44c is bent in a substantially U-shape in a plan view. One end portion of the movable portion 44c is connected to the fixed portion 44a via a support shaft 44d. The other end portion of the movable portion 44c is fixed to the inner surface of the left portion of the bonnet 43 through an attachment plate 44e. The support shaft 44d extends in the vertical direction. In this manner, as shown in FIG. 24 and FIG. 25, the movable portion 44c is configured to be rotated forward or backward around the support shaft 44d. In more particular, when the movable portion 44c rotates backward around the support shaft 44d, the bonnet 43 turns backward to be opened (see FIG. 25). When the movable portion 44c is rotated forward around the support shaft 44d, the bonnet 43 turns forward to be closed (see FIG. 24).

Figure 26:
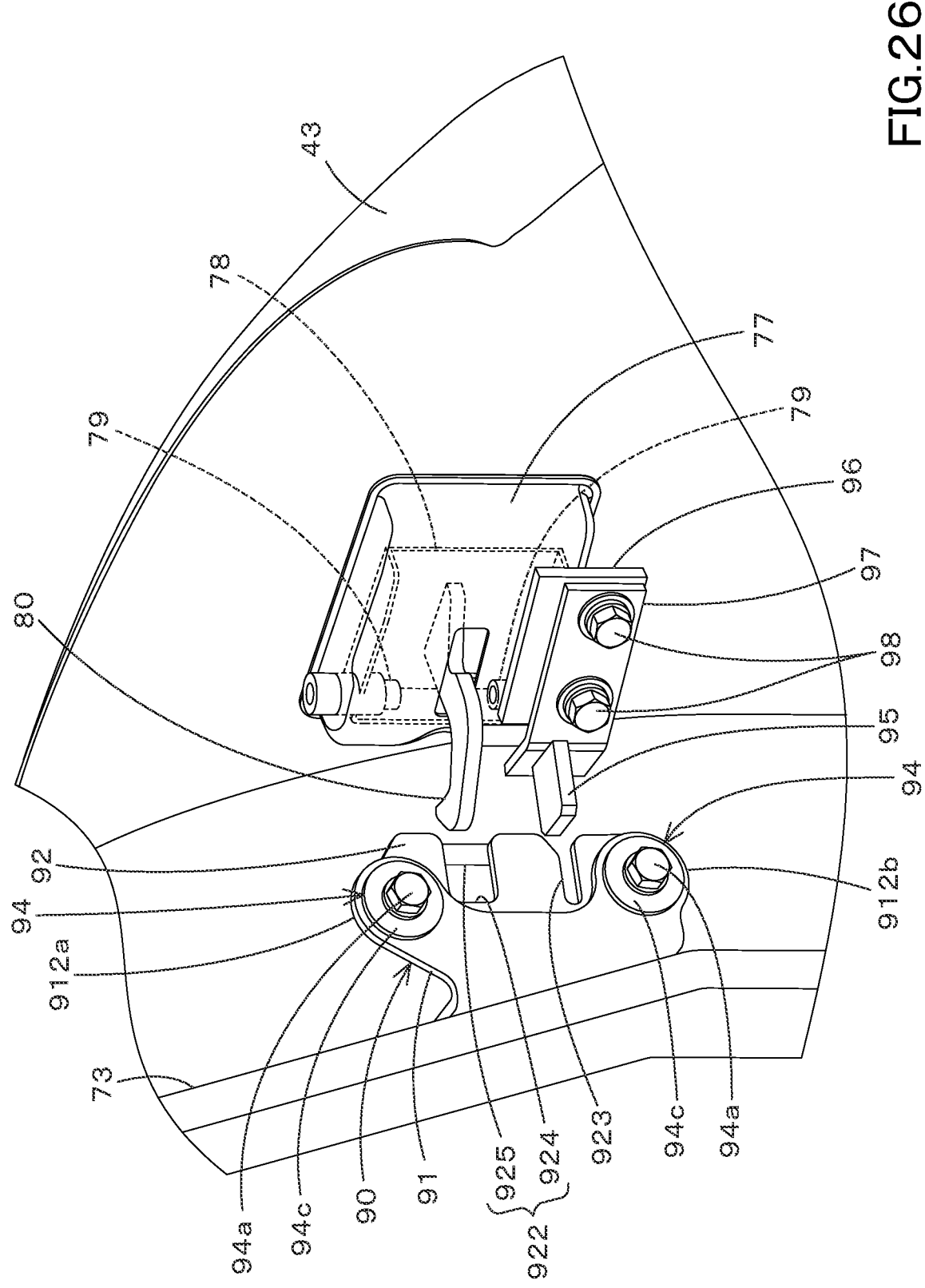
FIG. 26 is a perspective view illustrating a engagement piece and a receiving member according to the embodiment.

As shown in FIG. 22 to FIG. 25, a latching piece 80 is provided on one side (left portion) of the bonnet 43 in the machine width direction. The latching piece 80 is constituted of a hook that is curved in plan view. As shown in FIG. 22, FIG. 26, and the like, the latching piece 80 protrudes forward (in a direction separating away from the bonnet 43) from the housing cover 77 provided on the bonnet 43. A protruding portion (a front end portion) of the latching piece 80 from the housing cover 77 is latched to a latching shaft 925 of a receiving member 90 described later.

Figure 28:
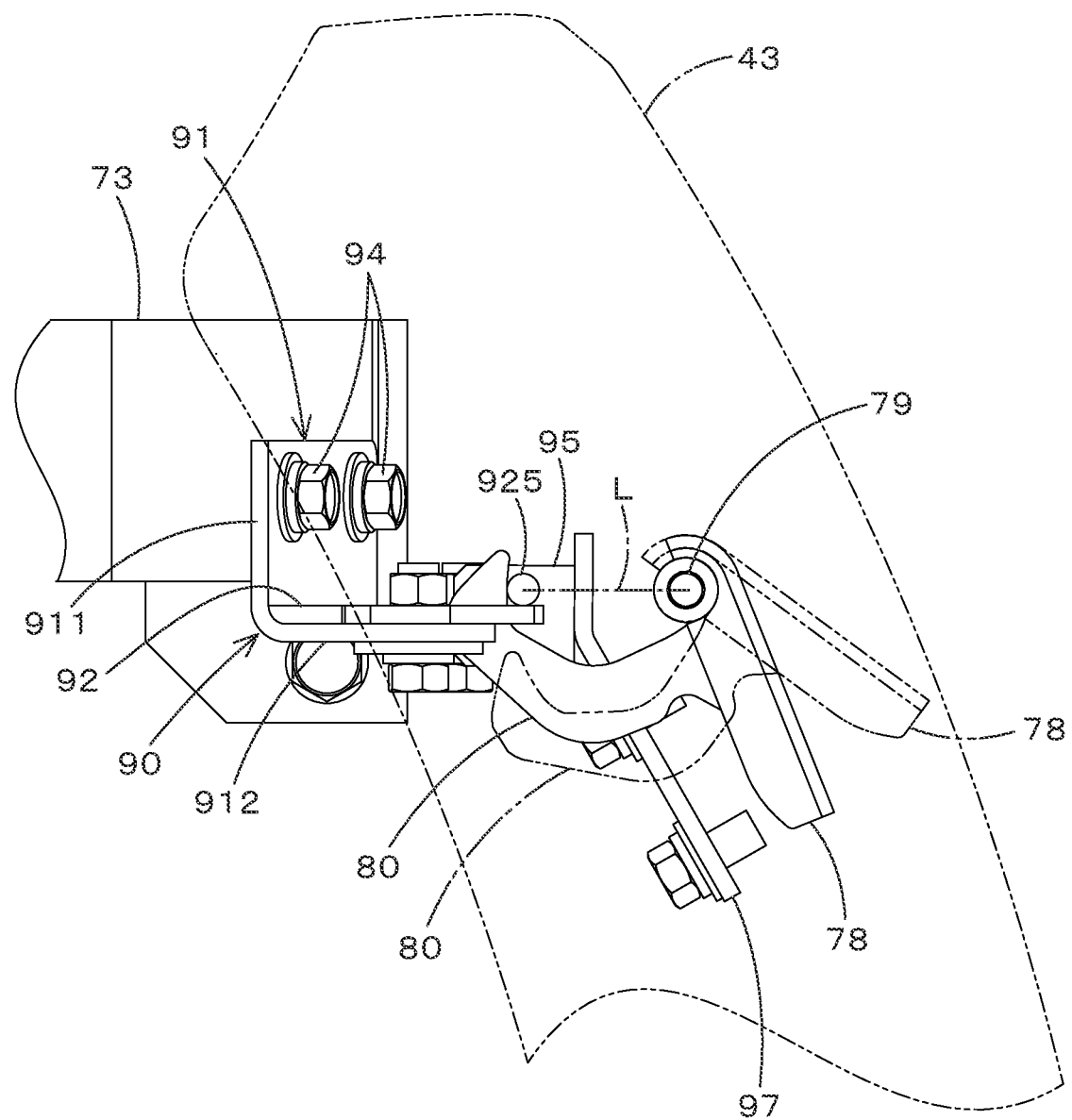
FIG. 28 is a plan view illustrating the state where the engagement piece is engaged with the engagement shaft and the other state where the engagement piece is disengaged according to the embodiment.

As shown in FIG. 26, the rear end portion of the latching piece 80 is fixed to the operation plate 78 housed in the housing cover 7seventhe operation plate 78 is rotatably supported by the housing cover 77 via a vertical axis 79. As shown in FIG. 28, when the operation plate 78 is turned about the vertical axis 79, the latching piece 80 turns about the vertical axis 79 integrally with the operation plate 78. As shown in FIG. 21, the operation plate 78 is exposed on the rear surface of the bonnet 43, and thus can be rotated manually from the rear surface.

As shown in FIG. 26, a first plate 96 is fixed to the lower portion of the front surface of the housing cover 77. A second plate 97 is attached to the first plate 96 with a bolt 98. In addition, the first board 97 and the second board 97 may be constituted of a single piece of member. An insertion plate 95 is fixed to the second plate 9seventhe insertion plate 95 is arranged with one surface facing upward and with the other surface facing downward, and extends in a direction separating away from the bonnet 43. The insertion plate 95 is located below the latching piece 80. The insertion plate 95 is inserted into a slit 923 of the receiving member 90 described later.

As shown in FIG. 22 to FIG. 25, the machine body 2 is provided with a receiving member 90 on which the latching piece 80 is latched when the bonnet 43 is closed. The receiving member 90 is attached to the support leg 70. When the latching piece 80 is latched to the receiving member 90, the closed state of the bonnet 43 is maintained.

As shown in FIG. 26, FIG. 27, FIG. 29, and FIG. 30, the receiving member 90 includes a first receiving member 91 and a second receiving member 92.

Figure 29:
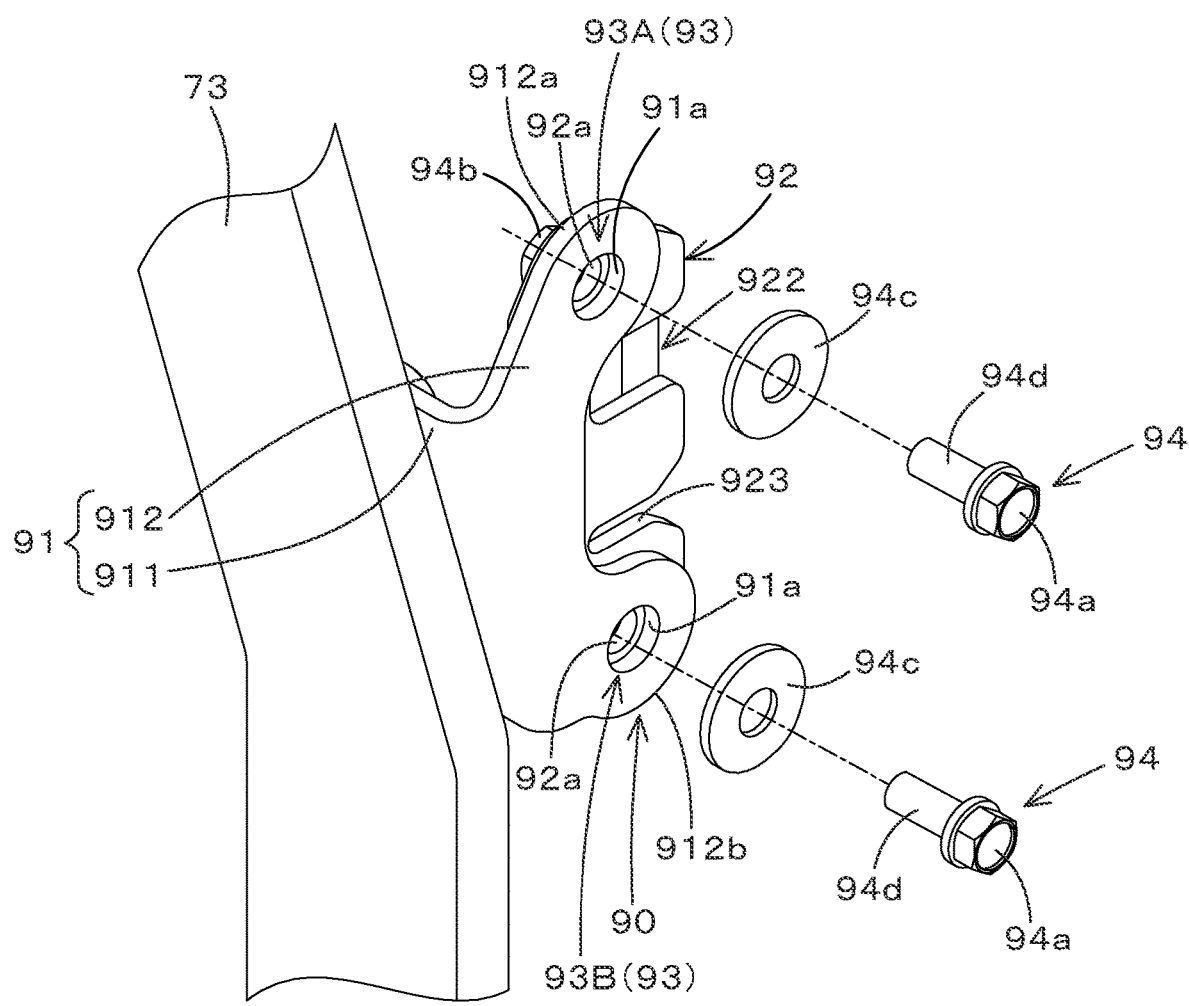
FIG. 29 is an exploded perspective view of the receiving member seen from the left front according to the embodiment.
Figure 30:
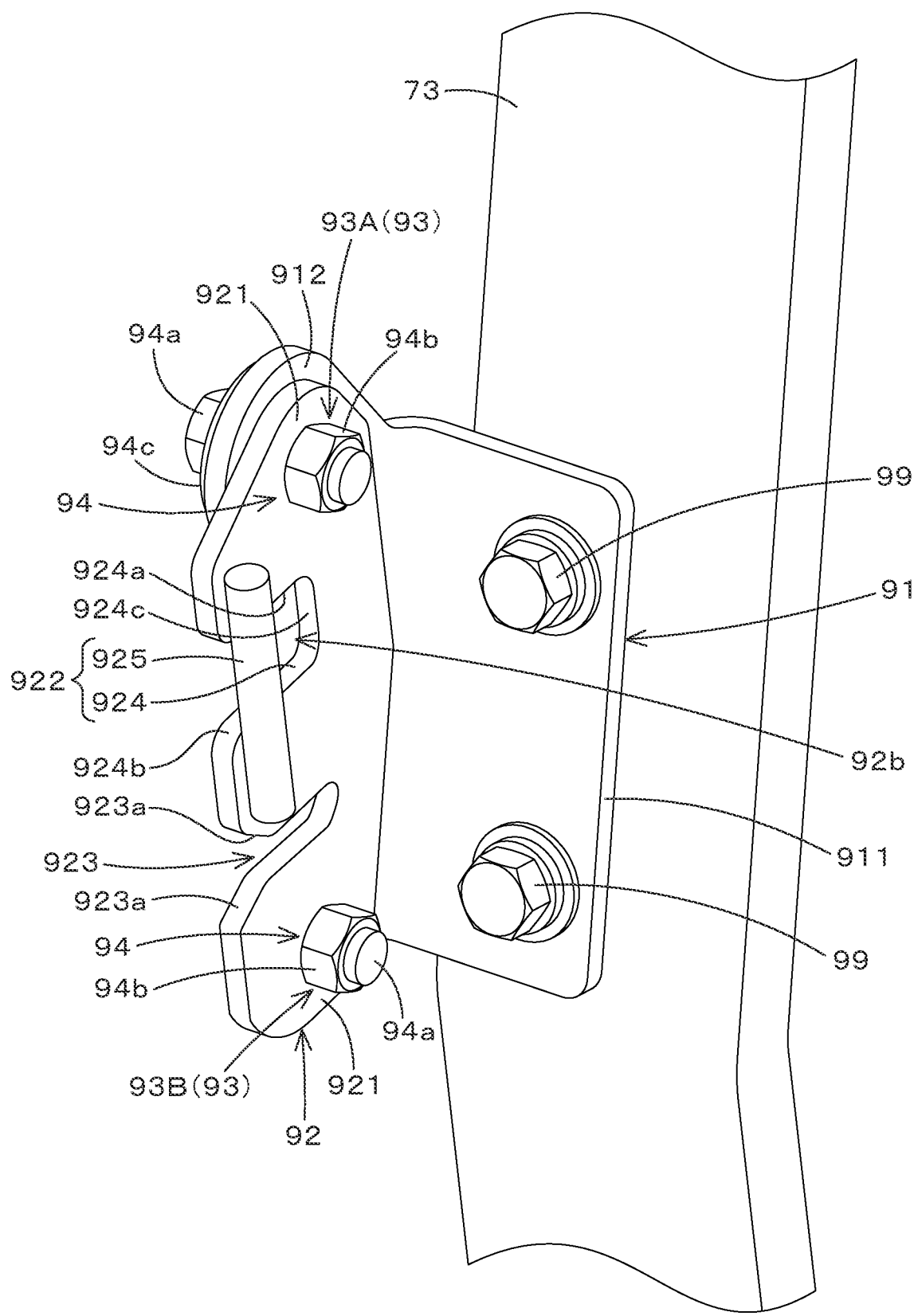
FIG. 30 is a perspective view of the receiving member seen from the right rear according to the embodiment.

The first receiving member 91 is attached to the rear surface of the third leg 73 provided standing on the right rear portion of the machine body 2. As shown in FIG. 29 and FIG. 30, the first receiving member 91 has a first attachment portion 911 and a second attachment portion 912. The first attachment portion 911 and the second attachment portion 912 are formed by bending a single piece of plate at a substantially right angle. The first attachment portion 911 has one surface facing the front and the other surface facing the rear. The second attachment portion 912 has one surface facing the left and the other surface facing the right.

Figure 27:
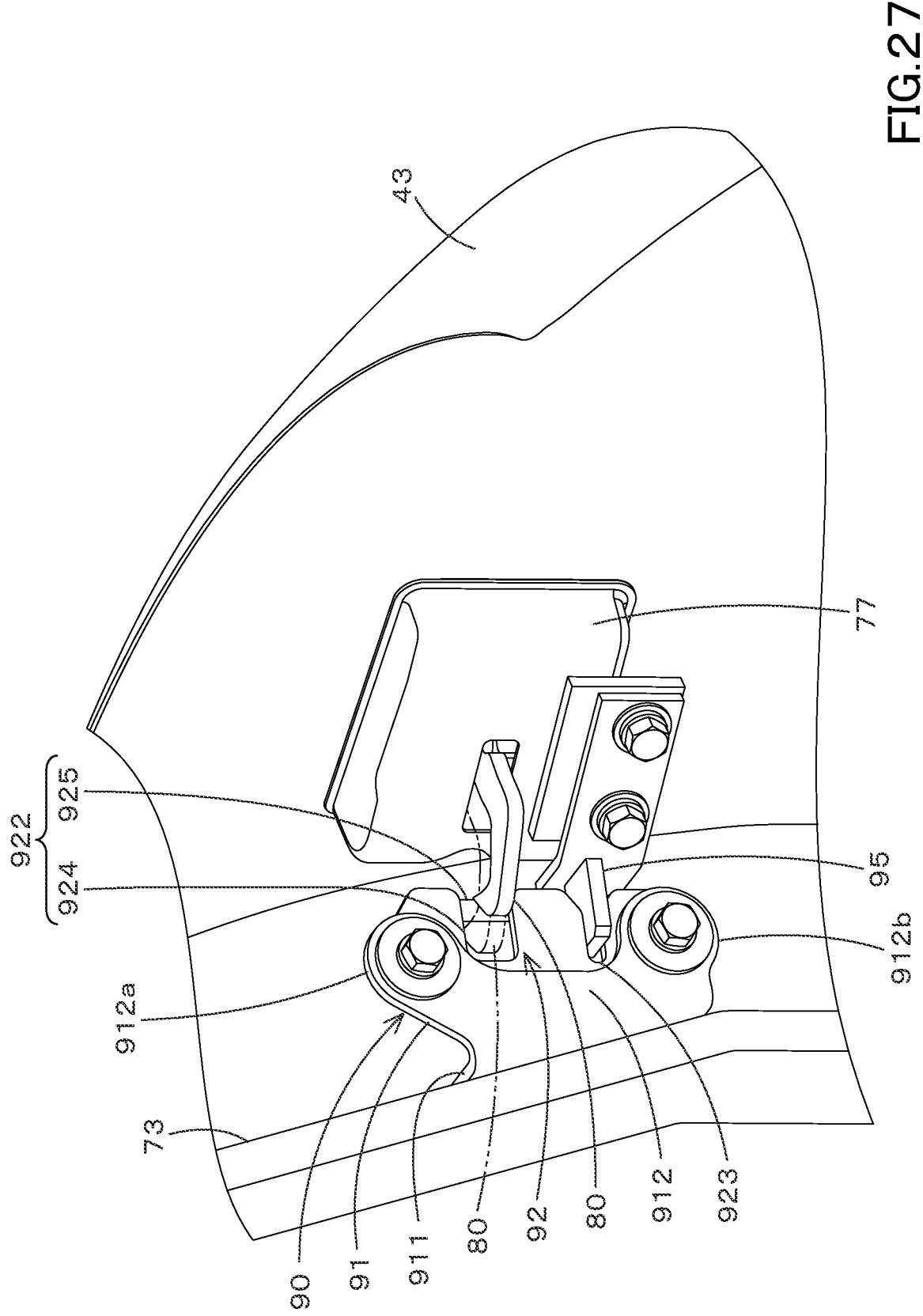
FIG. 27 is a perspective view illustrating a state where the engagement piece is engaged with an engagement shaft and another state where the engagement piece is disengaged according to the embodiment.

As shown in FIG. 30, the first attachment portion 911 is attached to the rear surface of the third leg 73 with a bolt 99. A second receiving member 92 is attached to the second attachment portion 912. As shown in FIG. 27 and FIG. 29, the second attachment portion 912 has projecting portions 912a and 912b projecting backward. The protruding portion 912a is provided on the upper portion of the first receiving member 91. The protruding portion 912b is provided at the lower portion of the first receiving member 91. A first hole 91a is formed in each of the protruding portions 912a and 912b. That is, the first hole 91a is formed in each of the upper portion and the lower portion of the second attachment part 912.

As shown in FIG. 26, FIG. 30 and the like, the second receiving member 92 is formed in a flat plate shape that has one surface facing the left and the other surface facing the right. The second receiving member 92 is provided extending toward the rear (extending from the machine body 2 side toward the bonnet 43 side). The second receiving member 92 has an attachment portion 921, a latching portion 922, and a slit 923. The attachment portions 921 are provided on the upper portion and lower portion of the second receiving member 92, and are attached to the second attachment portion 912 of the first receiving member 91. Each of the attachment portions 921 has a second hole 92a. The number of the second holes 92a is the same as the number of the first holes 91a provided in the first receiving member 91. In the present embodiment, the number is two.

As shown in FIG. 26, FIG. 29, and FIG. 30, the first receiving member 91 and the second receiving member 92 are connected by a connecting member 94. The connecting member 94 includes a bolt 94a, a nut 94b, and a washer 94c. The connection between the first receiving member 91 and the second receiving member 92 by the connecting member 94 (the attachment of the second receiving member 92 to the first receiving member 91) is realized by overlapping one surface (the left surface) of the attachment portion 921 of the second receiving member 92 with the other surface (the right surface) of the attachment portion 921 of the first receiving member 9. In particular, the first hole 91a, the second hole 92a, and the washer 94c are overlapped, the screw shaft 94d of the bolt 94a is inserted thereto, and the nut 94b is screwed onto the screw shaft 94d. Hereinafter, the screw shaft 94d is referred to as an inserting portion 94d.

As shown in FIG. 26 and FIG. 30, the latching portion 922 of the second receiving member 92 has a concave portion 924 and a latching shaft 925.

The concave portion 924 is formed by cutting out the rear edge (the edge on the bonnet 43 side) of the second receiving member 92 toward the front (orientated from the bonnet 43 side toward the machine body 2 side). The concave portion 924 is formed in a substantially rectangular shape, and has an upper edge 924a, a lower edge 924b, and a front edge 924c. The upper edge 924a and the lower edge 924b extend in the front-rear direction in parallel with each other. The front edge 924c extends in the vertical direction and connects the front portion of the upper edge 924a and the front portion of the lower edge 924b.

The latching shaft 925 is a columnar shaft, and is provided extending in the vertical direction on the rear side (the bonnet 43 side) of the concave portion 924. As shown in FIG. 30, the latching shaft 925 is fixed to the other surface (the right surface) of the second receiving member 92 by the welding or the like. The upper portion of the latching shaft 925 is fixed above the rear portion of the upper edge 924a of the concave portion 924. The lower portion of the latching shaft 925 is fixed below the rear portion of the lower edge 924b of the concave portion 924. The inner edge (the upper edge 924a, the lower edge 924b, the front edge 924c) of the concave portion 924 and the latching shaft 925 form a space 926 having a substantially rectangular shape into which the tip end of the latching piece 80 is inserted.

As shown in FIG. 28, when the bonnet 43 is closed, the latching shaft 925 and the vertical axis 79 are arranged side by side in a direction (the front-rear direction) parallel to the extending direction of the second receiving member 92. In FIG. 28, the arrangement direction of the latching shaft 925 and the vertical axis 79 is indicated by a one-dot chain line L.

FIG. 27 and FIG. 28, the latching piece 80 is latched to the latching portion 922. In particular, the latching piece 80 is latched to the latching shaft 925 of the latching portion 922. When the latching piece 80 is latched to the latching shaft 925, the closed state of the bonnet 43 can be maintained. The bonnet 43 can be opened by releasing the latching of the latching piece 80 with respect to the receiving member 90.

Figure 31:
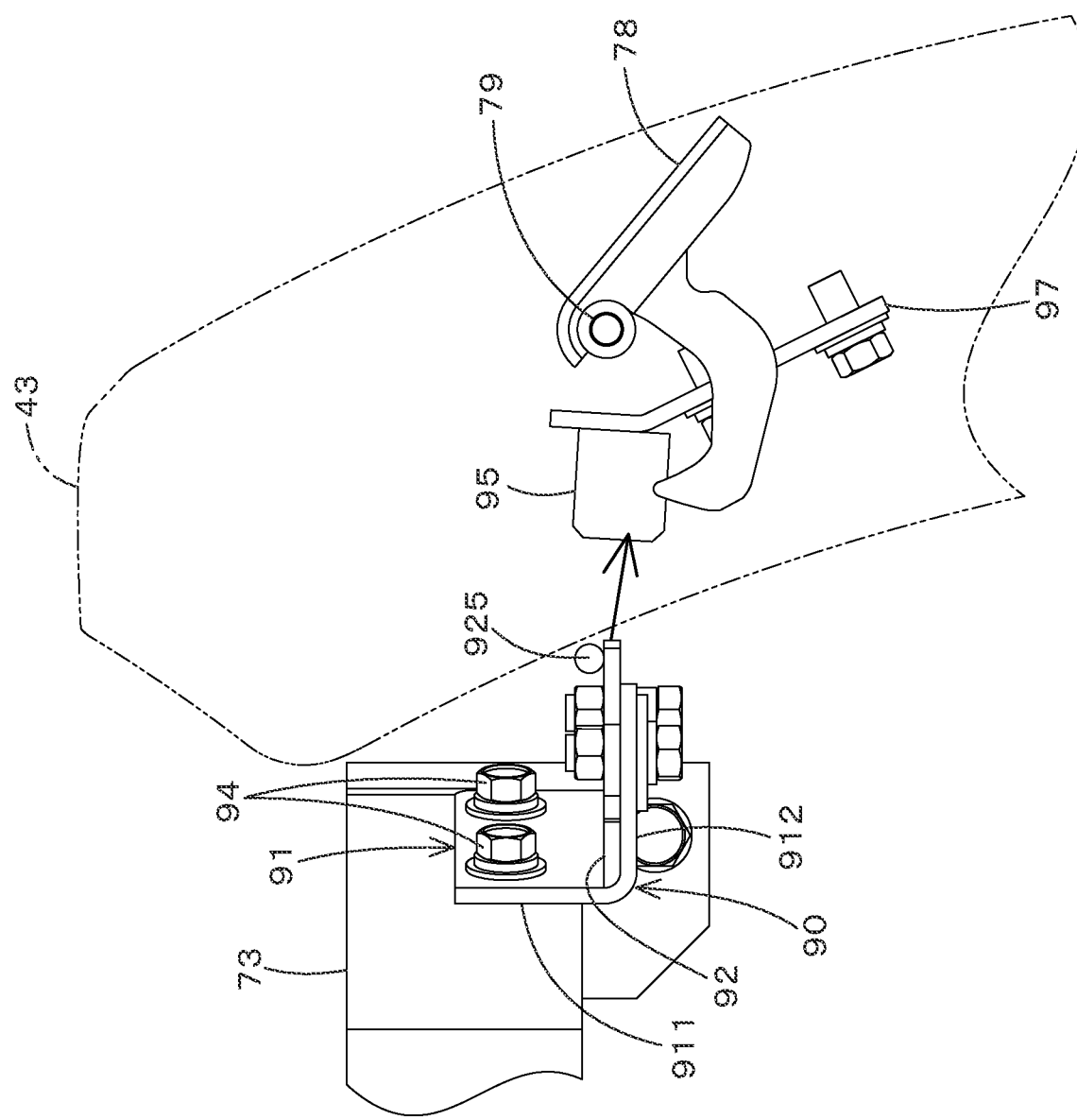
FIG. 31 is a plan view illustrating the engagement member and the receiving member under the state where the bonnet is opened according to the embodiment.

When the operation plate 78 is operated, the latching piece 80 is latched to the receiving member 90 and is released from the receiving member 90. In particular, as shown in FIG. 28, when the operating piece 78 is swung, the latching piece 80 rotates around the operating shaft 79 serving as a fulcrum. When the latching piece 80 is rotated forward, the state where the latching to the latching shaft 925 is released (see the image line) is switched to the latched state (see the solid line). On the other hand, when the latching piece 80 is rotated forward, the state where the latching piece 80 is latched to the latching shaft 925 (see the solid line) is switched to the state where the latching is released (see the image line). In FIG. 2seventhe state where the latching piece 80 is latched to the latching shaft 925 is indicated by an image line, and the state where the latching is released is indicated by a solid line. As shown in FIG. 31, when the latching piece 80 is released from the latching shaft 925, the bonnet 43 can be opened.

As shown in FIG. 26, FIG. 27, FIG. 29, and FIG. 30, a slit 923 is provided below the latching portion 922. The slit 923 is formed from the bonnet 43 side (the rear side) toward the machine body 2 side (the front side). The slit 923 is formed wider on the bonnet 43 side than on the machine body 2 side. In particular, as shown in FIG. 30, the slit 923 has an extended portion 923a having a wider width on the bonnet 43 side. The extended portion 923a is provided at the rear portion of the slit 923, and is formed so that the width gradually increases toward the rear.

As shown in FIG. 27 and FIG. 28, the insertion plate 95 is inserted into the slit 923 under the state where the bonnet 43 is closed. The insertion plate 95 provides a function of suppressing vibration of the bonnet 43 when the bonnet 43 is closed. In addition, by inserting the insertion plate 95 into the slit 923, the latching piece 80 is reliably guided to an appropriate position (a position where latching is possible) with respect to the latching shaft 925. The extension portion 923a serves as a guide for inserting the insertion plate 95 into the slit 923. When the bonnet 43 is opened, the insertion plate 95 leaves from the slit 923 (see FIG. 31) from the state inserted in the slit 923 (refer to FIG. 28).

At least one of the first receiving member 91 and the second receiving member 92 has an adjustment portion 93. The adjustment portion 93 can adjust the relative position between the first receiving member 91 and the second receiving member 92. In other words, the adjustment portion 93 can adjust the position of the second receiving member 92 with respect to the first receiving member 91. As shown in FIG. 29 and FIG. 30, the adjustment portion 93 includes an upper adjustment portion 93A and a lower adjustment portion 93B. The upper adjustment portion 93A is provided above the latching portion 922. The lower adjustment portion 93B is provided below the latching portion 922. The slit 923 is located between the upper adjustment portion 93A and the lower adjustment portion 93B.

The adjustment portion 93 (the upper adjustment portion 93A, the lower adjustment portion 93B) includes at least one of a first hole 91a provided in the first receiving member 91 and a second hole 92a provided in the second receiving member 92. The hole (at least one of the first hole 91a and the second hole 92a) is formed in a size having a gap (clearance) with respect to the outer diameter of the inserting portion 94d of the bolt 94a. That is, the adjustment portion 93 includes a hole formed in a size having the gap with respect to the outer diameter of the insertion part 94d. The gap allows movement of the second receiving member 92 relative to the first receiving member 91 in the vertical direction and the front-rear direction.

As a method of forming the first hole 91a and/or the second hole 92a to have a size having the gap, a method of forming the diameter (the inner diameter) of the circular hole to be larger than the outer diameter of the inserting portion 94d or a method of forming the shape of hole to be a shape other than circular is employed. In this embodiment, the former method is employed. In particular, the first hole 91a and the second hole 92a are circular holes, the inner diameter of the first hole 91a is larger than the inner diameter of the second hole 92a to have a size providing a gap with respect to the outer diameter of the inserting portion 94d.

Figure 32:
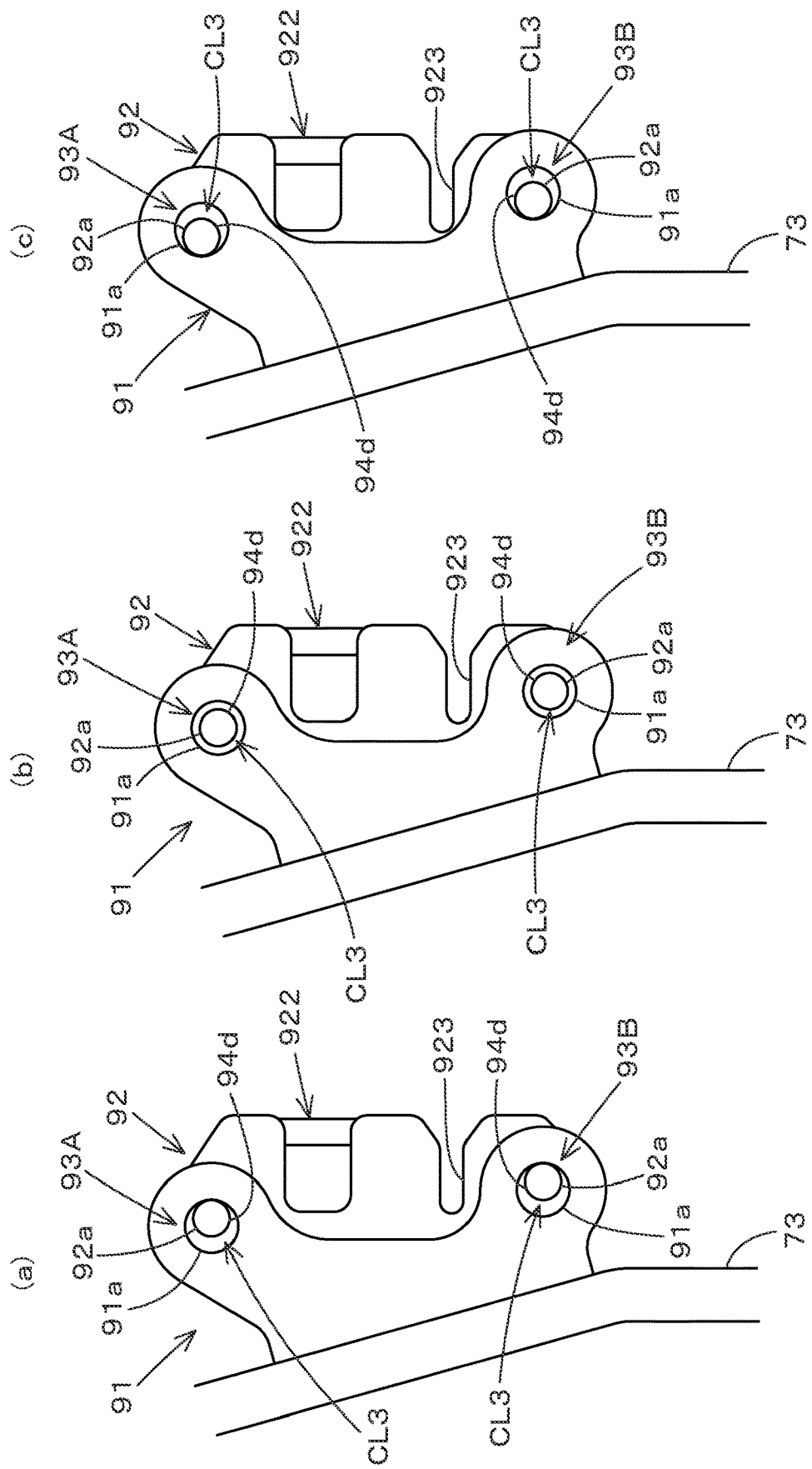
FIG. 32 is an explanation view of position adjustment using an adjustment portion according to the embodiment.

In the case of the present embodiment, of the first hole 91a and the second hole 92a, the first hole 91a is formed to have a size having a gap CL3 with respect to the outer diameter of the inserting portion 94d as shown in FIG. 32. In FIG. 32, the outer diameter of the inserting portion 94d is overlapped with the inner diameter of the first hole 91a, and the gap CL3 is formed between the inserting portion 94d and the first hole 91a. In this case, the position of the first hole 91a with respect to the inserting portion 94d can be adjusted. In this manner, the position of the second receiving member 92 with respect to the first receiving member 91 can be adjusted with use of the gap CL3. When the reference position employs the position of the second receiving member 92 with respect to the first receiving member 91 shown in FIG. 32B, FIG. 32(a) shows a state where the position of the second receiving member 92 is positioned behind the reference position (on the bonnet 43 side). FIG. 32 (c) shows a state where the position of the second receiving member 92 is positioned forward (the body 2 side) from the reference position. In this manner, the position of the second receiving member 92 relative to the first receiving member 91 can be adjusted forward or backward. Although not shown in the drawings, the position of the second receiving member 92 relative to the first receiving member 91 can be adjusted upward or downward.

Here, the first receiving member 91 is fixed to the machine body 2, and the second receiving member 92 is provided with a latching portion 922. Thus, by adjusting the position of the second receiving member 92 with respect to the first receiving member 91, the position of the latching portion 922 in the machine body 2 can be adjusted. In this manner, the position of the latching portion 922 can be adjusted with respect to the latching piece 80 provided in the bonnet 43.

In addition, at least one of the first receiving member 91 and the machine body 2 includes a second adjustment portion that is configured to adjust the relative position between the first receiving member 91 and the machine body 2. The second adjustment portion includes at least one of a hole provided in the first attachment portion 911 of the first member 91 and a hole provided in the third leg 73 of the support leg 70. These holes serves as a hole for attaching the first receiving member 91 to the third leg 73 and a hole through which the screw shafts of the bolts 99 shown in FIG. 30 are inserted.

At least one of the hole provided in the first attachment portion 911 and the hole provided in the third leg 73 has a size having a gap (a clearance) with respect to the outer diameter of the screw shaft of the bolt 99. That is, a hole formed in a size having the gap with respect to the outer diameter of the screw shaft of the bolt 99 is included in the second adjustment portion. This gap allows the first receiving member 91 to move relative to the machine body 2 in the vertical direction and the horizontal direction.

<Belt Tension Adjustment Device>

Figure 33:
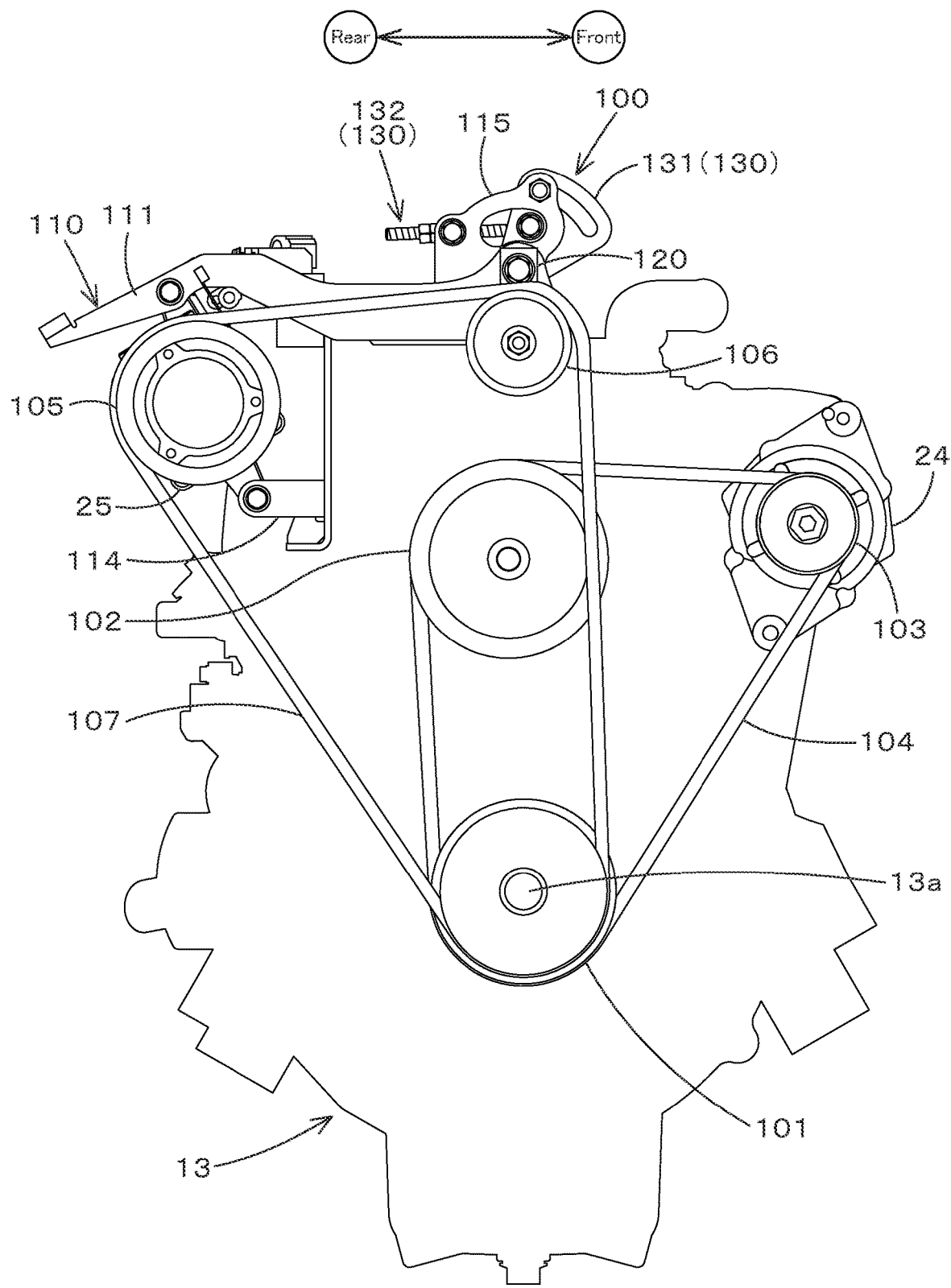
FIG. 33 is a side view of a prime mover seen from an output shaft (a crank shaft) side according to the embodiment.
Figure 34:
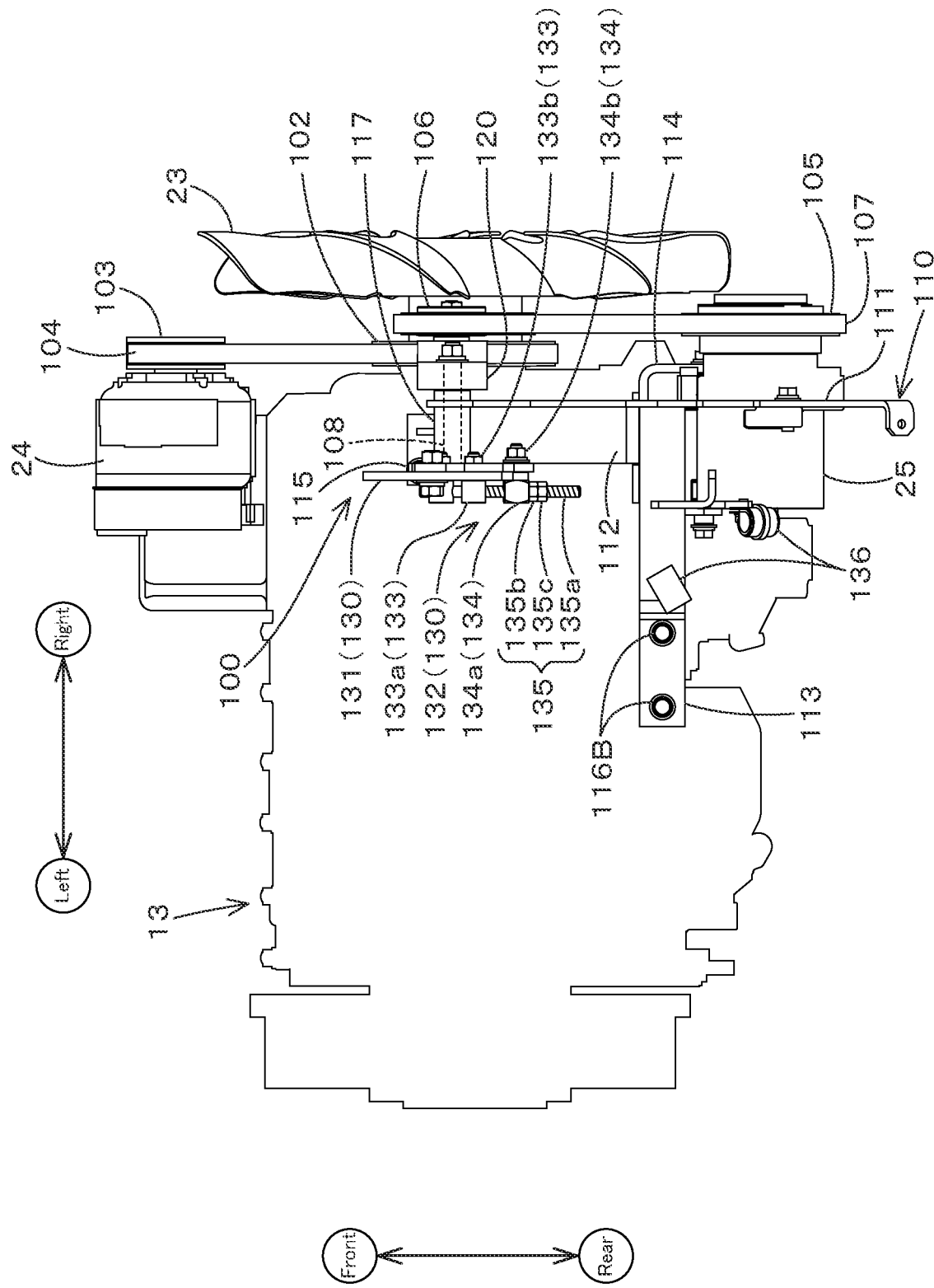
FIG. 34 is a plan view of the prime mover seen from above according to the embodiment.

FIG. 33 is a view of the prime mover 13 seen from the output shaft (the crank shaft, the power transmission shaft) side. FIG. 34 is a view of the prime mover 13 seen from above.

A driving pulley 101 is attached to the output shaft 13a of the prime mover 13. The driving pulley 101 has two belt grooves arranged in the axial direction of the output shaft 13a. Endless (looped) belts (a first belt 104 and a second belt 107 described later) are wound around the two belt grooves, respectively.

A fan pulley 102 is provided above the driving pulley 101. A fan 23 is connected to the fan pulley 102 (the fan 23 is not shown in FIG. 33). An input pulley 103 of the alternator 24 is provided in front of the fan pulley 102. The rotational shafts of the driving pulley 101, the fan pulley 102, and the input pulley 103 are arranged in parallel to each other. The driving pulley 101, the fan pulley 102, and the input pulley 103 are arranged in a triangular shape when in view from the output shaft 13a side. A belt (the first belt) 104 is provided over the driving pulley 101, the fan pulley 102, and the input pulley 103. Power from the output shaft 13a of the prime mover 13 is transmitted from the driving pulley 101 to the fan pulley 102 and the input pulley 103 through the first belt 104. In this manner, the fan 23 and the alternator 24 are driven by the driving power of the prime mover 13.

A driven pulley 105 is provided above and behind the driving pulley 101. The driven pulley 105 is an input pulley provided in the compressor (a driven device) 25. A tension pulley 106 is provided above the driving pulley 101 in front of the driven pulley 105. The rotation shafts of the driving pulley 101, the driven pulley 105, and the tension pulley 106 are arranged in parallel to each other. The driving pulley 101, the driven pulley 105, and the tension pulley 106 are arranged in a triangular shape in view from the output shaft 13a side. A belt (the second belt) 107 is provided over the driving pulley 101, the driven pulley 105, and the tension pulley 106. The second belt 107 transmits the rotation driving force of the output shaft (the power transmission shaft) 13a to the compressor (the driven device) 25. The tension of the second belt 107 can be adjusted by the belt tension adjustment device 100.

The configuration of the belt tension adjustment device 100 will be described below mainly with reference based on FIG. 35 to FIG. 39.

The belt tension adjustment device 100 includes a support shaft 108, a bracket 110, a rotating member 120, and a rotating-operation mechanism 130.

The support shaft 108 is arranged on the left side of the tension pulley 106 above the tension pulley 106, and is supported rotatably at a position different from the position of the rotation shaft 106a of the tension pulley 106. The support shaft 108 is parallel to the rotation shaft 106a, and one end side of the support shaft 108 is arranged on the tension pulley 106 side (on the right side), and the other end side is arranged on the side opposite to the tension pulley 106 side (on the left side). The support shaft 108 is rotatably supported by the bracket 110.

Figure 35:
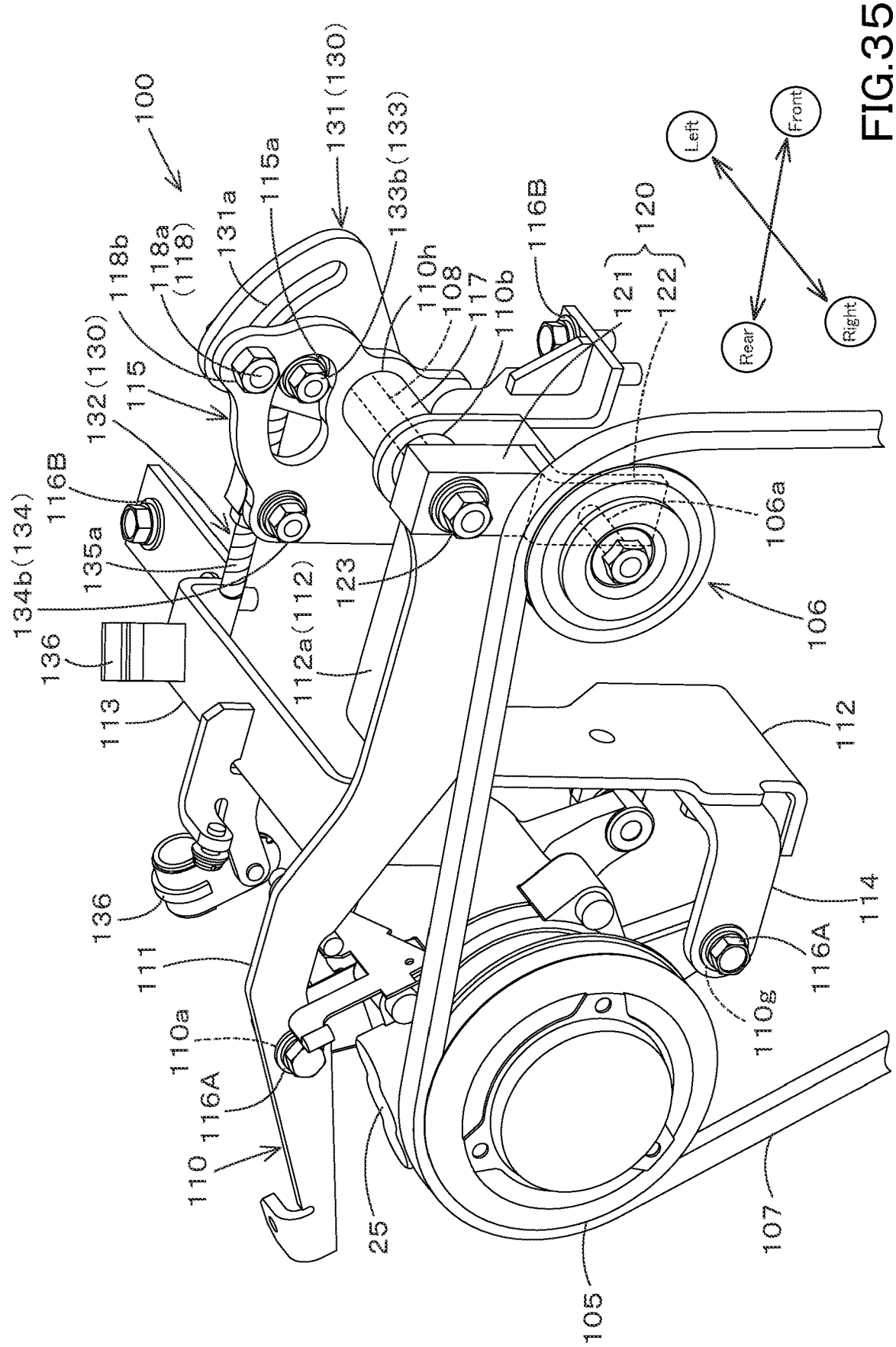
FIG. 35 is a perspective view of a belt tension adjustment device seen from a side of the output shaft of the prime mover according to the embodiment.
Figure 36:
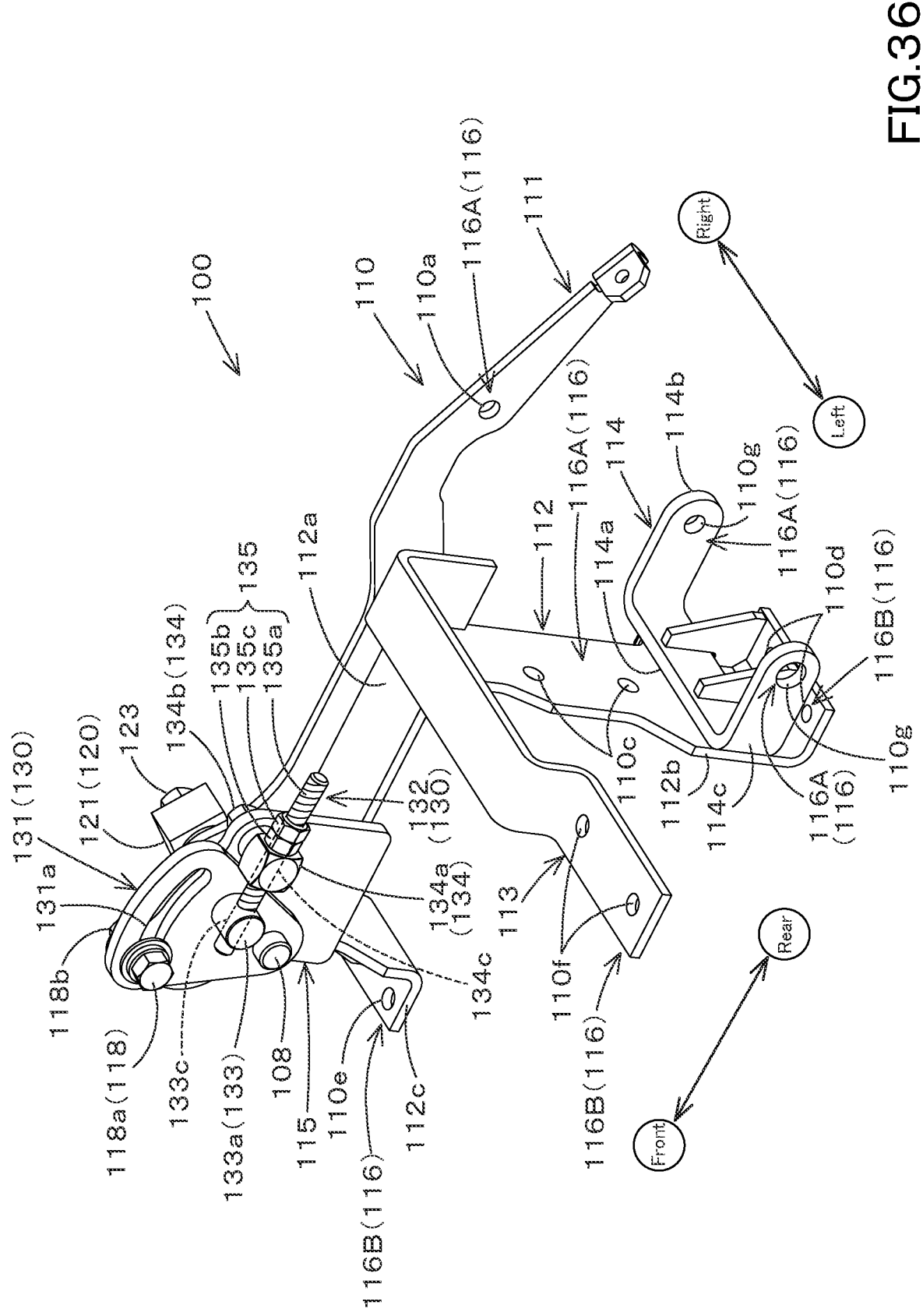
FIG. 36 is a perspective view of a bracket, a rotational operation mechanism, and a rotating member according to the embodiment.

As shown in FIG. 33 and FIG. 34, the bracket 110 is arranged above the prime mover 13. As shown in FIG. 35 and FIG. 36, the bracket 110 has a first main member 111, a second main member 112, a first sub member 113, a second sub member 114, and a third sub member 115. The first main member 111, the second main member 112, the first sub member 113, the second sub member 114, and the third sub member 115 are connected and integrated by welding or the like.

The first main member 111 is a plate-like member extending in the front-rear direction (in a direction orthogonal to the output shaft 13a), and has one surface facing the right and the other surface facing the left. As shown in FIG. 33 to FIG. 35, one end side (the front end side) of the first main member 111 is located above the compressor 25, and the other end side (the rear end side) is located on the left side of the tension pulley 106 above the tension pulley 106. As shown in FIG. 35 and FIG. 36, the first main member 111 has a first through hole 110a on the one end side and has a second through hole 110b on the other end side.

As shown in FIG. 36, the second main member 112 has an upper portion 112a, a front portion 112b, and a rear portion 112c. The upper portion 112a, the front portion 112b, and the rear portion 112c are integrally formed by bending one strip-shaped plate. The upper portion 112a is connected to the other surface (the left surface) of the first main member 111 and extends in the front-rear direction. The front portion 112b has a vertical portion that is bent from the front portion of the upper portion 112a and extends downward, and has a lateral portion that is bent from the lower end portion of the vertical portion and extends forward. A third through hole 110c is provided in the vertical portion of the front portion 112b. A fourth through hole 110d is provided in the lateral portion of the front portion 112b. The rear portion 112c has a vertical portion that is bent from the rear portion of the upper portion 112a and extends downward, and has a lateral portion that is bent from the lower end portion of the vertical portion and extends forward. A fifth through hole 110e is provided in the lateral portion of the rear portion 112c.

Figure 37:
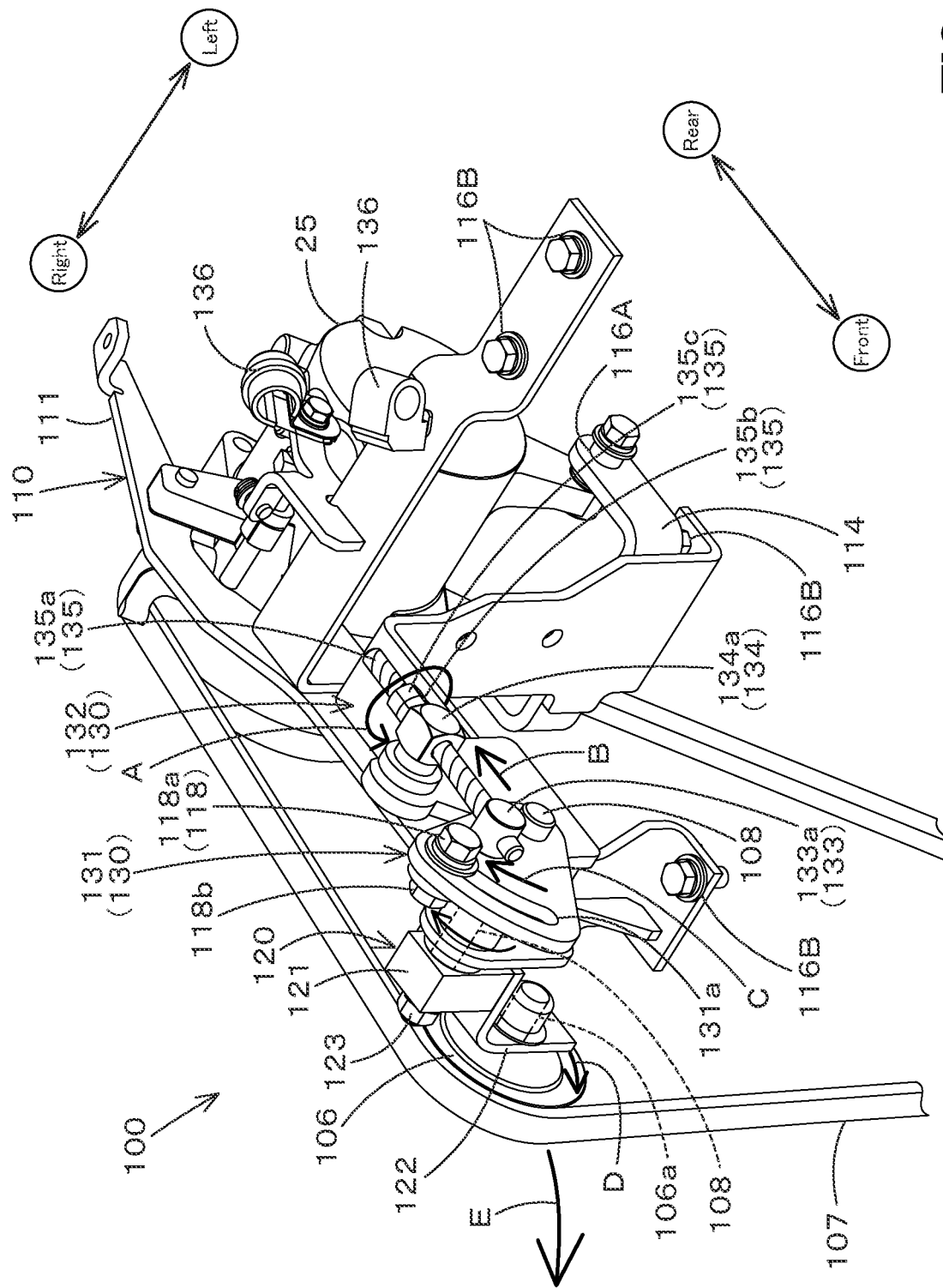
FIG. 37 is a perspective view of the belt tension adjustment mechanism seen from a side opposite to the output shaft of the prime mover according to the embodiment.

The first sub member 113 extends in the machine width direction (the left-right direction). One end side (the left side) of the first sub member 113 is bent downward and connected to the other side (the left side) of the first main member 111. A sixth through hole 110f is provided on the other end side (the left side) of the first sub member 113. As shown in FIG. 35 and FIG. 37, a clamp 136 for holding a pipe connected to the compressor 25 is attached to the first sub member 113.

The second sub member 114 has an intermediate portion 114a, a right portion 114b, and a left portion 114c. The intermediate portion 114a is connected to the front portion 112b of the second main member 112 and extends in the machine width direction. The right portion 114b is bent from one end (the right end) of the intermediate portion 114a and extends forward. The left portion 114c is bent from the other end (the left end) of the intermediate portion 114a and extends forward. A seventh through hole 110g is provided in the right portion 114b and the left portion 114c.

The third sub member 115 is a plate-like member, and has one surface facing the right and the other surface facing the left. The third sub member 115 is connected to the upper portion 112a of the second main member 112. As shown in FIG. 35, one surface (the right surface) of the third sub member 115 is opposed to the other surface (the left surface) of the first main member 111 with the upper portion 112a interposed therebetween. The third sub member 115 has an eighth through hole 110h and an elongated hole 115a. The elongated hole 115a is located above the support shaft 108 and is formed in an arc shape around the support shaft 108.

As shown in FIG. 35 and FIG. 36, the bracket 110 has a fixing portion 116, a supporting portion 117, and an inserting portion 118.

The fixing portion 116 includes a first fixing portion 116A fixed to the compressor 25, and includes a second fixing portion 116B fixed to the prime mover 13. The first fixing portion 116A includes the first through hole 110a, the third through hole 110c, and the seventh through hole 110g. The first fixing portion 116A is fixed to the compressor 25 by putting a bolt into the first through hole 110a, the third through hole 110c, and the seventh through hole 110g and then by screwing the bolt to a female thread portion provided in the compressor 25. The second fixing portion 116B includes the fourth through hole 110d, the fifth through hole 110e, and the sixth through hole 110f. The second fixing portion 116B is fixed to the prime mover 13 by putting a bolt into the fourth through hole 110d, the fifth through hole 110e, and the sixth through hole 110f and then by screwing the bolt to a female thread portion provided in the prime mover 13.

The supporting portion 117 supports the supporting shaft 108 rotatably. As shown in FIG. 35, the supporting portion 117 is constituted of a cylindrical body extending in the machine width direction (in an axial direction of the rotating shaft 106a of the tension pulley). The cylindrical body constituting the supporting portion 117 is fitted and fixed to the second through hole 110b of the first main member 111 and to the eighth through hole 110h of the third sub member 115, and the support shaft 108 penetrates the cylindrical body. Both ends of the support shaft 108 protrude from the cylindrical body (the supporting portion) 117.

As shown in FIG. 35, the inserting portion 118 penetrates through the upper portion of the third sub member 115 (above the elongated hole 115a). The inserting portion 118 is constituted of a screw shaft of a bolt 118a, and the screw shaft penetrates through the third sub member 115 and then is inserted into a guide hole 131a of the movable member 131 described later. A nut 118b is screwed onto the screw shaft of the bolt 118a.

The rotating member 120 connects the support shaft 108 to the tension pulley 106, and changes the relative position of the tension pulley 106 with respect to the driving pulley 101 and the driven pulley 105 in synchronization with the rotating of the support shaft 108. In particular, the rotating member 120 moves the tension pulley 106 in synchronization with the rotating of the support shaft 108. As shown in FIG. 35 and FIG. 37, the rotating member 120 has a first portion 121 and a second portion 122. The first portion 121 is attached to one end side (the right side) of the support shaft 108. In particular, one end side of the support shaft 108 penetrates through the first portion 121, and then a nut 123 is screwed to a male screw formed in the penetrating portion. The second portion 122 extends downward from the first portion 121. The second portion 122 supports the rotation shaft 106a of the tension pulley 106 in a rotatable manner.

Since the first portion 121 is attached to the support shaft 108, the first portion 121 rotates in synchronization with the rotating of the support shaft 108. The second portion 122 rotates about the support shaft 108 in synchronization with the rotating of the first portion 121. Since the second portion 122 supports the rotation shaft 106a of the tension pulley 106, the tension pulley 106 rotates together with the second portion 122. That is, the tension pulley 106 rotates about the support shaft 108 in synchronization with the rotating of the support shaft 108. The rotational direction of the tension pulley 106 is determined in accordance with the rotational direction of the support shaft 108.

The rotating-operation mechanism 130 is a mechanism configured to rotate the support shaft 108 around its axis.

As shown in FIG. 35 to FIG. 37, the rotating-operation mechanism 130 includes a movable member 131 and an operation portion 132.

The movable member 131 is a plate-like member, and has one surface facing the right and the other surface facing the left. The movable member 131 has a fan-blade shape viewed from the axial center direction of the support shaft 108. As shown in FIG. 36 and FIG. 37, the movable member 131 is attached to the other end side (the left side) of the support shaft 108. In this manner, the movable member 131 is capable of rotating together with the support shaft 108. As shown in FIG. 35 and the like, one surface (the right surface) of the movable member 131 is in contact with (or close to) the other surface (the left surface) of the third sub member 115.

The movable member 131 has a guide hole 131a. The guide hole 131a is formed in a circular arc shape around the support shaft 108. Both the guide hole 131a and the elongated hole 115a are formed in an arc shape around the support shaft 108. However, the distances from the support shaft 108 (the radiuses of curvature of the arc) are different in the guide hole 131a and in the elongated hole 115a. In particular, the guide hole 131a is located above the elongated hole 115a (on the side separating away from the support shaft 108).

As shown in FIG. 35 to FIG. 37, the inserting portion 118 of the bracket 110 (the screw shaft of the bolt 118a) is inserted into the guide hole 131a. The inserting portion 118 changes its position in the guide hole 131a in synchronization with the rotating of the movable member 131 around the support shaft 108. In particular, when the movable member 131 rotates around the support shaft 108, the inserting portion 118 attached to the bracket 110 does not move, but the guide hole 131a moves together with the movable member 131, so that the position of the inserting portion 118 changes in the guide hole 131a. The guide hole 131a and the inserting portion 118 constitute a restriction mechanism that restricts the movement direction and movement range of the movable member 131 relative to the bracket 110, and thus the restriction mechanism constitutes a part of the rotating-operation mechanism 130.

The operation portion 132 is operated to rotate the movable member 131 together with the support shaft 108. In other words, by operating the operation portion 132, the movable member 131 rotates together with the support shaft 108. As shown in FIG. 34, FIG. 35, and FIG. 37, the operation portion 132 is arranged on the other side of the support shaft 108 (on a side opposed to the tension pulley 106 side). As shown in FIG. 35 to FIG. 37, the operation portion 132 includes a first fixing member 133, a second fixing member 134, and an adjustment mechanism 135.

The first fixed member 133 is fixed to the movable member 131. The first fixing member 133 is provided between the support shaft 108 and the guide hole 131a (above the support shaft 108 and below the guide hole 131a). In the case of this embodiment, the first fixing member 133 is constituted of the bolt 133a and the nut 133b. The head of the bolt 133a is arranged on the other surface side (the left side) of the movable member 131, and the screw shaft penetrates through the movable member 131. The nut 133b is screwed to the screw shaft of the bolt 133a on one surface side (the right side) of the movable member 131. The nut 133b is arranged in the elongated hole 115a of the third sub member 115, and is capable of moving along the elongated hole 115a in synchronization with the rotating of the movable member 131. As shown in FIG. 36, the first fixing member 133 has a through hole 133c. The through hole 133c is provided at the head of the bolt 133a.

The second fixing member 134 is fixed to the bracket 110. In particular, the second fixing member 134 is fixed to the third sub member 115 of the bracket 110. In the case of this embodiment, the second fixing member 134 is constituted of a bolt 134a and a nut 134b. The head of the bolt 134a is arranged on the other surface side (the left side) of the third sub member 115 of the bracket 110, and then the screw shaft penetrates through the third sub member 115. The nut 134b is screwed to the screw shaft of the bolt 134a on one surface side (the right side) of the third sub member 115. As shown in FIG. 36, the second fixing member 134 has a through hole 134c. The through hole 134c is provided at the head of the bolt 134a.

The adjustment mechanism 135 is a mechanism configured to adjust the distance between the first fixing member 133 and the second fixing member 134. As shown in FIG. 36 and FIG. 37, the adjustment mechanism 135 includes a male screw member 135a, a female screw member (a nut) 135b, and a locking member 135c.

One end side (a front side) of the male screw member 135a is fixed to the first fixing member 133, and the other end side (a rear side) is inserted to the second fixing member 134. In particular, one end side of the male screw member 135a is inserted into and fixed to the through hole 133c of the first fixing member 133. The other end side of the male screw member 135a is inserted into the through hole 134c of the second fixing member 134, and is movable in the through hole 134c. The female screw member (a nut) 135b contacts to the second fixing member 134 on the other end side of the male screw member 135a, and is screwed to the male screw member 135a. In this manner, when the male screw member 135a is rotated, the male screw member 135a moves forward or backward in the hole axial direction of the through hole 134c.

The locking member 135c is a nut screwed into the male screw member 135a, and serves as a locking nut for preventing the female screw member 135b from loosening. The locking member 135c contacts to the female screw member 135b on the other end side (the rear side) of the female screw member 135b, and is screwed to the male screw member 135a. That is, the female screw member 135b is interposed between the locking member 135c and the second fixing member 134. By tightening the locking member 135c toward the female screw member 135b side, the female screw member 135b can be fixed (the rotation can be locked).

Figure 38:
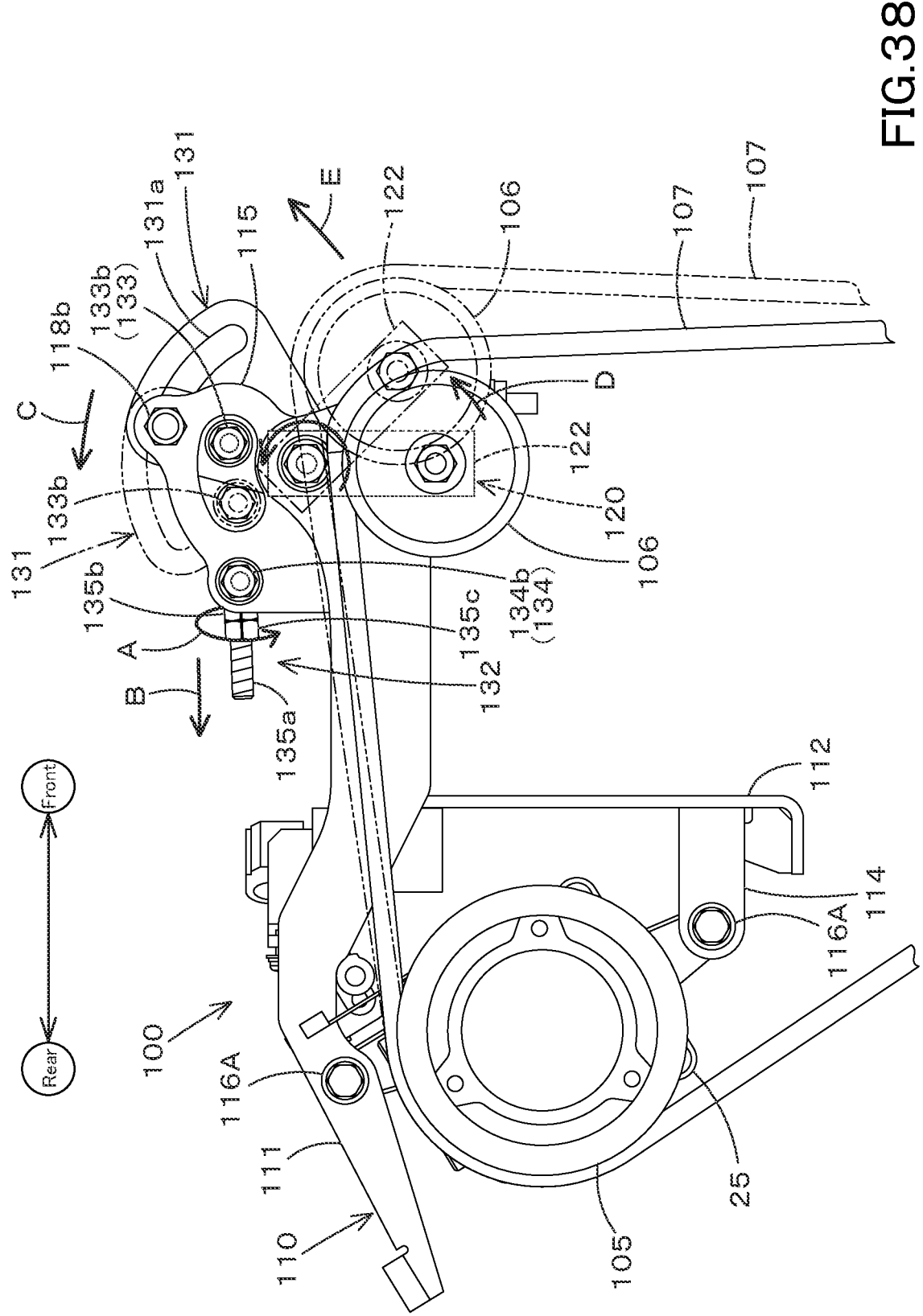
FIG. 38 is a view illustrating action of the belt tension adjustment device seen from the side of the output shaft of the prime mover according to the embodiment.
Figure 39:
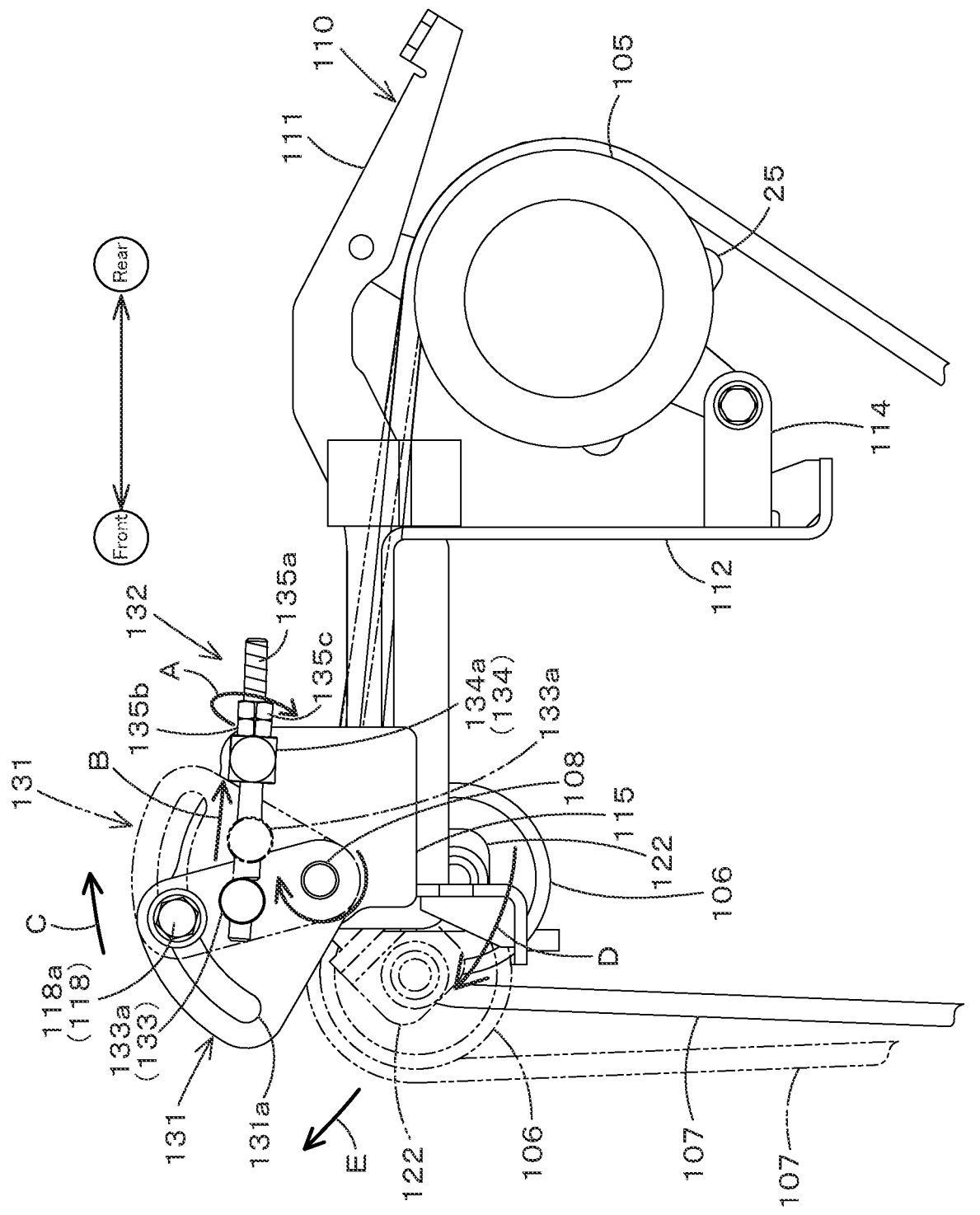
FIG. 39 is a view illustrating the action of the belt tension adjustment device seen from the side opposite to the output shaft of the prime mover according to the embodiment.

Hereinafter, the action (the movement) of the belt tension adjustment device 100 will be described mainly with reference to FIG. 37 to FIG. 39.

First, the operation in the case where the tension of the second belt 107 is increased (the second belt 107 is tensioned) will be described. In FIG. 37 and FIG. 38, the state before the movement is indicated by a solid line, and the state after the movement is indicated by an image line. In order to increase the tension of the second belt 107, the female screw member 135b of the operation portion 132 is rotated in the forward direction (in a direction indicated by an arrowed line A). This forward direction is a direction in which the female screw member 135b is tightened. When the female screw member 135b is rotated in the forward direction, the male screw member 135a moves in one direction (in a direction indicated by an arrowed line B).

When the male screw member 135a moves in one direction (backward), the first fixed member 133 fixed to the movable member 131 by the male screw member 135a is pulled, and then the movable member 131 rotates in the forward direction (in a direction indicated by an arrowed line C) together with the support shaft 108. When the support shaft 108 rotates in the forward direction, the second portion 122 of the rotating member 120 rotates in the forward direction (is a direction indicated by an arrowed line D) around the support shaft 108. In synchronization with the rotating of the second portion 122, the tension pulley 106 rotates in the forward direction (in a direction indicated by an arrowed line E) about the support shaft 108. In this manner, the tension of the second belt 107 increases (the second belt 107 is tensioned).

Next, the operation to reduce tension of the second belt 107 (the operation to loose the second belt 107) will be described below. In FIG. 37 and FIG. 38, the state before the operation is indicated by an image line, and the state after the operation is indicated by a solid line. In order to reduce the tension of the second belt 107, the female screw member 135b of the operation portion 132 is rotated in the reverse direction (in the direction opposite to the arrowed line A). The reverse direction is a direction in which the female screw member 135b is loosened. When the female screw member 135b is rotated in the reverse direction, the male screw member 135a moves in the other direction (in the direction opposite to the arrowed line B). When the male screw member 135a moves in the other direction (forward), the first fixing member 133 fixed to the movable member 131 is pushed by the male screw member 135a, and thereby the movable member 131 rotates in the reverse direction (in the direction opposite to the arrowed line C) together with the support shaft 108. When the support shaft 108 rotates in the reverse direction, the second portion 122 of the rotating member 120 rotates in the reverse direction (in the direction opposite to the arrowed line D) around the support shaft 108. In synchronization with the rotating of the second portion 122, the tension pulley 106 rotates in the reverse direction (in the direction opposite to the arrowed line E) around the support shaft 108. In this manner, the tension of the second belt 107 is reduced (the second belt 107 is loosened).

As described above, when the female screw member 135b is rotated in the direction for tightening, the second belt 107 is tensioned, and when the female screw member 135b is rotated in the direction for loosening, the second belt 107 is loosened. In this manner, the operation (the fastening or releasing of the female screw member) and the result generated by the operation (tensioning or loosening of the belt) are likely to match with the operator's feeling.

According to the belt tension adjustment device 100 according to the embodiment described above, the tension pulley 106 can be moved to adjust the tension of the second belt 107. Thus, the tension of the second belt 107 can be adjusted without moving the compressor (the driven device) 25.

In the above-described embodiment, the belt tension adjustment device 100 is a device configured to adjust the tension of the second belt 107, but may be a device configured to adjust the tension of the first belt 104. In this case, a configuration may be employed where the alternator 24 is provided with the driven pulley 105, where the first belt 104 is wound over the driven pulley 105, the driving pulley 101 and the tension pulley 106, and where the tension pulley 106 is capable of being moved by the belt tension adjustment device 100.

In addition, the belt tension adjustment device 100 also can be applied to a belt that transmits the power of the prime mover 13 to the driven devices (for example, a hydraulic pump or the like) other than the compressor 25 and the alternator 24. In other words, the belt tension adjustment device 100 can be widely applied to a belt wound around a pulley of a driven device configured to receive the power of the prime mover 13 through belt transmission to be driven.

According to the working machine 1 according to the embodiment described above, the following effects are provided.

The working machine 1 includes the first supporting portions 61A and 61B that are arranged along the inner surface of the first lateral plate 8c and contact to the first lateral plate 8c, and includes the reinforcement plate 60 having first bent portions 63A and 63B that are bent from a position overlapped with the first pivot member 27 toward the second lateral plate 8d side via the first lateral plate 8c in the first supporting portions 61A and 61B.

According to that configuration, the first bent portions 63A and 63B, which are portions having high strength, is arranged near the inner surface of the first lateral plate 8c at a position where first bent portions 63A and 63B are overlapped with the first pivot member 27 via the first lateral plate 8c. In this manner, since the boom 8 can be reinforced strongly, the deformation of the first pivot member 27 caused by the load (the thrust power) acting from the first hydraulic cylinder 20 (in particular, deformation in which a clearance between the left plate 27L and the right plate 27R is widened or narrowed) is suppressed. As the result, the stress concentration generated at the end portion of the first pivot member 27 due to the deformation of the first pivot member 27 can be reduced, the deformation being generated due to the thrust power of the first hydraulic cylinder 20. In addition, since the boom 8 is firmly reinforced by the reinforcement plate 60, the stress concentration generated at the end portion of the first pivot member 27 also can be reduced, the stress concentration being generated due to the external force acting on the working device 5 constituted of the boom 8 and the arm 9.

In addition, the first bent portion 63A is arranged near the inner surface of the first lateral plate 8c at a position overlapped with the inner surface via the first lateral plate 8c between the pivot portion 271 and the end portion of the first pivot member 27 in the boom length direction. The first supporting portions 61A and 61B are arranged extending from the first bent portions 63A and 63B along the inner surface of the first lateral plate 8c in a direction separating away from the pivot portion 271.

According to that configuration, the first bent portions 63A and 63B are arranged, in the first lateral plate 8c, near the position overlapped with a portion between the first pivot portion 271 and the end portion of the first pivot member 27 in the boom length direction, that is, a position where the stress concentration is likely to occur, and thus the stress concentration generated at the end portion of the first pivot member 27 can be effectively reduced. In addition, the first supporting portion 61A is arranged extending from the first bent portions 63A and 63B along the inner surface of the first lateral plate 8c in the direction separating away from the pivot portion 271, that is, arranged on the side where the stress concentration is likely to occur. Thus, the stress concentration generated at the end portion of the first pivot member 27 can be reduced more effectively.

The reinforcement plate 60 includes the second supporting portions 62A and 62B arranged along the inner surface of the second lateral plate 8d and is in contact with the second lateral plate 8d, includes the second bent portions 64A and 64B bent from the second supporting portions 62A and 62B toward the first lateral plate 8c side, and includes the connecting portions 65A and 65B which connects the first bent portions 63A and 63B to the second bent portions 64A and 64B.

According to that configuration, the strength of the reinforcement plate 60 can be increased by the second bent portions 64A and 64B. In addition, the boom 8 can be reinforced more effectively by reinforcing the first lateral plate 8c and the second lateral plate 8d with the reinforcement plate 60.

In addition, the working machine 1 includes a second hydraulic cylinder 21 other than the first hydraulic cylinder 20 and a second pivot member 28 having a second pivot part 281 that is fixed to the outer surface of the second lateral plate 8c and pivotally supports one end of the second hydraulic cylinder 21. The second bent portion 64A is arranged close to the inner surface of the second lateral plate 8d at a position overlapped with the second pivot member 28.

According to that configuration, the second bent portion 64A, which is a portion having high strength, is arranged close to the inner surface of the second lateral plate 8d via the second lateral plate 8d at a position overlapped with the second pivot member 28. In this manner, since the second lateral plate 8d can be reinforced strongly, the deformation of the second pivot member 28 caused by the load (the thrust power) acting from the second hydraulic cylinder 21 (in particular, deformation in which a clearance between the left plate 28L and the right plate 28R is widened or narrowed) is suppressed. As the result, the stress concentration generated at the end portion of the second pivot member 28 due to the deformation of the second pivot member 28 can be reduced, the deformation being generated due to the thrust power of the second hydraulic cylinder 21. In addition, since the second lateral plate 8d is firmly reinforced, the stress concentration generated at the end portion of the second pivot member 28 also can be reduced, the stress concentration being generated due to the external force acting on the working device 5 constituted of the boom 8 and the arm 9.

In addition, the second supporting portion 62A extends from the second bent portion 64A along the inner surface of the second lateral plate 8d in a direction separating away from the second pivot plate 281.

According to that configuration, the second supporting portion 62A is arranged extending from the second bent portion 64A on which the stress concentration is likely to occur toward the direction separating away from the second pivot plate 281 along the inner surface of the second lateral plate 8d, and thus the stress concentration generated at the end portion of the second pivot member 28 can be effectively reduced.

In addition, the reinforcement plates 60 are arranged on a position overlapped with a front portion of the first pivot member 27 via the first lateral plate 8c in the boom length direction and on another position overlapped with a rear portion of the first pivot member 27 via the first lateral plate 8c in the boom length direction.

According to that configuration, both the position overlapped with the front portion of the first pivot member 27 and the position overlapped with the rear portion of the first pivot member 27 in the first lateral plate 8c can be reinforced by the reinforcement plate 60, and thereby the stress concentration generated at the end portion of the first pivot member 27 can be reduced more effectively.

The working machine 1 includes a machine body 2, the boom 8 that is pivotally supported by the machine body 2 on the base end side and that has the pivotally-supporting portion (the front pivotally-supporting portion) 83 on the tip end side, and the arm 9 pivotally supported by the shaft-supporting portion 83 via the pivot shaft (the second lateral axis) 32. The shaft-supporting portion 83 includes a first bearing portion 85 that supports one end portion of the pivot shaft 32, a second bearing portion 86 that supports the other end portion of the pivot shaft 32, and a connecting portion 87 that connects between the first bearing portion 85 and the second bearing portion 86 and has the first concave portion 88 on one of the upper surface 87a and the lower surface 87b, the first concave portion 88 being recessed facing the other surface.

According to that configuration, since it is not necessary to arrange the connecting portion 97 on either the upper surface 87a side or the lower surface 87b side of the boom 8 in order to secure a space for guiding the hydraulic hose, the connecting portion 87 can be arranged near a middle portion of the boom 8 in the vertical direction. Thus, the stress concentration that is generated at the roots of the first bearing portion 85 and the second bearing portion 86 when the torsional force in the direction of turning of the machine body 2 is applied to the tip end portion (the front shaft supporting portion 83) of the boom 8 is reduced, and further the strength of the tip end portion of the boom 8 can be sufficiently secured relative to the torsional force. In addition, since the strength can be ensured, the thickness of the tip end portion (the front shaft supporting portion 83) can be reduced, and thereby the boom 8 can be reduced in weight.

The working machine 1 includes a hydraulic hose arranged extending from the base end side of the boom 8 to the tip end side, and the first concave portion 88 is provided with the holding portion 30 for holding the hydraulic hose.

According to that configuration, by providing the holding portion 30 of the hydraulic hose in the first concave portion 88, the connecting portion 87 can be arranged near the middle portion of the boom 8 in the vertical direction even when the working machine 1 is provided with the holding portion 30. In this manner, the stress concentration which generates at the base portions of the first bearing portion 85 and the second bearing portion 86 can be reduced effectively.

The boom 8 has a boom main body 81 and a pivot portion (a front pivot portion) 83 attached to the tip end of the boom main body 81, and the front end 87e of the connecting portion 87 is positioned below the first straight line L1 that connects between the upper end of the pivot shaft 32 and the middle point M of the rear end of the shaft-supporting portion 83 in the vertical direction and above the second straight line L2 that connects between the lower end of the pivot shaft 32 and the middle point M.

According to that configuration, since the front end 87e of the connecting portion 87 is positioned substantially at the center of the shaft supporting portion 83 in the vertical direction, it is possible to prevent the stress concentration from occurring at the roots of the first bearing portion 85 and the second bearing portion 86 when the torsional force is applied to the tip end portion (the front supporting portion) of the boom 8.

In addition, the one surface of the connecting portion 87 is formed to be an inclined surface inclining with respect to the extending direction of the boom, and the first concave portion 88 is provided on the inclined surface.

According to that configuration, since the first concave portion 88 is provided on the inclined surface, a space for guiding the hydraulic hose above or below the connecting portion 87 can be ensured.

In addition, the other surface of the connecting portion 87 is formed to be an inclined surface inclining with respect to the extending direction of the boom.

According to that configuration, since the upper surface and the lower surface of the connecting portion 87 are the surfaces inclined, the connecting portion 87 has a shape that is almost symmetry in the vertical direction. Thus, it is possible to effectively prevent the stress concentration from occurring at the roots of the first bearing portion 85 and the second bearing portion 86.

In addition, a second concave portion 89 is formed on the other surface of the connecting portion 87, the second concave portion 89 being recessed facing the one surface.

According to that configuration, the concave portions are formed on the upper surface and the lower surface of the connecting portion 87, so that the connecting portion 87 has a shape that is almost symmetrical in the vertical direction. Thus, it is possible to effectively prevent the stress concentration from occurring.

In addition, the rear end portion 87c of the inclined surface formed on the one surface of the connecting portion 87 is located behind the rear end portion 87d of the inclined surface formed on the other surface of the connecting portion 87.

According to that configuration, since the inclination angle of one surface (the upper surface 87a) of the connecting portion 87 is gentler than the inclination angle of the other surface (the lower surface 87b), the hydraulic hose can be smoothly guided inclining gently along the upper surface 87a.

The supporting member 150 of the working machine 1 includes the first supporting member 151 that supports the fulcrum shaft 163 serving as an opening/closing fulcrum of the cover 41, and includes the second supporting member 152 that is attached to the first supporting member 151 and has the attachment portion 152d of the switching valve 170. And, at least one of the first supporting member 151 and the second supporting member 152 includes the position adjustment portion 153 configured to adjust the relative position between the first supporting member 151 and the second supporting member 152.

According to that configuration, since the relative position between the first supporting member 151 and the second supporting member 152 can be adjusted by the position adjustment portion 153, the relative position between the fulcrum shaft 163 of the cover 41 supported by the first supporting member 151 and the switching valve 170 attached to the second supporting member 152 can be adjusted. In this manner, the cover 41 can be easily prevented from interfering with the hydraulic hose and the like which are connected to the switching valve 170.

In more particular, it is sometimes required, in the cover 41, to adjust the attachment position (the position of the fulcrum shaft 162) in order to avoid interference with the hydraulic hoses (the fourth hydraulic hose 176, the fifth hydraulic hose 177, and the like) and other members. In the case where the fulcrum shaft 163 and the switching valve 170 are attached to the same member (one member), the switching valve 170 also moves simultaneously when the fulcrum shaft 163 is moved in order to adjust the position of the cover 41. That is, the relative position between the fulcrum shaft 163 and the switching valve 170 cannot be changed. Thus, when the hydraulic hose connected to the switching valve 170 interferes with the cover 41, there arises a disadvantage that the interference cannot be eliminated even when the position of the cover 41 is adjusted.

In the case of the present embodiment, the fulcrum shaft 163 and the switching valve 170 are separately attached to different members (the first supporting member 151 and the second supporting member 152), and thus the position of the second supporting member 152 relative to the first supporting member 151 can be adjusted. Accordingly, the relative position between the fulcrum shaft 163 and the switching valve 170 can be changed, and the above-described disadvantage is eliminated.

In addition, the working machine 1 includes the connecting member 178 that connects between the first supporting member 151 and the second supporting member 152. The first supporting member 151 has the first hole 151c, and the second supporting member 152 has the second hole 152c. The connecting member 178 has the inserting portion 178a to be inserted into the first hole 151c and the second hole 152c, and the position adjustment portion 153 has at least one of the first hole 151c and the second hole 152c. The hole is formed in a size having a gap with respect to the outer diameter of the inserting portion 178a.

According to that configuration, the relative position between the first supporting member 151 and the second supporting member 152 can be adjusted in the gap while the first supporting member 151 and the second supporting member 152 are connected by the connecting member 178.

The first supporting member 151 has a first plate portion 151b provided with the first hole 151c, and the second supporting member 152 is provided with the second plate portion 152a provided with the second hole 152c and overlapped above or below the first plate portion 151b. The gap allows the second plate portion 152a to rotate relative to the first plate portion 151b.

According to that configuration, the rotational movement of the second plate portion 152a with respect to the first plate portion 151b is allowed, so that the rotational movement can easily adjust the position of the switching valve 170 in the planar view with respect to the fulcrum shaft 163.

In addition, the working machine 1 includes the base member 159 to which the first supporting member 151 is attached, the base member 159 being fixed to the machine body 2, and includes the second position adjustment portion 154 that can adjust the position of the first supporting member 151 relative to the base member 159.

According to that configuration, the position of the first supporting member 151 relative to the machine body 2 can be adjusted by the second position adjustment portion 154. In this manner, in addition to the position adjustment of the second supporting member 152 with respect to the first supporting member 151, the position of the first supporting member 151 with respect to the machine body 2 can be adjusted. That is, the switching valve 170 connected to the control valve 26 and the position of the fulcrum shaft 163 serving as the opening/closing fulcrum of the cover 41 can be adjusted independently.

In addition, the supporting member 150 is arranged on one side of the machine body 2 in the machine width direction, the cover 41 covers the upper side of the supporting member 150 and the one side in the machine width direction, and the gap allows the second supporting member 152 to move with respect to the first supporting member 151 in the machine width direction.

According to that configuration, the second supporting member 152 can be moved in the machine inward direction relative to the first supporting member 151. Thus, the switching valve 170 can be moved in the machine inward direction with respect to the support shaft 163, and thereby avoiding the interference between the cover 41 and the hydraulic hose and the like connected to the switching valve 170.

The working machine 1 includes the operation fluid tank 15 that stores the operation fluid, and includes the control valve 26 that controls the supply of operation fluid to the hydraulic device. The switching valve 170 includes the inlet port 171 connected to the hydraulic device, the first outlet port 172 connected to the control valve 26, the second outlet port 173 connected to the operation fluid tank 15, and the operation handle 174 to switch the destination of the operation fluid introduced from the inlet port 171 between the first outlet port 172 and the second outlet port 173.

According to that configuration, in the case where the switching valve 170 is a so-called third line valve that allows, by the switching operation, the operation fluid to be returned to the operation fluid tank 15 without flowing through the control valve 26, the interference between the cover 41 and the hydraulic hose connected to the third line valve can be avoided.

The working machine 1 includes the machine body 2, the bonnet 43 provided to the machine body 2 so that the bonnet 43 is opened and closed with respect to the machine body 2, the latching piece 80 provided on the bonnet 43, and the receiving member 90 provided to the machine body 2, the receiving member 90 having the latching portion 922 to which the latching piece 80 is latched when the bonnet 43 is closed. The receiving member 90 has the first receiving member 91 fixed to the machine body 2, and the second receiving member 92 connected to the first receiving member 91, the second receiving member 92 having the latching portion 922. At least one of the first receiving member 91 and the second receiving member 92 has the adjustment portion 93 configured to adjust the relative position between the first receiving member 91 and the second receiving member 92.

According to that configuration, the position of the latching portion 922 with respect to the machine body 2 can be adjusted by adjusting the relative position of the first receiving member 91 and the second receiving member 92. As the result, the position of the latching portion 922 can be adjusted with respect to the latching piece 80 provided on the bonnet 43, and the latching margin of the latching piece 80 with respect to the latching portion 922 can be adjusted. Thus, the latching piece 80 provided on the bonnet 43 can be reliably latched to the latching portion 922 of the receiving member 90 provided on the machine body 2. As the result, the problems caused by the dimensional errors and the assembly errors of the bonnet 43, the receiving member 90, and the like (the problems such as the bonnet 43 being unable to be closed in the production line, the bonnet 43 being opened due to vibrations in operation) can be prevented.

In addition, the working machine 1 includes the connecting member 94 that connects between the first receiving member 91 and the second receiving member 92. The first receiving member 91 has the first hole 91*a*, and the second receiving member 92 has the second hole 92*a*. The connecting member 94 has the inserting portion 94*d* to be inserted into the first hole 91*a* and the second hole 92*a*, and the adjustment portion 93 includes at least one of the first hole 91*a* and the second hole 92*a*. The hole is formed in a size having the gap CL3 with respect to the outer diameter of the inserting portion 94*d*.

According to that configuration, the relative position between the first receiving member 91 and the second receiving member 92 can be adjusted in the gap CL3 while the first receiving member 91 and the second receiving member 92 are connected by the connecting member 94.

In addition, the gap CL3 allows the second receiving member 92 to move relative to the first receiving member 91 in the vertical direction and in the front-rear direction.

According to that configuration, the freedom degree of adjustment in the position of the latching portion 922 with respect to the latching piece 80 is improved. Thus, inconvenience caused by the dimensional errors and the assembly errors of the bonnet 43 and the receiving member 90 can be prevented more reliably.

In addition, at least one of the first receiving member 91 and the machine body 2 has the second adjustment portion configured to adjust the relative position between the first receiving member 91 and the machine body 2.

According to that configuration, in addition to the adjustment of the relative position between the first receiving member 91 and the second receiving member 92, the relative position between the machine body 2 and the first receiving member 91 can be adjusted. Thus, the position of the latching portion 922 can be adjusted with respect to the latching piece 80 in the vertical direction, in the front-rear direction, and in the left-right direction.

The second receiving member 92 has the slit 923 cut out from the bonnet 43 side toward the machine body 2 side, and the bonnet 43 is provided with the insertion plate 95 that is arranged having one surface facing upward and the other surface facing downward and is inserted to the slit 923 when the bonnet 43 is closed.

According to that configuration, the movement of the insertion plate 95 is restricted by the slit 923 with the bonnet 43 closed, and thereby the vibrations of the bonnet 43 is suppressed. In addition, the insertion plate 95 provided on the bonnet 43 is inserted into the slit 923 of the second receiving member 92 when the bonnet 43 is closed, whereby the bonnet 43 is accurately positioned with respect to the receiving member 90. Thus, the latching piece 80 can be securely latched to the latching portion 922. In addition, since the insertion plate 95 arranged having one surface facing upward and the other surface facing downward is configured to be inserted into the slit 923, the second receiving member 92 and the insertion plate 95 have compact configurations in the vertical direction. In this manner, the interference with other members can be prevented.

The adjustment portion 93 includes the upper adjustment portion 93A provided at the upper portion of the first receiving member 91 and includes the lower adjustment portion 93B provided at the lower portion of the first receiving member 91, and the latching portion 922 and the slit 923 are provided between the upper adjustment portion 93A and the lower adjustment portion 93B.

According to that configuration, the position of the second receiving member 92 relative to the first receiving member 91 can be reliably adjusted with high accuracy by the two adjusting portions, the upper adjusting portion 93A and the lower adjusting portion 93B. In addition, since the latching portion 922 and the slit 923 are provided between the two adjustment portions, the position of the latching portion 922 can be accurately adjusted.

In addition, the latching portion 922 includes the concave portion 924 cut out from the bonnet 43 side toward the machine body 2 side, and includes the latching shaft 925 having a columnar shape extending in the vertical direction on the bonnet 43 side of the concave portion 924. The latching piece 80 is constituted of a hook configured to be latched to the latching shaft 925.

According to that configuration, the hook constituting the latching piece 80 is inserted into the space formed between the concave portion 924 and the latching shaft 925, so that the latching piece 80 can be securely and easily latched to the latching shaft 925. In addition, since the latching shaft 925 has the columnar shape, the latching shaft 915 is less likely to be worn and reliable for a long period of time even when the latching piece 80 is repeatedly latched to and released from the latching shaft 925.

In addition, the working machine 1 includes the vertical axis 79 that rotatably supports the latching piece 80, the second receiving member 92 is arranged extending from the machine body 2 side toward the bonnet 43 side, and the latching shaft 925 and the vertical axis 79 are arranged side by side in a direction (in the front-rear direction) parallel to the direction of extending of the second receiving member 92 when the bonnet 43 is closed.

According to that configuration, the latching piece 80 can be easily latched with the latching shaft 925 and hardly slipped from the latching shaft 925. In particular, in FIG. 28, when the vertical axis 79 is shifted to the right (upward from the one-dot chain line L) with respect to the latching shaft 925, the latching piece 80 is easily hooked with respect to the latching shaft 925 and is easily slipped. When the vertical axis 79 is shifted to the left (downward from the one-dot chain line L) with respect to the latching shaft 925, the latching piece 80 is hardly slipped from the latching shaft 925 and is hardly hooked with respect to the latching shaft 925. According to the embodiment, the latching shaft 925 and the vertical axis 79 are arranged to have an appropriate positional relation, so that the latching is easy to be performed and the slipping is hard.

The belt tension adjustment device 100 includes the driving pulley 101 attached to the power transmission shaft (the output shaft 13a), the driven pulley 105 provided in the driven device (the compressor 25), the tension pulley 106, the endless belt (the second belt) 107 that is provided on the driving pulley 101, the driven pulley 105 and the tension pulley 106 and transmits the rotational driving force of the power transmission shaft to the driven device, and the tension adjustment mechanism that adjusts the tension of the belt. The tension adjustment mechanism includes the support shaft 108 that is supported rotatably, the rotating-operation mechanism 130 that rotates the support shaft 108 about the axis thereof, and the rotating member 120 that connects between the support shaft 108 and the tension pulley 106 and changes the relative position of the tension pulley 106 with respect to the driving pulley 101 and the driven pulley 105 in synchronization with the rotation of the support shaft 108.

According to that configuration, the tension of the belt (the second belt) 107 can be adjusted without moving the driven device (the compressor 25). Thus, it is possible to prevent the wirings connected to the driven device from moving and interfering with the other components in the adjustment of belt tension. In addition, it is not necessary to secure a space in which the driven device is moved. In addition, since there is no need to move the device 25, the tension of the second belt 107 can be adjusted with a small force. In addition, since the force (the torsional force) generated when the rotating member 120 is rotated can be received by the rotation of the support shaft 108, the deformation and breakage due to the torsional force hardly occur.

The rotating-operation mechanism 130 includes the movable member 131 attached to the support shaft 108, the operation portion 132 that rotates the movable member 131 to rotate the support shaft 108, and the regulating mechanism configured to regulate the rotation range of the movable member 132.

According to that configuration, since the support shaft 108 can be rotated when the operation portion 132 rotates the movable member 131, the tension of the second belt 107 is easily adjusted. In addition, since the rotation range of the movable member 132 is regulated by the regulating mechanism, the tension of the second belt 107 can be adjusted within an appropriate range.

In addition, the working machine 1 includes the bracket 110 having: the fixed portion fixed to the driven device; and the supporting portion 117 that rotatably supports the support shaft 108. The restricting mechanism includes the guide hole 131 formed in the movable member 131 and formed to be an arc shape around the support shaft 108 formed on the movable member 131, and includes the inserting portion 118 that is provided in the bracket 110 and is inserted into the guide hole 131a to change the position thereof in the guide hole 131a in synchronization with the rotation of the movable member 131.

According to that configuration, the movement direction and movement range of the movable member 131 relative to the bracket 110 can be accurately and reliably regulated by the guide hole 131a and the inserting portion 118. In this manner, the movable member 131 can be smoothly and accurately rotated in synchronization with the rotation of the support shaft 108.

In addition, the support shaft 108 is parallel to the rotation shaft of the tension pulley 106, and has one end arranged on the tension pulley 106 side and the other end arranged on the side opposite to the tension pulley 106 side, and the operation portion 132 is provided on the other end side of the support shaft 132.

According to that configuration, since the operation portion 132 is arranged on the other end side of the support shaft 108 (the side opposite to the tension pulley 106 side), other devices (such as the radiator 46) arranged on the tension pulley 106 side do not interfere with the operation of the operation portion 132, and thus the operability of the operation portion 132 is improved.

In addition, the operation portion 132 includes the first fixing member 133 fixed to the movable member 131, the second fixing member 134 fixed to the bracket 110, and the adjustment mechanism 135 configured to adjust the distance between the first fixing member 133 and the second fixing member 134.

According to that configuration, the adjustment mechanism 135 adjusts the distance between the first fixing member 133 and the second fixing member 134, and thereby the distance between the portion fixed to the first fixing member 133 of the movable member 131 and the portion to which the second fixing member 134 of the bracket 110 is fixed can be changed. In this manner, the linear motion by the adjustment mechanism 135 (the adjustment of the distance between the first fixed member 133 and the second fixed member 134) can be converted into the rotational movement of the movable member 131 with respect to the bracket 110.

In addition, the adjustment mechanism 135 includes the male screw member 135a having one end portion fixed to the first fixing member 133 and the other end portion inserted to the second fixing member 134, and includes the female screw member 135*b* that contacts the second fixing member 134 on the other end and is screwed to the male screw member 135*a*.

According to that configuration, when the female screw member 135*b* is rotated, the male screw member 135*a* can move forward and backward with respect to the female screw member 135*b*. In this manner, the adjustment of distance between the first fixing member 133 and the second fixing member 134 can be performed easily. That is, the movable member 131 can be rotated with respect to the bracket 110 by a simple operation of rotating the female screw member 135*b*.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A belt tension adjustment device comprising:
a driving pulley attached to a power transmission shaft;
a driven pulley arranged in a driven device;
a tension pulley;
a loop belt arranged between the driving pulley, the driven pulley, and the tension pulley, and configured to transmit a rotational driving force of the power transmission shaft to the driven device; and
a tension adjustment mechanism to adjust tension of the loop belt,
wherein the tension adjustment mechanism includes:
a support shaft rotatably supported;
a rotational operation mechanism to rotate the support shaft about an axis of the support shaft; and
a rotating member coupling the support shaft and the tension pulley, configured to change a relative position of the tension pulley with respect to the driving pulley and the driven pulley in accordance with rotating of the support shaft,
the rotational operation mechanism includes:
a movable member attached to the support shaft; and
an operating portion to rotate the support shaft when the movable member is rotated,
the rotating member and the movable member are independent members which are spaced away from each other along the axis of the support shaft,
the rotating member is attached to one end of the support shaft, and
the movable member is attached to the other end of the support shaft.

2. The belt tension adjustment device according to claim 1,
wherein the rotational operation mechanism includes:
a limiter mechanism to limit a range of rotation of the movable member.

3. The belt tension adjustment device according to claim 2, comprising:
a bracket having:
a fixed portion fixed to the driven device; and
a supporting portion to rotatably support the support shaft,
wherein the limiter mechanism includes:
a guide hole formed in the movable member, having an arc shape formed about the support shaft; and
an inserting portion arranged in the bracket, configured to be inserted in the guide hole and to move in the guide hole in accordance with rotation of the movable member.

4. The belt tension adjustment device according to claim 2,
wherein the support shaft is parallel to a rotation shaft of the tension pulley, having:
the one end arranged on a side of the tension pulley; and
the other end arranged on another side opposed to the side of the tension pulley,
and wherein the operating portion is arranged on a side of the other end of the support shaft.

5. The belt tension adjustment device according to claim 3,
wherein the operating portion includes:
a first fixing member fixed to the movable member;
a second fixing member fixed to the bracket; and
an adjustment mechanism to adjust a distance between the first fixing member and the second fixing member.

6. The belt tension adjustment device according to claim 5,
wherein the adjustment mechanism includes:
a male screw member having:
one end fixed to the first fixing member; and
the other end inserted to the second fixing member; and
a female screw member contacting to the second fixing member at a side of the other end, screwed to the male screw member.

7. A working machine comprising
the belt tension adjustment device according to claim 1.

* * * * *